United States Patent [19]
Mittenthal

[11] Patent Number: 5,317,639
[45] Date of Patent: May 31, 1994

[54] NON-LINEAR BLOCK SUBSTITUTION DEVICES DERIVED BY CONSTRUCTIVE CORRUPTION

[75] Inventor: Lothrop Mittenthal, Thousand Oaks, Calif.

[73] Assignee: Teledyne Industries, Inc., Newbury Park, Calif.

[21] Appl. No.: 68,910

[22] Filed: May 25, 1993

Related U.S. Application Data

[63] Continuation-in-part of Ser. No. 741,097, Aug. 5, 1991, Pat. No. 5,214,704, which is a continuation-in-part of Ser. No. 416,953, Oct. 4, 1989, Pat. No. 5,038,376.

[51] Int. Cl.$^5$ ............................................. H04K 1/04
[52] U.S. Cl. ........................................ 380/37; 380/28; 380/49
[58] Field of Search ................... 380/28, 36, 37, 42, 380/49

[56] References Cited

U.S. PATENT DOCUMENTS

| | | | |
|---|---|---|---|
| 4,195,200 | 3/1980 | Feistel | 380/37 |
| 4,322,577 | 3/1982 | Brandstrom | 380/37 |
| 4,520,232 | 5/1985 | Wilson | 380/28 |
| 4,685,132 | 8/1987 | Bishop et al. | 380/49 X |
| 4,797,921 | 1/1989 | Shiraishi | 380/28 |
| 4,932,056 | 6/1990 | Shamir | 380/28 X |
| 5,038,376 | 8/1991 | Mittenthal | 380/37 |
| 5,214,704 | 5/1993 | Mittenthal | 380/37 |
| 5,245,658 | 9/1993 | Bush et al. | 380/28 |

*Primary Examiner*—Tod R. Swann
*Attorney, Agent, or Firm*—Blakely, Sokoloff, Taylor & Zafman

[57] ABSTRACT

Methods and apparatus for non-linearizing modulo 2 addition based encryption by block substitution techniques which allows use of the substitution scheme with relatively simple hardware and yet makes cryptanalysis more difficult. The basic block substitution, a one to one mapping of n-bit binary numbers onto themselves, is based on the fact that certain permutations of the n-bit binary numbers define linear orthomorphisms, which enable block substitution by modulo 2 addition of one permuted set of numbers to another. These equations representing the linear orthomorphism have an additive relationship when viewed as vectors, and in fact, form an additive group in the algebraic sense. The permutations of the n-bit binary numbers which define these linear orthomorphisms have the further property that any power of these permutations, that is, applying the permutations successively to the previously permuted numbers, generates a new linear orthomorphism. This allows the simple changing of the transformation on a frequent basis. However, this same property of linearity permits the entire linear orthomorphism to be generated from a limited subset of the equations. This is not possible with a nonlinear orthomorphism. To obtain a non-linear version, the equations representing the original linear orthomorphism are transformed in an orderly and readily variable manner, so that the entire set of equations may no longer be generated from a limited subset of the equations. Various properties of the transformations and methods of using the same are disclosed.

12 Claims, 17 Drawing Sheets

OFFSET = 0101

Find a $G^n$ first matrix of equations which is a linear orthomorphism, with the equations orderable as follows:

| Equation # | | | | |
|---|---|---|---|---|
| 0 | $\theta$ | $\oplus$ | $\theta$ | $= \theta$ |
| 1 | $x_m$ | $\oplus$ | $x_1$ | $= x_{1-p}$ |
| 2 | $x_1$ | $\oplus$ | $x_2$ | $= x_{2-p}$ |
| • | • | • | • | • |
| • | • | • | • | • |
| j | $x_j$ | $\oplus$ | $x_j$ | $= x_{j-p}$ |
| • | • | • | • | • |
| • | • | • | • | • |
| m | $x_{m-1}$ | $\oplus$ | $x_m$ | $= x_{m-p}$ | where $m = 2^n-1$, $L_n$, $M_n$ and $R_n$ are the left, middle and right columns respectively, $G^{n-1}$ is a subgroup of $G^n$ consisting of $2^{n-1}$ equations from the first matrix $G^n$, found by selecting $n-1$ nonzero equations in $G^n$ and taking all sums thereof as well as the identity equation to obtain additional equations indentified in the specification by Equation 66, $\overline{G}^{n-1}$ is the complement of $G^{n-1}$ in $G^n$, etc., and where $G^{n-1} = L_{n-1} \times M_{n-1} \times R_{n-1}$, $\overline{G}_{n-1} = \overline{L}_{n-1} \times \overline{M}_{n-1} \times \overline{R}_{n-1}$, $W_{n-1} \times L_{n-1} \cap M_{n-1}$, $W_{n-2} = L_{n-2} \cap M_{n-1}$ and $\overline{W}_{n-2}$ is the complement of $W_{n-2}$ in $W_{n-1}$ etc.  102

↓

Modifying the equations of the first matrix to form a second matrix of equations by:

applying the mixing transforms in $\overline{W}_{n-2}$ to $\overline{G}^{n-1}$  104 applying the mixing transforms in $\overline{W}_{n-3}$ to $\overline{G}^{n-2}$  106 repeatedly applying mixing transforms until reaching $\overline{G}^2$  108 appying $\overline{W}_1$ to $\overline{G}^2$ or applying $\theta$ to $\overline{G}^2$.  110

↓

For each clear text block in the left column to be encrypted, add an associated block in the middle column in accordance with an associated equation defined by the second matrix of equations to otain an encrypted block in the right column.  112

FIG. 19

Find $G^n$ a first matrix of equations which is a linear orthomorphism, with the equations orderable as follows:

Equation #
| | | | | |
|---|---|---|---|---|
| 0 | $\theta$ | $\oplus$ | $\theta$ | $= \theta$ |
| 1 | $x_m$ | $\oplus$ | $x$ | $= x_{1-p}$ |
| 2 | $x_1$ | $\oplus$ | $x$ | $= x_{2-p}$ |
| · | · | · | · | · |
| j | $x_{j-1}$ | $\oplus$ | $x_j$ | $= x_{j-p}$ |
| · | · | · | · | · |
| m | $x_{m-1}$ | $\oplus$ | $x_m$ | $= x_{m-p}$ | where $m = 2^n - 1$, $L_n$, $M_n$ and $R_n$ are the left, middle and right columns respectively.   202

Modifying the equations of the first matrix to form a second matrix of equations representing a nonlinear orthomorphism by:

select from $G^n$ two or more disjoint corruptible subgroups of order $2^k$ where $k < n/2$, $G_0^k$, $H_0^k$, $I_0^k$...   204 form subgroups $M_0^{2k}$, $N_0^{2k}$ of order $2^{2k}$ from pairs of $G_0^k$, $H_0^k$, $I_0^k$...   206 continue this process until a subgroup of order $2^{n-1}$ or $2^{n-2}$, $Q_0^{n-1}$ or $Q_0^{n-2}$ is selected   208 decompose $G^n$ into alternating collection of cosets from $Q_0^{n-1}$ or $Q_0^{n-2}$,...., $M_0^{2k}$, $N_0^{2k}$,...., $G_0^k$, $H_0^k$, $I_0^k$....   210

Modify the cosets with their respective mixing transformations to form the second matrix of equations   212

For each clear test block in the left column to be encrypted, add an associated block in the middle collumn with an assoicated equation defined by the second matrix of equations, to obtain an encrypted block in the right column.   214

FIG. 21

| Find $G^8$ a first matrix of equations representing a linear orthomorphism, with the equations orderable as follows: |
|---|

Equation #

| # | | | | | |
|---|---|---|---|---|---|
| 0 | $\theta$ | $\oplus$ | $\theta$ | $=$ | $\theta$ |
| 1 | $x_m$ | $\oplus$ | $x$ | $=$ | $x_{1-p}$ |
| 2 | $x_1$ | $\oplus$ | $x$ | $=$ | $x_{2-p}$ |
| · | · | · | · | · | · |
| j | $x_{j-1}$ | $\oplus$ | $x_j$ | $=$ | $x_{j-p}$ |
| · | · | · | · | · | · |
| · | · | · | · | · | · |
| m | $x_{m-1}$ | $\oplus$ | $x_m$ | $=$ | $x_{m-p}$ | where $m = 255$, $L_8$, $M_8$ and $R_8$ are the left, middle and right columns respectively, 302

---

Modifying the equations of the first matrix to form a second matrix of equations representing a nonlinear orthomorphism by:

--- select from $G^8$, three disjoint subgroups of order 4, $G^2_0$, $H^2_0$, and $I^2_0$   304

--- generate from $G^2_0$, $H^2_0$, and $I^2_0$, three subgroups of order 16, $M^4_0$, $N^4_0$ and $P^4_0$ respectively from the pairs of the three subgroups of order 4   306

--- generate cosets $Q^6_1$, $Q^6_2$ and $Q^6_3$ from $Q^6_0$, a subgroup of order 64 generated from the triple of $G^4_0$, $H^4_0$, and $I^4_0$   308

--- decompose the Q cosets into four cosets of 16 rows each   310

--- decompose each of the four cosets into four cosets of four rows each and select an alternating pattern of cosets and modify the selected cosets with their respective mixing transforms to form the second matrix of equations   312

---

For each clear text block in the left column to be encrypted, add an associated block in the middle column with an associated equation defined by the second matrix of equations, to obtain an encrypted block in the right column.   314

FIG. 22

402 — Find $G^n$ a first matrix of equations representing a linear orthomorphism, with the equations orderable as follows:

Equation #
| | | | | | |
|---|---|---|---|---|---|
| 0 | $\theta$ | $\oplus$ | $\theta$ | $=$ | $\theta$ |
| 1 | $x_m$ | $\oplus$ | $x$ | $=$ | $x_{1-p}$ |
| 2 | $x_1$ | $\oplus$ | $x$ | $=$ | $x_{2-p}$ |
| $\cdot$ | $\cdot$ | $\cdot$ | $\cdot$ | $\cdot$ | $\cdot$ |
| j | $x_{j-1}$ | $\oplus$ | $x_j$ | $=$ | $x_{j-p}$ |
| $\cdot$ | $\cdot$ | $\cdot$ | $\cdot$ | $\cdot$ | $\cdot$ |
| m | $x_{m-1}$ | $\oplus$ | $x_m$ | $=$ | $x_{m-p}$ | where $m = 2^n - 1$ and where m is not a prime number, $L_n$, $M_n$ and $R_n$ are the left, middle and right columns respectively.

Modifying the equations of the first matrix to form a second matrix of equations representing a nonlinear orthomorphism, by:

404 — select a corruptible subgroup of order 4 from $G^n$ generally represented as $x_m \oplus x_1 = x_{1-p}$
$x_1 \oplus x_2 = x_{2-p}$
$x_{q-1} \oplus x_q = x_{q-p}$;
where $x_q = x_1 \oplus x_2$

406 — generate a coset by choosing an equation, represented by index a, which is not in the corruptible subgroup of order 4 and adding said equation vectorially to the corruptible subgroup, with the new subgroup being represented by $x_{a-1} \oplus x_a = x_{a-p}$
$x_{b-1} \oplus x_b = x_{b-p}$
$x_{c-1} \oplus x_c = x_{c-p}$
$x_{d-1} \oplus x_d = x_{d-p}$

408 — choose an integer number l which divides m, determine values for a mod l, b mod l, c mod l and d mod l

410 — if any of said values are duplicated, repeat steps 406-408

412 — generate m/l additional co-sets of the form $x_{a+kl-1} \quad x_{a+kl} = x_{a+kl-p}$
$x_{b+kl-1} \quad x_{b+kl} = x_{b+kl-p}$
$x_{c+kl-1} \quad x_{c+kl} = x_{c+kl-p}$
$x_{d+kl-1} \quad x_{d+kl} = x_{d+kl-p}$ where $0 < k < m/l - 1$

414 — apply a mixing transform $W_{kl} \oplus W_{kl} = \theta$ to said corresponding additional cosets, wherein $W_{kl} = W_{a+kl} \oplus W_{b+kl}$ to constructively corrupt the corresponding additional co-sets, yielding the second matrix of $2^n$ equations

416 — For each clear text block in the left column to be encrypted, add an associated block in the middle column with an associated equation defined by the second matrix of equations to obtain an encrypted block in the right column.

FIG. 23

NON-LINEAR BLOCK SUBSTITUTION DEVICES DERIVED BY CONSTRUCTIVE CORRUPTION

RELATED APPLICATIONS

This application is a continuation-in-part of application Ser. No. 07/741,097 filed Aug. 5, 1991 which was a continuation-in-part of application Ser. No. 07/416,953 filed Oct. 4, 1989, now U.S. Pat. Nos. 5,214,704 and 5,038,376 respectively.

BACKGROUND OF THE INVENTION

1. Field of the Invention

The present invention relates to the field of encryption devices and methods, and more particularly, to block substitution encryption methods and devices.

2. Prior Art

In many cases, it is desired to communicate information in digital form from one location to another in a manner which is clear and unambiguous to the receiver, but which is incomprehensible to an interloper there between. Accordingly, in many instances, it is common to encrypt the information to be communicated by some predetermined encryption process, to transmit the encrypted form of the information and to then decrypt the information at the receiving location. Depending upon the degree of security desired, a relatively simple and easily broken encryption may be used, as any level of encryption will make the transmission meaningless to the casual interloper. In other situations, the degree of security desired may dictate the use of an encryption technique which is more difficult to decipher by cryptanalysis, or of course hopefully in the highest level of security, make the same substantially impossible to decipher. Applications for such encryption techniques include commercial applications such as sensitive communications between manufacturing plants, bank branches, etc., and military applications including but not limited to IFF (identification friend or foe). While in some cases the primary objective of the encryption is to prevent an interloper from deciphering the information being communicated, in other cases a primary object, such as in IFF, is to prevent the interloper from himself originating false information with the same encryption scheme so as to mislead the intended receiver. Both objectives are frequently present in many applications.

Block substitution is a method used to encrypt a clear text message which is in the form of a sequence of binary numbers. In accordance with the method, the sequence is broken into blocks of some predetermined block length n, with the block substitution device substituting a unique new block of binary numbers for each of those in the clear text. Substitute blocks constitute the encrypted message or cipher text, each substitute block representing a non-ambiguous one-to-one transformation of a clear text block. In the prior art, such substitution generally takes place by means of look-up tables, switching arrangements, or feedback shift registers. However, without changing codes or substitution schemes frequently, the encryption may be broken by cryptanalysis, though, changing look-up tables is cumbersome, only a limited number of possible switching arrangements is practical, and repeated cycling of a shift register is time consuming. An additional problem arises in finding substitutions which do not have any pattern or bias in them. At the present time, candidate substitutions are examined by computer simulation for possible systematic patterns and in some cases, additional circuitry is used to compensate therefor.

Various types of encryption equipment and methods are well-known in the prior art. See for instance U.S. Pat. Nos. 3,796,830, 3,798,359, 4,078,152, 4,195,200, 4,255,811, 4,316,055 and 4,520,232. In general, these systems as they relate to block substitution are key dependent ciphering and deciphering systems and are not based upon block substitution by modulo 2 addition of one additive permuted set of numbers to another, as in the present invention.

In the grand-parent application, methods and apparatus for modulo 2 addition based encryption by block substitution techniques were disclosed which allow use of the substitution scheme with relatively simple hardware. The block substitution, a one to one mapping of n bit binary numbers onto themselves, is based on the fact that certain permutations of the n bit binary numbers define a block substitution by modulo 2 addition of one permuted set of numbers to another, and that a subset of these defined equations having an additive relationship when viewed as vectors, whereby the remainder of the set may be generated from a limited subset of the equations. This allows the simple changing of the transformation on a frequent basis. Various properties of the transformations and methods of using the same were disclosed. The fact that the remainder of the set equations may be generated from a limited subset of the equations, however, may make cryptanalysis less difficult than desired in some applications. The parent application related to a method and apparatus for non-linearizing the equations, also in an orderly and readily variable manner, so that the remainder of the set equations may no longer be generated from a limited subset of the equations. The present invention provides additional methods for non-linearizing the equations.

BRIEF DESCRIPTION OF THE INVENTION

Methods and apparatus for non-linearizing modulo 2 addition based encryption by block substitution techniques which allows use of the substitution scheme with relatively simple hardware and yet makes cryptanalysis more difficult. The basic block substitution, a one to one mapping of n bit binary numbers onto themselves, is based on the fact that certain permutations of the n bit binary numbers define a block substitution by modulo 2 addition of one permuted set of numbers to another, and that a subset of these defined equations having an additive relationship when viewed as vectors. This allows the simple changing of the transformation on a frequent basis. Then the equations are non-linearized, also in an orderly and readily variable manner, so that the remainder of the set equations may no longer be generated from a limited subset of the equations. Various properties of the transformations and methods of using the same are disclosed. In particular, methods for non-linearization, provided in accordance with the present invention, include non-linearization by forming nested sequences of subgroups, fitted cosets, and cosets of disjoint corruptible subgroups.

BRIEF DESCRIPTION OF THE DRAWINGS

FIG. 1 illustrates a many-one transformation of one set of three bit binary numbers to another set of binary numbers by a modulo 2 addition.

FIG. 2 illustrates a one-to-one transformation of one set of three bit binary numbers to another set of binary numbers by a modulo 2 addition.

FIG. 3 presents the transformation equations of FIG. 2 reordered, excluding the first equation, making the three digit number in the first column the same as the three digit number in the second column of the preceding row. Excluding the first equation, each column now is in the same order but with different starting positions.

FIG. 4 corresponds to FIG. 3, though with the first and third columns shifted vertically with respect to the second column. These shifts are 6 and 2 positions downward respectively. Except for the first equation, each column remains in the same order but with different starting positions.

FIG. 5 corresponds to FIG. 4, with the $\oplus$ and $=$ symbols interchanged for encryption purposes.

FIG. 10 presents a set of transformation equations corresponding to those of FIG. 4 with the fixed word 001 added to columns 1 and 2 thereof. Except for the first equation, columns 1 and 2 are in the same order but with different starting positions.

FIG. 15 illustrates a rearrangement equations in FIG. 2 into the general form $x_{n-1} \oplus x_n = z_n$.

FIG. 17 illustrates a set of equations useful for encryption and decryption derived by adding the offset 0101 to the first and second columns of the set of equations presented on page A12 of Appendix 2.

FIG. 19 is a block diagram illustrating a method for encryption employing nested sequences of sub-groups;

FIG. 21 is a block diagram illustrating a method of encryption employing fitted cosets from different sub-groups as graphically illustrated in FIG. 20;

FIG. 22 is a block diagram illustrating the method of FIG. 21 for a block size of $n=8$;

FIG. 23 is a block diagram illustrating a method for encryption employing cosets of disjoint, corruptible sub-groups.

DETAILED DESCRIPTION OF THE INVENTION

Figure 6:
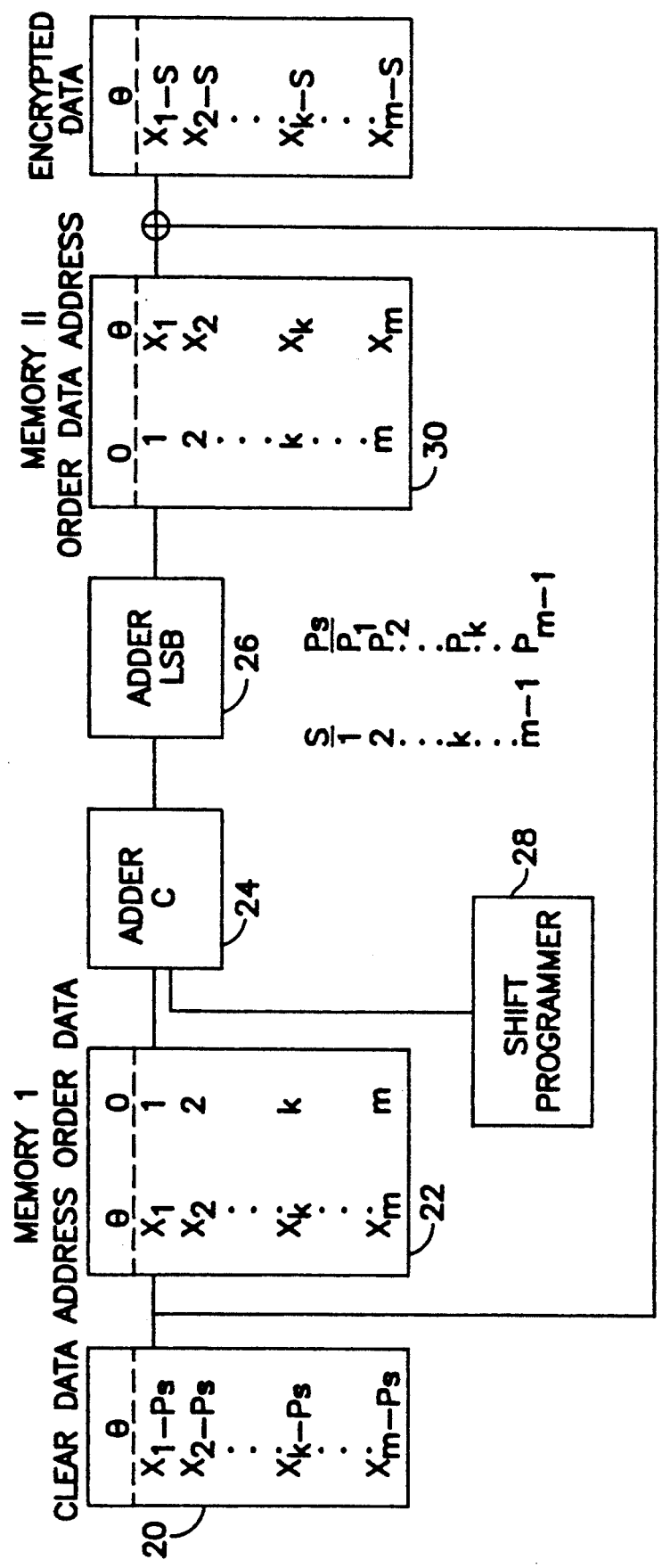
FIG. 6 is a block diagram of an apparatus for encrypting data.

The present invention comprises methods and apparatus for non-linearizing modulo 2 addition based encryption by block substitution described in detail in the parent application and the grandparent application. These disclosures are repeated herein to provide a basis for the improvement of the present invention. Specifically, aspects of the grandparent application are set forth below section in I. BLOCK SUBSTITUTION.

Descriptions of the invention of the parent application are set forth in section II. NON-LINEARIZATION OVERVIEW. Disclosure relevant to the present invention are set forth in the remaining sections. In particular, section III. MODIFICATIONS OF LINEAR ORTHOMORPHISMS provides a description of preliminary modifications and variations to the linear orthomorphisms described in the parent and grandparent applications. Section IV. CONSTRUCTION OF COMPLETE NON-LINEAR ORTHOMORPHISMS provides a generalization of non-linear orthomorphisms. Section IV. CONSTRUCTION OF COMPLETE NON-LINEAR ORTHOMORPHISMS provides a detailed example describing the construction of an orthomorphism for a block size of $n=8$. A first improved method for non-linearizing a set of block substitution equations is provided in section V. NESTED SEQUENCES OF SUB-GROUPS. A second improved method for non-linearization is provided in section VI. FITTED COSETS FROM DEFERENT SUBGROUPS. A third improved method for non-linearizing block substitution equations is provided in section VII. COSETS OF DISJOINT CORRUPTIBLE SUB-GROUPS. Section VII. COSETS OF DISJOINT CORRUPTIBLE SUB-GROUPS further includes a detailed example for block substitution system having block size $n=8$. Finally, section VIII. DEFINITIONS OF TERMS AND SYMBOLS provides a glossary of terms used within this patent application and the appendices attached hereto. Section VIII. DEFINITIONS OF TERMS AND SYMBOLS further defines certain mathematical symbols used herein.

Additionally five (6) Appendicies are attached hereto including: Appendix No. I, Unbiased Block Substitutions; Appendix No. II, Non-linear Dynamic Substitution Devices as Mechanisms for Block Substitutions; Appendix No. III, Methods of Non-linear Dynamic Substitution; Appendix No. IV, Constructive Corruption: A Method for Generating Nonlinear Dynamic Substitutions; Appendix No. V, Constructive Corruption II: More General Methods for Generating Nonlinear Dynamic Substitutions; and Appendix No. VI, The Algebraic Structure of Non-linear Orthomorphisms of Binary Numbers.

I. BLOCK SUBSTITUTION

In the description to follow, the methods and apparatus of the parent application will first be described with respect to blocks of n bit binary numbers where the value of n is 3. Then the methods and apparatus will be expanded to n bit blocks generally, and certain characteristics of blocks up to $n=8$ will be presented. By presenting the following example for $n=3$, it is believed that the concepts of the original invention may be better understood than would be the case if a larger block having many more combinations were used.

Block substitution is the term usually applied to a one-to-one mapping of the n-bit binary numbers onto themselves. This mapping can be written as a pairing of the $2^n$ n-bit numbers:

$$X_1 \quad Z_1 \quad (1)$$
$$X_2 \quad Z_2$$
$$\cdot \quad \cdot$$
$$\cdot \quad \cdot$$
$$\cdot \quad \cdot$$
$$X_k \quad Z_k$$
$$\cdot \quad \cdot$$
$$\cdot \quad \cdot$$
$$\cdot \quad \cdot$$

where each column is the set of the same $2^n$ distinct n-bit numbers but written in different orders. Thus, this mapping can be thought of as a permutation of the n-bit numbers written as:

$$\begin{array}{c} X_1 \, X_2 \ldots X_k \\ Z_1 \, Z_2 \ldots Z_k \end{array} \quad (2)$$

or $(X_1 \, X_i \, X_j)$ for some set of indices. This usual notation for permutations simply means that $X_1 \rightarrow X_i$, $X_i \rightarrow X_j$, etc.

Going back to the column notations, one could define a set of simple equations from the original set and its image:

$$\begin{array}{rcl} Y_1 \oplus X_1 &=& Z_1 \\ Y_2 \oplus X_2 &=& Z_2 \\ & \cdot & \\ & \cdot & \\ & \cdot & \\ Y_k \oplus X_k &=& Z_k \\ & \cdot & \\ & \cdot & \\ & \cdot & \end{array} \quad (3)$$

where $\oplus$ means modulo 2 addition (i.e., addition of corresponding digits without any carry). In general, the set $\{Y_1, Y_2, \ldots\}$ will not all be distinct, but in certain circumstances they will be. In accordance with the original invention, when they are distinct, block substitutions can be generated by modulo 2 addition rather than by conventional means. The main tasks are to determine the circumstances, if any, in which this scheme works, how the substitutions can be quickly changed, and the lack of bias.

Figures 1, 3, 5:
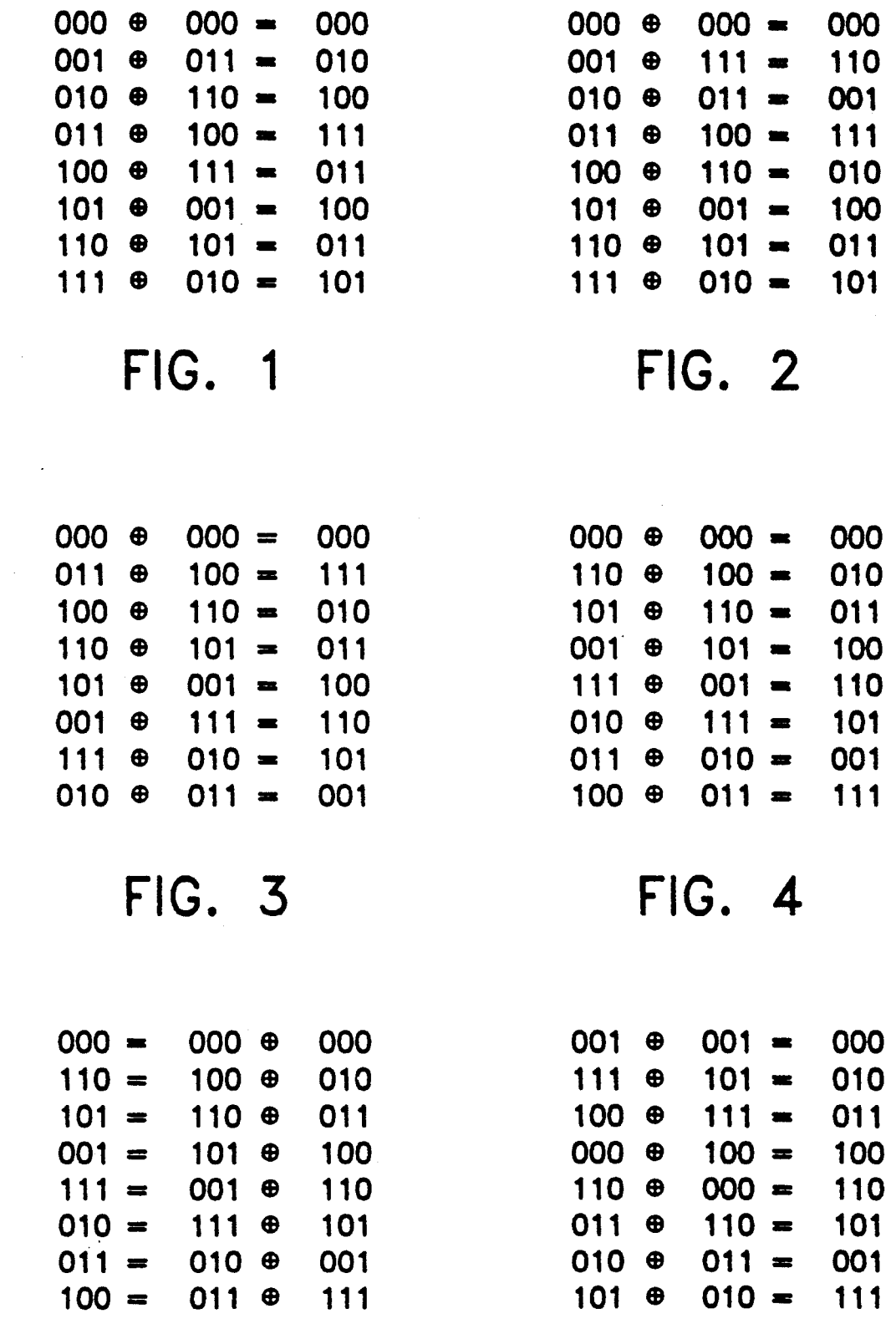

It is not obvious that block substitutions can ever be generated by modulo 2 addition. For example, consider the attempt to substitute one arrangement of 3-bit binary numbers for another by modulo 2 addition shown in FIG. 1. In column 3 on the right, 011 and 100 each appear twice, while 001 and 110 never appear. The numbers in column 1 on the left, acting on the numbers in column 2 in the center, constitute a transformation of the set of 3-bit binary words of column 1 into themselves. This is a many-one transformation and is useless for block substitutions because of the ambiguity that results when trying to recover the original block for the transformed blocks 011 and 100.

Trying another arrangement as shown in FIG. 2 gives a different result. Any pair of columns now constitutes a one-to-one transformation. In particular, the transformation is one-to-one from the 3-bit binary numbers of column 3 (the clear text) onto themselves, the encrypted text of column 1. Each column consists of all the 3-bit numbers exactly once.

Obviously, one could use the transformations of FIG. 2 to transform any three digit binary block into an encrypted binary block, and of course use the same equations to de-encrypt the encrypted message by finding the encrypted word in column 1 and then selecting the corresponding clear text word in the same row, column 3 of FIG. 2. This is most convenient if $\oplus$ and $=$ are interchanged as shown in FIG. 5. An equivalent transformation to transform the encrypted word back to the clear text word results if the words of column one are added to those of column two to obtain those in column three.

Referring again to FIG. 2, an interesting property of the transformation shown therein, and for that matter, for all transformations of the type of interest herein, may be seen. In particular, of the eight blocks of three binary numbers, the lower four blocks 000, 001, 010 and 011 map into two blocks of the lower four, namely 000 and 001, and two blocks of the upper four, namely 110 and 111. Similarly of course, the four larger blocks of the eight map two into blocks in the lower four, and two into blocks of the upper four. Similarly, the even blocks 000, 010, 100 and 110 map into two even blocks, 000 and 010, and into two odd blocks, 001 and 011. The odd four blocks map half into odd blocks and half into even blocks. Obviously for decryption, the same is true. Thus, knowledge of some characteristic of the encrypted block such as its being large, small, even, odd, etc., does not convey any similar knowledge of a characteristic of the unencrypted block. As a result of this, the encryption is said to be unbiased. For that matter it should be noted that, even considering the middle digit of each block, the four blocks of FIG. 2 having a zero as the middle digit map two blocks into blocks also having a zero as a middle digit, and two blocks having one as the middle digit. Similarly of course, the four blocks having a one as the middle digit map two into blocks having a one as a middle digit, and two into blocks having a zero as the middle digit. This property applies to all block sizes and extends to dividing equally all set of blocks which may be characterized algebraically as maximal subgroups. This unbiased character of the encryption is a highly beneficial characteristic of the encryption scheme disclosed herein, particularly in conjunction with the frequent changing of the encryption from time to time.

In particular, in any practical encryption device of course, one would like to be able to frequently change the encryption scheme so that patterns will not persist for a sufficient length of time to allow cryptanalysis of the pattern. For this purpose, certain properties of the equations of FIG. 2 may be recognized by rearranging the rows of FIG. 2 as shown in FIG. 3. Rearrangement of the rows in any manner of course does not effect the transformation in any way, as each of the equations maintains its own integrity separate and apart from its position in the table. In essence, the second row of FIG. 3 is the 4th row in FIG. 2 and the third row of FIG. 3 is the fifth row in FIG. 2, with each successive row being arranged so that the left column in each successive row contains the same 3 bit number as the second column of the preceding row. When so arranged, neglecting the first or identity row, it will be noted that each of the three columns contains the same sequence of the 3 bit binary numbers, with wrap-around. In particular, the first column has the same sequence as the second column, but displaced downward therefrom one position (or upward six positions), and the third column has the same sequence as the second column, though displaced downward three positions (or upward four positions) from the sequence of column two.

Neglecting the first row or identity row of FIG. 3 again, if the 3 bit binary numbers in column 1 are shifted downward a total of six positions with wrap-around with respect to the second column, it will be noted that a one to one transformation still results, as shown in FIG. 4. Except for the identity row, the transformation is entirely different from that of FIG. 3. By way of example, 111 column 3 maps into 011 column 1 in FIG. 3, and maps into 100 column 1 in FIG. 4. In addition however, it is important to note that the sequence of the 3 digit numbers in columns 1 and 3 of FIG. 4 (separating out the identify row) is still the same as that in column 2 of FIGS. 3 and 4, though each is shifted with wrap-around in comparison to column 2. Thus, the transformation of FIG. 3 has been changed to the new transformation of FIG. 4 by merely shifting the numbers in the first column of FIG. 3 with respect to those in the second column, and with the numbers in the third column also being shifted with respect to those in the second column, but by a different amount to preserve the integrity of the modulo 2 addition equations. Again, for decryption, symbols $\oplus$ and $=$ of FIG. 4 can be interchanged as in FIG. 5.

More generally for any block size, the sets of equations can be written as:

ENCRYPTION $$\begin{array}{ccc}
1 & 2 & 3 \\
\theta & = \theta & \oplus \theta \\
X_{1-s} & = X_1 & \oplus X_{1-P_s} \\
X_{2-s} & = X_2 & \oplus X_{2-P_s} \\
\cdot & \cdot & \cdot \\
\cdot & \cdot & \cdot \\
\cdot & \cdot & \cdot \\
X_{k-s} & = X_k & \oplus X_{k-P_s} \\
\cdot & \cdot & \cdot \\
\cdot & \cdot & \cdot \\
\cdot & \cdot & \cdot \\
X_{m-s} & = X_m & \oplus X_{m-P_s} \\
\theta & = 00 \ldots 00 &
\end{array} \quad (4)$$

DECRYPTION $$\begin{array}{ccc}
1 & 2 & 3 \\
\theta & \oplus \theta & = \theta \\
X_{1-s} & \oplus X_1 & = X_{1-P_s} \\
X_{2-s} & \oplus X_2 & = X_{2-P_s} \\
\cdot & \cdot & \cdot \\
\cdot & \cdot & \cdot \\
\cdot & \cdot & \cdot \\
X_{k-s} & \oplus X_k & = X_{k-P_s} \\
\cdot & \cdot & \cdot \\
\cdot & \cdot & \cdot \\
\cdot & \cdot & \cdot \\
X_{m-s} & \oplus X_m & = X_{m-P_s}
\end{array} \quad (5)$$

For block size n, $m=2^n-1$. $\theta=00\ldots 00$, the n bit word consisting of all zeroes.

If column 1 is shifted by S positions with respect to column 2, then column 3 is shifted by a different amount $P_S$ to preserve the integrity of the modulo 2 addition equations. For a given shift S, $P_S$ is determined by the shift programmer.

Now referring to FIG. 6, a block diagram of a system for carrying out encryption in accordance with the encryption and decryption techniques discussed so far may be seen.

The clear test word is sent to its address in Memory I. This corresponds to selecting a word $X_{k-P_s}$ from column 3 other than $\theta$. The concept is to add it to its counterpart in column 2. If $X_{k-P_s}$ is other than $\theta$ and is to be added to $X_k$, this is equivalent to adding the word with order data K - $P_s$ in column 3 to the word with order K - $P_s+P_s=K$, also in column 3. Thus the order data of the clear test word K - $P_s$ is sent to the adder to be added to $P_s$. The new order number is sent to its address in Memory II. The content of that address is added modulo 2 to the clear test word to obtain the encrypted word $X_{k-s}$ in column 1. If the clear text word is $\theta$, its cipher test image is the same.

Adding of the order data is accomplished by two adders, carry (C) and least significant bit (LSB). The carry adder adds the numbers conventionally with carry, e.g. 001+011=100. However, if the addition requires more than n digits, that is, a 1 is carried to the n+1 position, that extra 1 is instead added to the first position, e.g., 100+110=1010>011. This is accomplished by the LSB adder. This is simply addition modulo m where $m=2^n-1$. In this example, n=3, m=7 and the addition expressed in decimal terms is $4+6=10\equiv 3$ mod 7 where 100>4, 110>6 and 011>3.

Figure 7:
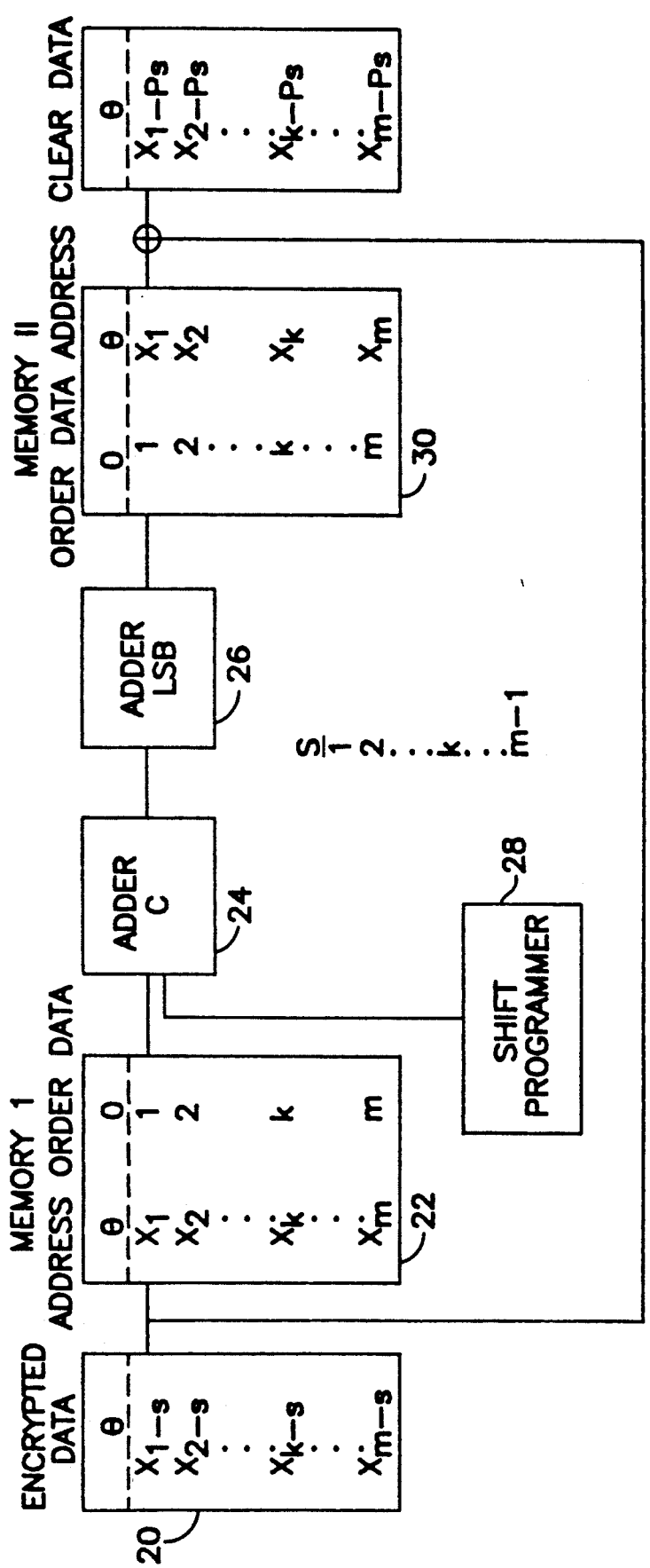
FIG. 7 is a block diagram of apparatus for decrypting data encrypted by the apparatus of FIG. 6.

The block diagram for decryption is shown at FIG. 7. The cipher text word is sent to its address in Memory I. This corresponds to selecting a word $X_{k-s}$ from column 1 other than $\theta$. The concept is to add it to its counterpart, $X_k$ in column 2. This is equivalent to adding $X_{k-s}$ in column 1 to the word with order data K - s+s=K, also in column 1. Thus the order data of the cipher text word, K-s is sent to the adder to be added to s. The new order number is sent to its address in Memory II. The contents of that address is added modulo 2 to the cipher text word to obtain the de-encrypted word $X_{k-P_s}$ in column 3. If the cipher text word is $\theta$, it is de-encrypted as $\theta$.

The addition of order data, K - S+S and K - $P_s+P_s$ is understood to be modulo m or with wraparound. That is, if the order data is greater than m, the last position, m is subtracted from the order data. If the cipher text word is $\theta$, it is de-encrypted as the same word.

The shift program determines the order in which the shifts, S, in column 1 are used, with the corresponding $P_s$ shift S in column 3. Any desired order can be used. The shift S corresponds to a power of the basic permutation described on Page 8, which determines the substitution by addition.

Figure 8:
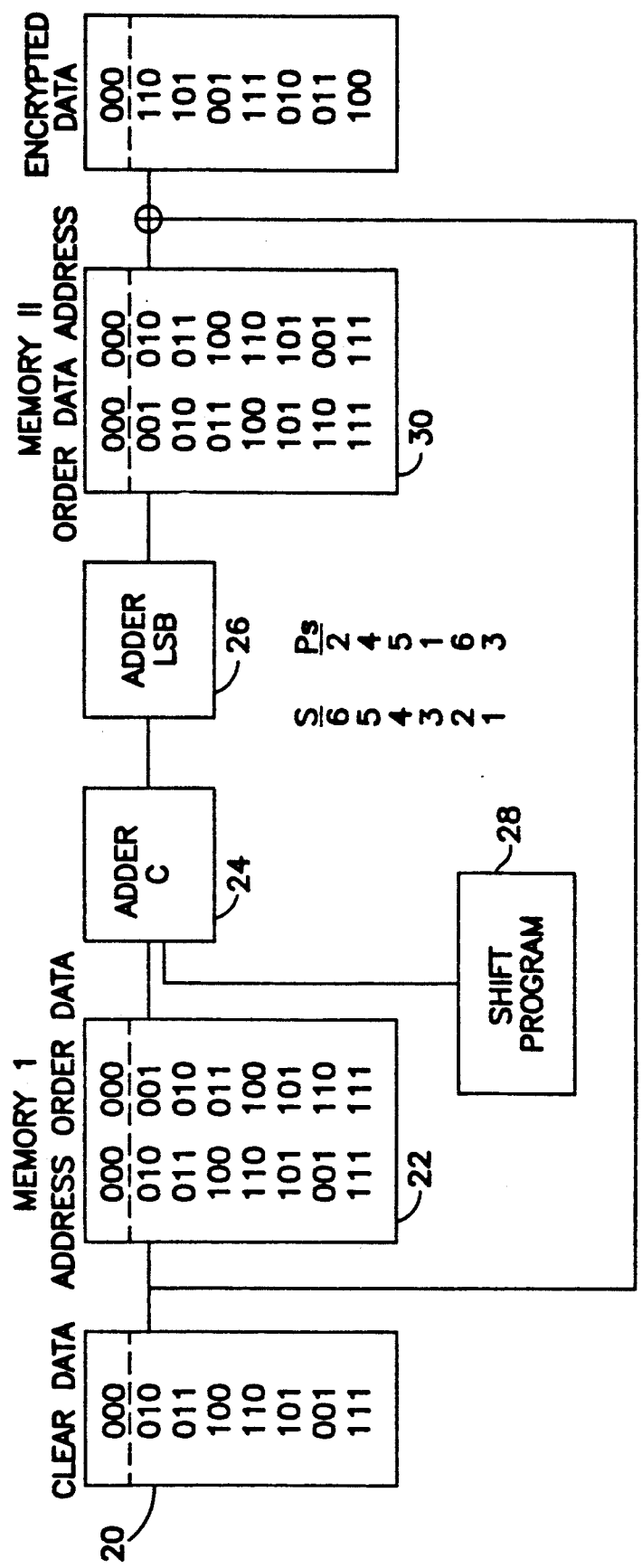
FIG. 8 is an example of encryption using FIG. 6.

Thus, by way of example, in FIG. 8, if the clear data value is 010, then that address in Memory I provides order data 001, which is binary notation that 010 is in position 1 in the sequence in Memory I (column 3 of the set of equations). The first shift position in the program is S =6, for which $P_6=2$. To the position of 010, K - $P_6=1$ is added $P_6=2$. In binary notation, 001+010=011. Corresponding to the address 011 in Memory II is the number 100. (This is equivalent to saying that 100 is in position 3 in column 3). $110=100\oplus 010$ is the cipher text word. This represents the first of the additive equations in FIG. 5.

Figure 9:
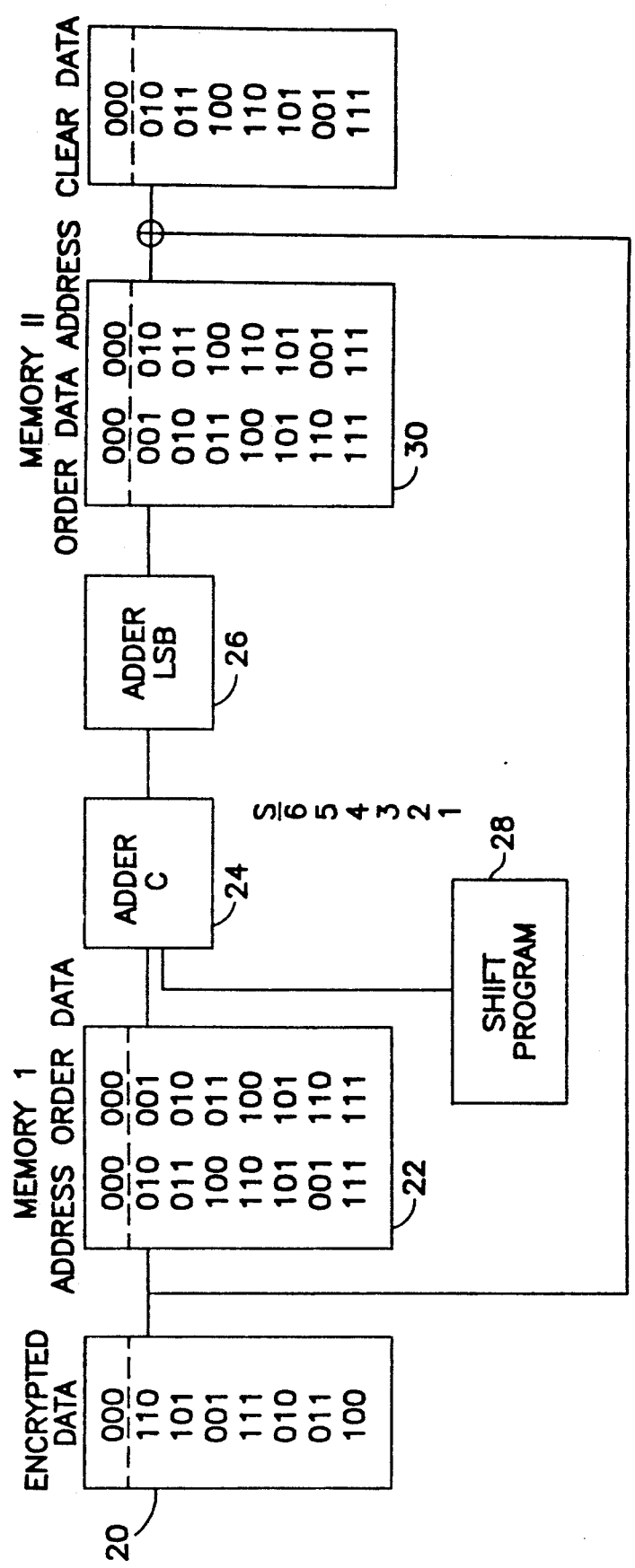
FIG. 9 is an example of decryption using FIG. 7.

For decryption, the cipher text word is 110. In FIG. 9, that address in Memory I provides order data 100, or position 4 in the sequence in Memory I. The first shift position in the program is S=6. To the position of 110, K - 6=4, is added 6, or 110 in binary notation. 4+6=10. Subtracting by m=7, 10 - 7=3, Or position 3 with wrap around. In binary notation, 100+110=011 modulo 7. Corresponding to the address 011 in Memory II is the number 100. 100⊕100=010. This represents the first of the additive equations in FIG. 4.

If one adds Modulo 2 a fixed number to the first and second columns of FIG. 4. A still further one-to-one transformation results.

ENCRYPTION $$\begin{aligned}
1 \quad\quad\quad 2 \quad\quad\quad 3 & \\
(I \oplus Y) = \quad (I \oplus Y) \oplus \quad I & \\
(X_{1-s} \oplus Y) = (X_1 \oplus Y) \oplus X_{1-P_s} & \\
(X_{2-s} \oplus Y) = (X_2 \oplus Y) \oplus X_{2-P_s} & \\
\vdots \quad\quad\quad \vdots \quad\quad\quad \vdots & \\
(X_{k-s} \oplus Y) = (X_k \oplus Y) \oplus X_{k-P_s} & \\
\vdots \quad\quad\quad \vdots \quad\quad\quad \vdots & \\
(X_{m-s} \oplus Y) = (X_m \oplus Y) \oplus X_{m-P_s} &
\end{aligned} \quad (6)$$

DECRYPTION $$\begin{aligned}
1 \quad\quad\quad\quad 2 \quad\quad\quad 3 & \\
(I \oplus Y) \oplus \quad (I \oplus Y) = \quad I & \\
(X_{1-s} \oplus Y) \oplus (X_1 \oplus Y) = X_{1-P_s} & \\
(X_{2-s} \oplus Y) \oplus (X_2 \oplus Y) = X_{2-P_s} & \\
\vdots \quad\quad\quad\quad \vdots \quad\quad\quad \vdots & \\
(X_{k-s} \oplus Y) \oplus (X_k \oplus Y) = X_{k-P_s} & \\
\vdots \quad\quad\quad\quad \vdots \quad\quad\quad \vdots & \\
(X_{m-s} \oplus Y) \oplus (X_m \oplus Y) = X_{m-P_s} &
\end{aligned} \quad (7)$$

Figure 11:
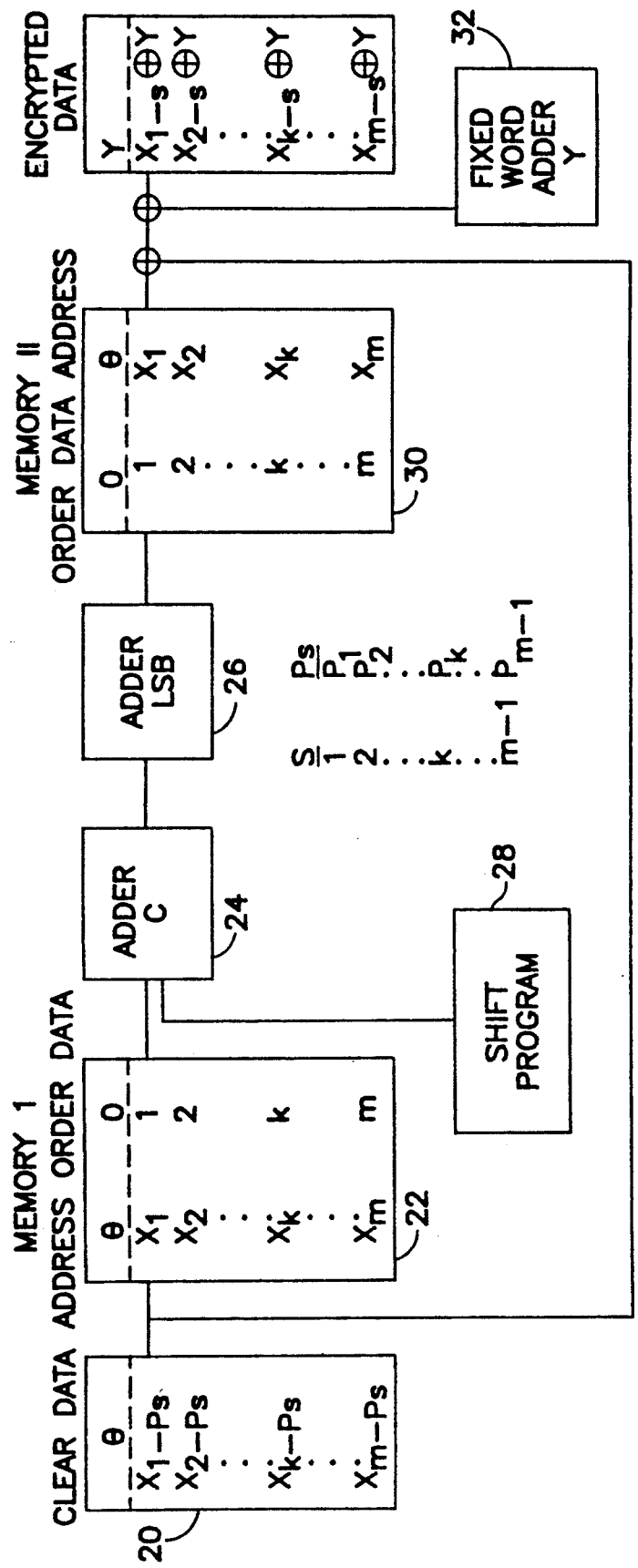
FIG. 11 is a block diagram for an apparatus for encrypting data in accordance with a set of transformation equations such as those of FIG. 10.
Figure 12:
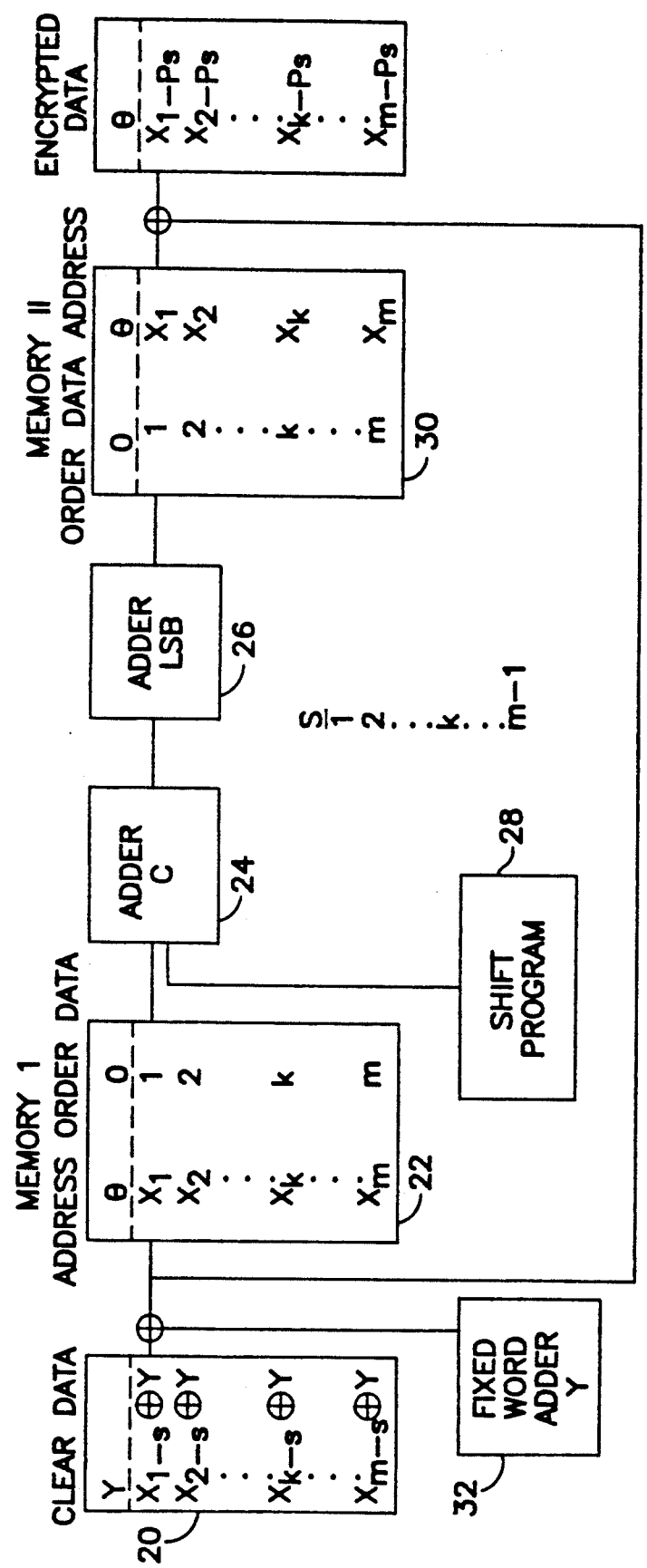
FIG. 12 is a block diagram for an apparatus for decrypting data encrypted with the apparatus of FIG. 11.

Now referring to FIGS. 11 and 12, for any block size a block diagram for carrying out encryption and decryption using a fixed word other than θ, the zero word, may be seen. The procedure is essentially the same as before with the additional step of adding the fixed work Modulo 2 as the last step in the encryption process and the first step in the decryption process.

Figure 13:
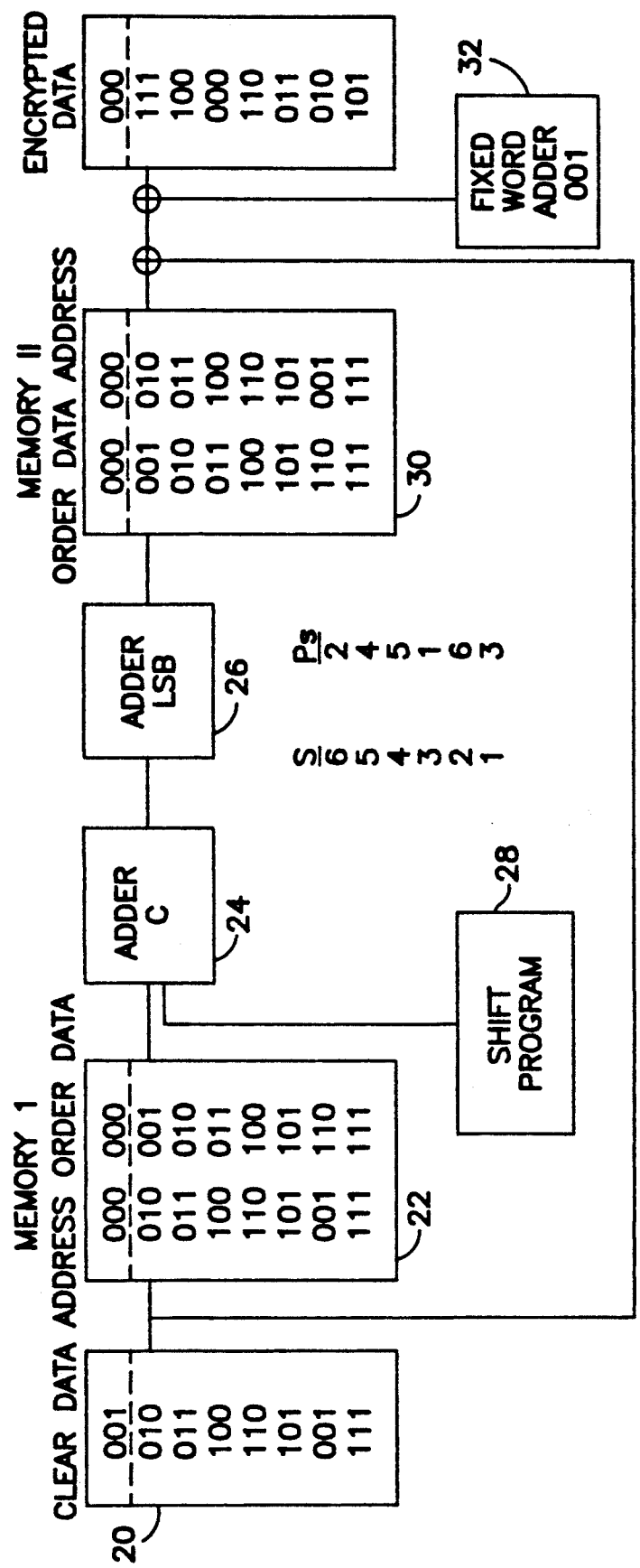
FIG. 13 is an example of encryption using FIG. 11.
Figure 14:
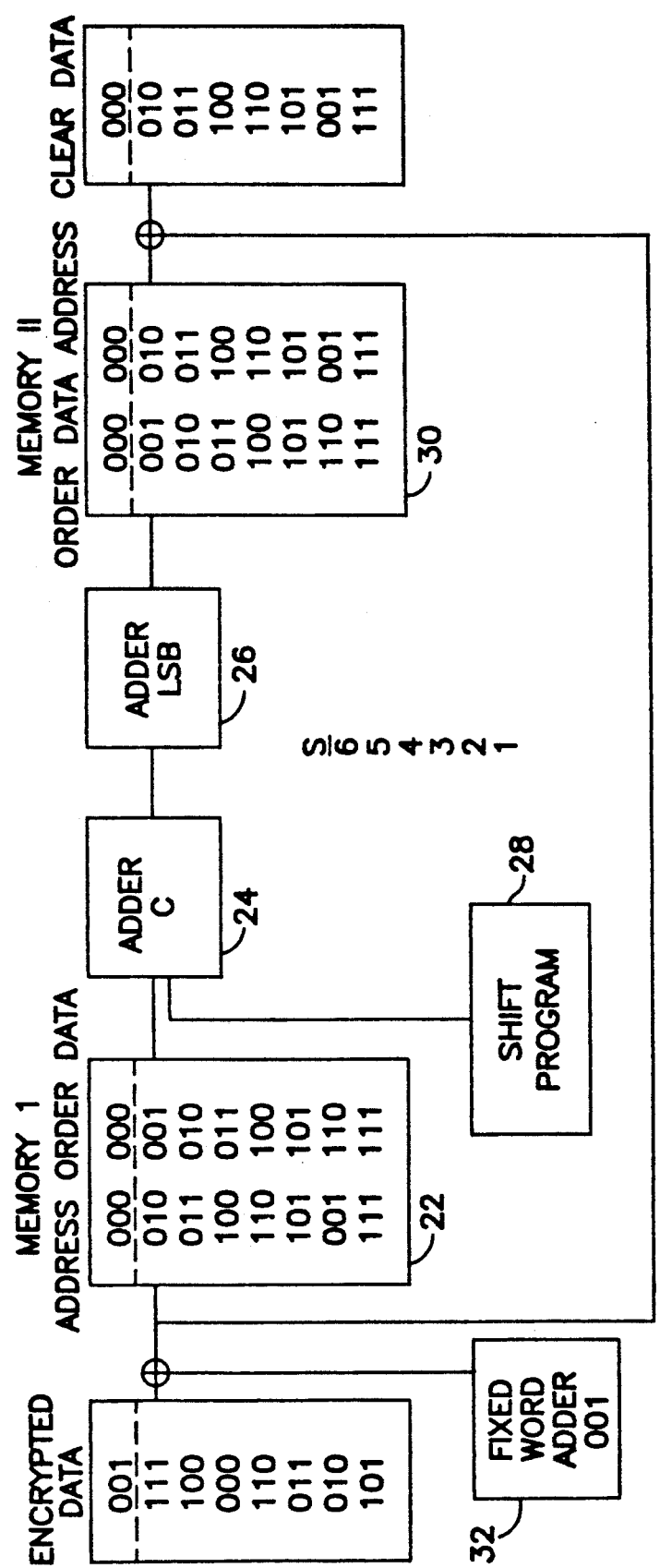
FIG. 14 is an example of encryption using FIG. 12.

An example is shown in FIG. 13 and 14. In this case, 000 no longer remains fixed, but is transformed into 001. Now 110 is transformed to itself and thus becomes fixed in this case.

The fixed word adder can add in succession any or all of the n bit words in whatever order is selected by the user.

Now referring to FIG. 8, as an example, a block diagram of a system for carrying out encryption in accordance with the encryption and decryption techniques discussed so far may be seen. As shown in the figure, any value of the clear data 20, except 000, is provided as an address to memory 22. Stored at the various memory addresses is the order data for the clear data value, that is, the position, expressed as a binary number, of that clear data value in the ordered sequence of the right column of FIG. 4 (and FIGS. 5 and 10). This position is provided as an output of the memory 22 to an adder shown as the combination of adders 24 and 26. The adders are coupled to add the output of the memory to a value of shift $P_s$ as controlled by shift programmer 28. This addition is not a modulo 2 addition but rather is the normal binary add, with the one exception that the carry from the most significant bit is coupled to the carry in of the least significant bit. Thus, the adder will provide the result 001 as the sum 1 larger than 111, not 1000 or simply 000. Thus, it may be seen that the output of the adders is a new three bit binary number shifted in the order data sequence by an amount $P_s$. This new position is then used as the address for memory 30, which provides as its output the three bit binary number corresponding to the value in column 2 of FIG. 4, or the corresponding clear data value in FIG. 3. Thus, by way of example, if the clear data value is 010, that value as an address to memory I provides the location of that value of 001 in the sequence. If the shift program selects S=6, then $P_6=2$ and column 3 is shifted downward two positions from column 2 or by an amount 010. The three bit binary number which would then be adjacent to the clear data value of 010 is 100 as in FIG. 5. This added modulo 2 to the clear data 010 provides an encrypted value of 110, corresponding to the value shown in FIG. 5. However, if the clear text data value is 000, that value as an address to Memory I provides the location of the value of 000 in the sequence. It is not shifted but provided unchanged as the order data in memory 30. Thus 000 added to itself, remains fixed.

The downward shift $P_s$ of the sequence of column 3 of FIG. 5 in comparison to the basic order data of column 2 of FIG. 5 of course corresponds to a complimentary upward shift. Thus, for an n bit block, a downward shift of $P_s$ is equivalent to an upward shift of m-$P_s$. Note also that for a three bit block, all values of possible shift provide the desired one-to-one mapping except for a shift of the first column with respect to the second column of zero, and of 7 and multiples thereof, as such shifts would provide a second column in the matrix having each row the same as the corresponding row of the first column, and any number added to itself modulo 2 will be zero. Thus, for a shift of seven or multiples thereof, all clear data values map to 000, useless for encryption purposes. In general however, it will be shown later that for n bit blocks larger than three bits, all shifts other than zero and integer multiples of m give the desired result and thus are usable in accordance with the original invention.

The block diagram for decryption in accordance with FIG. 7 is shown in FIG. 9. From a hardware standpoint, this diagram is exactly the same as that of FIG. 8 for encryption, the decryption differing only in the shift S applicable for a given shift $P_s$ for encryption. As in the example on page 14, for a shift $P_s$ of 2 for encryption, a shift 6 provides the proper decryption, etc., as shown in the tables of FIGS. 8 and 9. Obviously, the encryption hardware and the decryption hardware must be using the associated shifts for the clear data to be properly recovered on decryption, though the applicable shift may be varied frequently at both ends to make cryptanalysis very difficult, if not virtually impossible.

If one adds modulo 2 a fixed number to any pair of columns of FIG. 5, a still further one-to-one transformation results. By way of example, in FIG. 10 the fixed number 001 has been added modulo 2 to the first and second columns of FIG. 5. Now 010 as a clear text word maps into an encrypted word 111, whereas in the example of FIG. 8, 010 mapped into 110.

An example of a block diagram for the encryption using a fixed word adder may be seen in FIG. 13. This figure is identical to FIG. 8 with the exception that the fixed word adder 32 has been included to add the fixed word (001 in the example) to the output of memory 30 corresponding to the value in the same row of the second column as 010 of the first column. Thus, the fixed word adder merely adds the fixed word (001 in the example) to the column 2 value, after which the clear text word is added modulo 2 thereto to obtain the encrypted data. Again for the example, using clear data of 010 as the address to memory 22, the output of the memory will be 001. Using the same shift as in the example of FIG. 8, 010, $P_s=2$ is added to the 001, to provide an address to memory 30 of 011. This results in an output from memory 30 of 100, to which fixed word adder adds modulo 2, the fixed word 001, yielding 101. This added modulo 2 to the clear text word 010 gives the encrypted word 111 as shown in FIG. 10.

A block diagram for decryption, corresponding to the block diagram for encryption of FIG. 13, is shown in FIG. 14. As may be seen, FIG. 14 is identical to FIG. 13 (though the shifts for decryption are again different from the shifts for encryption), with the exception of the fixed word adder also adding modulo 2 the fixed word to the encrypted data before the same is applied to memory 22. This modulo 2 addition is in essence the second modulo 2 addition of the fixed word, as a first modulo 2 addition of the fixed word was done in FIG. 11 to get the encrypted word. Thus, since a second modulo 2 addition of the same word in effect cancels the first modulo 2 addition so that after the encrypted data in FIG. 12 has the fixed word added modulo 2 thereto, the result of that modulo 2 addition may be used with the equations of FIG. 10 for decryption purposes. Thus, by way of example, using the encrypted word 111 of the example of FIG. 13, $111 \oplus 001 = 110$ as the address to memory 22 of FIG. 14. This gives a memory output of 100, to which the value of $S=6$ or 110 is added. $100 + 110 = 1010 > 011$ with wrap-around. This in turn gives an address of 011 to memory 30 or an output thereof of 100, to which is added modulo 2 110, the address to memory 22, to recover the clear text data 010. Further of course, while the fixed word adder of FIGS. 13 and 14 used a fixed word 001, any other 3-bit fixed word may be used, or for that matter, the fixed word may be varied from time to time with or separate and apart from variations in the shift, a fixed word of 000 essentially reducing the operation of the system to that of FIGS. 8 and 9.

Obviously, the methods described in relation to FIGS. 6, 7, 11 and 12 may readily be carried out with a microprocessor based system under program control. Alternatively, the memory could readily be preprogrammed in read only memory used essentially as look-up tables, and the adders and modulo 2 adders could readily be conventional adder circuitry so that at least the major elements of an encryption and decryption system could be realized in either high speed discrete components or through a custom integrated chip. The shift program also could take various forms depending upon how often a shift is desired, the extent to which the shift order is itself varied, etc., microprocessor based, integrated circuits or other realizations being readily applicable, including shift register implementations as desired.

II. NON-LINEARIZATION OVERVIEW

In Appendix 1 which follows, the transformations herein before described are further analyzed and various properties and characteristics thereof are set forth.

In Appendix 2, certain aspects of the method of block substitution of the grand-parent application are reviewed, and the concepts of non-linearity and nonlinear mappings of clear text to encrypted text (and vice versa) are presented. Non-linearity in this sense means that the mappings of clear text to encrypted text (and from encrypted text to clear text) are nonlinear under the operation of bit-wise addition modulo 2. In that regard, it was pointed out that FIG. 1 illustrates a many-one transformation of one set of three bit binary numbers to another set of binary numbers by a modulo 2 addition. This specific example maps the eight possible values of the three bit numbers in the first column by modulo 2 addition to six three bit numbers in column 3 representing six of the eight possible combinations, with two (100 and 011), each being repeated twice. Because two three bit numbers (010 and 101) map to the same three bit number (100), and two other three bit numbers (100 and 110) map to the same three bit number (010), the reverse mapping will have ambiguities, making the mapping illustrated in FIG. 1 unsuitable for encryption and decryption purposes.

On the other hand, FIGS. 2 through 5 provide sets of equations for encryption of any of the eight possible three bit clear text words (column 1) to a corresponding non-ambiguous encrypted text word (column 3). These equations remain valid by the interchanging of columns 1 and 3, and thus with this interchange, form the equations for the corresponding decryption in the same way that the equations before the interchange form the equations for encryption. However, the set of equations shown in each of FIGS. 2 through 5 are linear in the sense that the addition of any two equations within a given set of equations (eight equations for three bit numbers such as in FIGS. 2 through 5) is also one of the equations of the set. For instance, in FIG. 2, while the addition of the first or null equation to any other equation yields that other equation and is thus trivial, the addition of the second and third equations provides the fourth equation, the addition of the third and fourth equation provides the second equation, the addition of the fourth and fifth equation provides the eighth equation, etc. Even when one adds modulo 2 one equation to itself, one obtains one of the eight equations, namely the null equation, as may occur when one adds more than two equations modulo 2 such as, by way of example, equations two, three and four, as the addition of equations two and three yields equation four, and equation four added to itself yields the null equation. In that regard, adding two equations modulo 2 may be considered equivalent to adding any greater number of equations, as either or both of the equations added may be considered to be the sum of two or more other equations. Further, there is no combination of equations the sum of which is not another equation in the given set. What is most significant from a cryptanalysis standpoint is that given the right three of the seven equations other than the null equation, the remaining four equations may be determined by the appropriate sums of the combinations of the three known equations. For instance, while the combinations of sums of equations two, three and four of FIG. 2 cannot be used to generate the rest of the equations, equations two, three or four, and five, six, seven or eight can be so used. Taking for example, equations two, four and eight, the sum of equations two and four provides equation three, the sum of equations two and eight provides equation seven, the sum of equations two, four and eight provides equation six, and the sum of equations four and eight provides equation five. Also the foregoing rule, of course, applies to encryption of words of other bit lengths, the generating equations for the sixteen equations for encryption of a four bit word being determined by adding modulo 2 various combinations of four independent equations.

With respect to the set of equations in FIG. 10, adding any two equations does not provide a third equation of the set, though adding 001 to each of the left hand columns of the FIG. 10 again provides the null equation and the rest of the set of equations of FIG. 5, which set is generally able by any three independent equations of the set. It is this ability to generate the remainder of the equations from a basic set of independent equations which the present invention is intended to avoid, the present invention doing so in an orderly and logical manner so that not only may the base set of linear equations be varied from time to time or dynamically in the various ways disclosed in the original application, but the resulting base set may also be non-linearized from time to time or dynamically to a varying extent and in varying combinations, making cryptanalysis much more difficult than before.

Figures 15, 17:
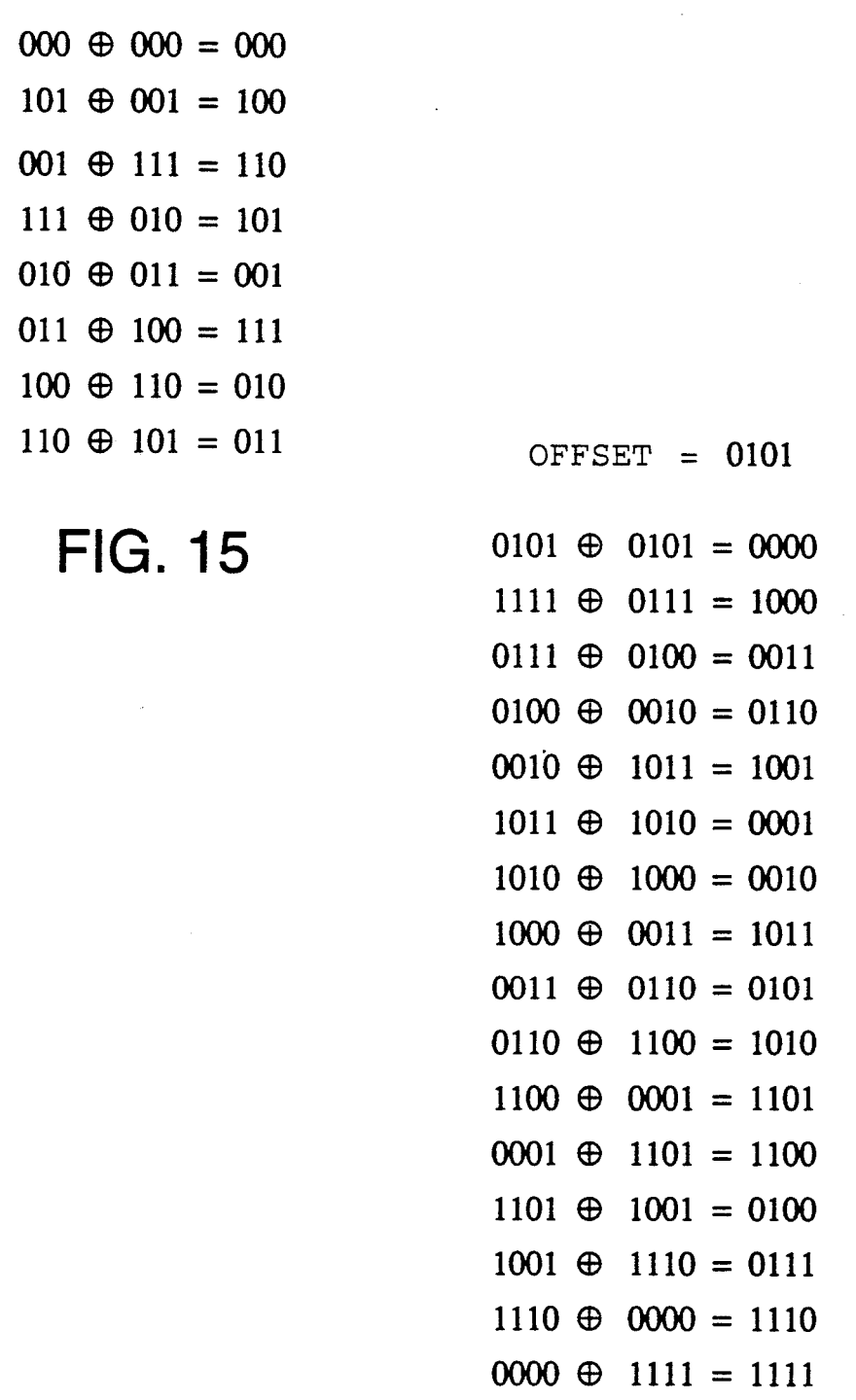

Referring again to FIG. 2, if one rearranges the order of the equations, there is, of course, no change in the mapping of the numbers in column 1 to the numbers in column 3. Accordingly, the equations in FIG. 2 may be rearranged as shown in FIG. 15. In particular, it will be noted that, neglecting the null equation, the first number appearing in column 2 (001) occurs in the next line of column 1, the second number in column 2 (111) occurs in the third line of column 1, etc., the wraparound resulting in the last number in column 2 (101) falling on the first line of column 1 (again neglecting the null equation). The resulting organization of the equations is in the form illustrated on page 7 of Appendix 2, where in FIG. 15, $x_1$ is 001 and $x_m$ is 101. Any set of equations for words (numbers) of any bit length having a null equation and $2^n-1$ non-zero equations may be so arranged without any changing of the mapping defined thereby, as such an arrangement is a mere changing of the order of appearance of the equations and not a changing of any of the equations themselves.

It is shown in Section 3.2 of Appendix 2 that certain groups of such equations may be altered by rearrangement of the words appearing in columns 1 and 2 to provide correspondingly new modulo 2 addition equations, which when substituted for the original group of equations within the original set of equations still maintains a one to one mapping and thus is suitable for use in encryption and decryption. In that regard, the one to one mapping is preserved because the order of the multi-bit words appearing in columns 1 and 2 of the selected group of equations is changed, but not the words themselves, so that the group of words mapped and the group of words to which they are mapped by the selected equations has not been changed, though within those two groups, which word in column 1 maps to which word in column 3 has been changed. The net effect of these changed equations is that the same no longer are linear extensions of the unchanged equations, that is, the same can no longer be generated by the addition of two or more of the unchanged equations. This, therefore, breaks up the linearity of the original set, the possible extent of which will be subsequently discussed, making the cryptanalysis more difficult as desired.

It is shown in Section 3.2 of Appendix 2 that under certain conditions, groups of equations within a given set may be altered and used to replace the corresponding original group of equations within the original set so as to maintain a one to one mapping for the complete set, and at the same time break up the linear characteristic of the set of equations as herein before described. These conditions are more specifically illustrated in equation form in Section 3.3 of Appendix 2, wherein the two possible modifications are illustrated in equation form. The basic concept is to take sums of consecutive triples of rows in the original set of equations, with the analysis in Section 3.2 of Appendix 2 showing that, as stated in Section 3.3, the non-linearization by taking such consecutive triples of rows works if, and only if, a set of only three or four consecutive rows of the original set are used. If three consecutive rows are used, four rows are actually modified, namely the three consecutive rows of the original set, together with a fourth row corresponding to the vector sum modulo 2 of the three consecutive rows. The modification can be obtained by adding vectorially to each of the four rows, the following equation:

$$(x_1 \oplus x_2) \oplus (x_1 \oplus x_2) = \Theta \qquad (8)$$

If four consecutive rows of the original set of linear equations are used, six rows of the original set of equations are modified, namely the four consecutive rows, together with the row representing the vector sum of the first three of the four consecutive rows, and the row corresponding to the vector sum of the last three of the four consecutive rows of the original set (e.g. the row corresponding to the sum of rows 1, 2 and 3, and the row corresponding to the sum of rows 2, 3 and 4, as shown on page 10 of Appendix 2). The modification in this case may be obtained by adding vectorially to the corresponding six rows the following:

$$\begin{array}{ll} \text{to rows 1 and } q & (x_1 \oplus x_2) \oplus (x_1 \oplus x_2) = \Theta \\ \text{to rows 2 and 3} & (x_1 \oplus x_3) \oplus (x_1 \oplus x_3) = \Theta \\ \text{to rows 4 and } q+1 & (x_2 \oplus x_3) \oplus (x_2 \oplus x_3) = \Theta \end{array} \qquad (9)$$

The form of the equations above and the original equations shown on page 10 of page A2 of Appendix 2 suggests that non-linearization works if one takes the first, second, third and one other row of the original set of linear equations, or alternatively, if one takes the first, second, third, fourth and two other rows of the original set of linear equations. Since the method works because the equations in the original set as selected for modification are linear within themselves, equations once non-linearized by the methods of the present invention may not be again used as part of the non-linearization process. This would tend to suggest that only four or six equations could be non-linearized by this process, which of course would be an insignificant number of the total equations for larger word sizes (for instance, a four bit word requires 16 equations, an eight bit word 256 equations, etc.). However, again referring to FIG. 15, it is to be noted that which word or number in column 2 is to be selected from the non-null rows as $x_1$ is arbitrary. By way of example, if one selected 011 as $x_1$ rather than 001, the third non-zero line would become the first, the fourth non-zero line the second, the fifth non-zero line the third, the sixth non-zero line the fourth, the seventh non-zero line the fifth, the first non-zero line the sixth, etc., essentially shifting the lower five equations up and wrapping the upper two non-zero equations around, with the result that the equations themselves are not changed, nor is the ordering of the equations, but rather only the starting point in that sequence is changed. Such an arrangement of equations was shown in FIG. 3, wherein $x_1=100$ and $x_m$ ($=x_7$)$=011$. Thus the equations presented on page 10 of Appendix 2 are general in the sense that if three consecutive rows and the row corresponding to the sum of the three consecutive rows are to be modified (non-linearized) any three consecutive rows may be so selected, limited only by the fact that none of the three selected nor the row corresponding to the sum of the three can have previously been non-linearized as a result of an earlier selection. Similarly, if four consecutive rows plus the two sum rows herein before described are selected, any four consecutive rows may be so used, again provided that none of the four selected nor of the two sum rows may have previously been non-linearized by this process. To generalize the equations for non-linearization, one need only consider $x_1$ as being the value in the second column of the first of the three or four successive rows selected, and renumbering values in each column accordingly.

It will be noted that the non-linearization process is carried out on the equations other than the null equations. Since there are $2^n-1$ such equations, wherein n is the bit length of the word used, there is necessarily an odd number of equations available for non-linearization regardless of the value of n, whereas the non-linearization process non-linearizes an even number (4 or 6) equations at a time (obviously in a high speed system, apparatus may be provided to simultaneously non-linearize different non-overlapping groups of a given set of linear equations, as the non-linearization processes for non-overlapping groups are totally mutually independent, regardless of which process is used). Thus, it is clear that not all equations in any given linear set may be non-linearized. Consequently, there is a question as to how many of the equations may be non-linearized, and whether there is a logical manner of selecting equations for non-linearization. These considerations are discussed in Sections 3.4 through 3.6 of Appendix 2. In general, while not all equations may be non-linearized, normally a vast majority of the equations may be non-linearized for word sizes of four or more bits, leaving the remaining non-linearized equations of little significance, and perhaps if anything, possibly misleading from a cryptanalysis viewpoint. Further of course, it should be noted that varying from time to time or dynamically varying the number and identification of the rows to be non-linearized and which non-linearization technique is used further compounds the cryptanalysis problem, though such time varying or dynamically varying non-linearization is not that difficult from a hardware standpoint (or software standpoint, if done under software control) as the starting set of linear equations (which themselves may be varied from time to time or dynamically, as herein before described) may be generated from a simple and readily variable generating function, which set of equations may be non-linearized in both manner and extent utilizing logical processes, which manner and extent may each themselves be varied from time to time or dynamically.

As an example of the foregoing, attention is directed to the table on page A1 (Appendix A of Appendix 2 hereof) which provides the sixteen equations for the linear mapping of a four bit number or word to another four bit number or word utilizing a specific generating function. Note that these sixteen equations are organized in the manner indicated for the original equations on page 10 of Appendix 2. As noted on page A1, it is easily verified that the sum of any two of the sixteen equations on page A1 is another of the sixteen equations in accordance with the concept of linearity as used herein. This table on page A1 is non-linearized as described on page A8 and is presented in its non-linearized form on page A9 of Appendix 2. In particular, the non-linearization is in accordance with the first method, namely, utilizing three consecutive rows of the original set of equations (neglecting the null equation), plus the row representing the sum of the first three rows. In that regard, the sum modulo 2 of the first three non-zero numbers in column 1 (1001, 0001 and 0010) is equal to 1010, the value in the eleventh row of the non-zero equations. Thus rows one, two, three and eleven are non-linearized by adding modulo 2 $x_1 \oplus x_2$ to each of columns 1 and 2 thereof. To be more specific, $x_1$ equals 0001 and $x_2$ equals 0010, so that $x_1 \oplus x_2 = 0011$. Adding modulo 2 0011 to the first equation gives $1010 \oplus 0010 = 1000$ (1000 is the original value in column 3 for the first equation) as shown in the table on page A9. The same addition for the equations on lines 2, 3 and 11 carries out the transformation for these four lines. Similarly, if one adds lines 5, 6 and 7 of the non-zero equations, one obtains the equation of line 15 of the non-zero equations, the last non-zero equation shown on page A1. These four lines may be non-linearized in the same manner as lines one, two, three and eleven, noting however that the applicable equation is effectively now:

$$(x_5 \oplus x_6) \oplus (x_5 \oplus x_6) = \Theta \qquad (10)$$

With respect to further non-linearization of the set of sixteen equations on page A9 of Appendix 2, there are two other series of three consecutive equations in the table, specifically, lines 8, 9 and 10 and 12, 13 and 14 which might be considered. The modulo 2 sum of lines 8, 9 and 10 however, provide line 3 of the non-zero equations, a line already used, and the modulo 2 sum of lines 12, 13 and 14 provide line 7, another line already used. Accordingly, while two additional groups of three consecutive lines or three consecutive equations exist, the same cannot be used for further non-linearization because the sum of either of the three is a line or equation which has already been non-linearized.

As another example, note the table set out at the top of page A4 of Appendix 2 hereof. This set of linear equations uses the same generating function but as applied to a new base (see the bottom of page A3 of Appendix 2), which when non-linearized using the same set of equations as in the previous example (equations 1, 2, 3, 5, 6, 7, 11 and 15) provides the nonlinear set of equations set forth on page A11 of Appendix 2.

As a third example, note the example described near the bottom of page A11, with the non-linearized equations shown on page A12. This example is an example of another non-linearization of the table of 15 equations (together with the null equation) presented on page A1 of Appendix 2, non-linearized using a different basis, specifically four successive (non-zero) equations 1, 2, 3 and 4 together with the sum of 1, 2 and 3, namely Equation 11, and the sum of equations 2, 3 and 4, namely Equation 12, together with the three successive equations 13, 14 and 15 and the sum thereof, Equation 8. The equations for non-linearizing four consecutive equations plus the two modulo 2 sum equations of course have been given before herein and are set out on page 10 of Appendix 2. In particular, three different equations are used, one for rows 1 and q, one for rows 2 and 3, and one for rows 4 and q+1. By way of example, taking row 1, zero is added to column 3 and $x_1 \oplus x_2$ is added modulo 2 to each of columns 1 and 2 (the modulo 2 sum of anything to itself equaling zero). Since $x_1 \oplus x_2 = 0011$, adding this to Equation 1 yields the equation $1010 \oplus 0010 = 1000$, the first non-zero equation in the non-linearized set of equations on page A12 of Appendix 2. For row 2 of the linear set of non-zero equations, $x_1 \oplus x_3$ is added to each of columns 1 and 2, namely $0001 \oplus 0100 = 0101$. Adding this to columns 1 and 2 of row 2 of the linear set of equations of page A1 yields the fifth non-zero equation in the set of equations on page A12. Finally, as an example of the use of the third equation for rows 4 and q+1, $x_2 \oplus x_3 = 0010 \oplus 0100 = 0110$. Adding this, for example, to columns 1 and 2 of row 4 of the linear non-zero equations yields row 2 of the non-zero equations in the non-linearized set of equations on page A12. Of course all six of the applicable rows must be modified in accordance with the non-linearization process. Thus, in this latter example, 10 of the equations are non-linearized instead of the 8 in the prior example, and of course the resulting mapping from column 1 to column 3 is generally quite different for the two sets of equations.

Finally, the non-linearized equations may be further modified by adding modulo 2 an offset to each of the first two columns. This, of course, is equivalent to adding the offset modulo 2 to itself which of course is 0 and therefore does not affect the numbers in the third column. By way of specific example, FIG. 17 presents the set of equations of the third example described above and shown on page A12 of Appendix 2 as modified by the addition of the offset 0101 to the first and second columns.

Figure 16:
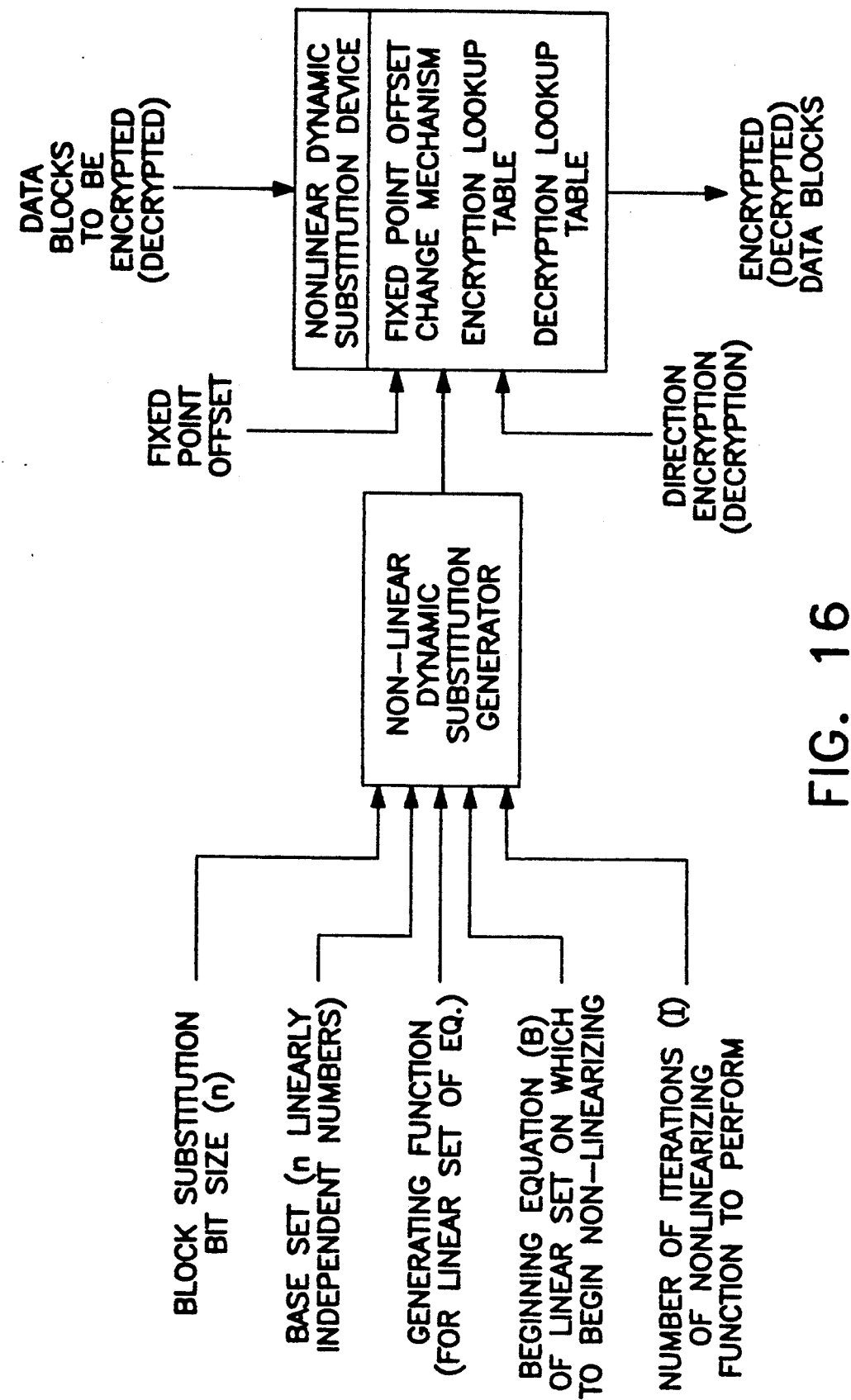
FIG. 16 is a block diagram of a system for encryption and decryption in accordance with the present invention.

FIG. 16 shows a block diagram of typical apparatus for encryption and decryption in accordance with the present invention of the parent application. As may be seen in FIG. 16, it is convenient to ultimately use a look-up table in the form of a read/write memory wherein the clear text data block or the encrypted text data block (both n bits long) is presented in parallel as the address to the memory with the data stored at the corresponding address corresponding to the encryption or decryption of the respective data block, respectively. For that purpose, it may be convenient to use a memory of twice the address space of that required for either encryption or decryption (e.g. n+1 address bits) so that the memory address range is one bit wider than the data block to be operated on. In this manner, one bit of the memory address may be used to designate whether the operation is to be an encryption or a decryption operation. By way a specific example, the most significant bit of the memory address might be 0 to indicate a decryption process or a 1 to indicate an encryption process, with the decryption data stored in the lower half of the address range of the memory and the encryption data stored in the upper address range of the memory. Thus both encryption and decryption may be done as desired by the look-up table by control of the single bit, and encryption or decryption of a block of n bits may be achieved in a single memory cycle.

Assuming that the mappings for encryption and decryption are to be changed periodically and/or dynamically, some method of altering the contents of the look-up table must be provided. While this could be done by specialized hardware, it is convenient to do the same by an appropriate processor under program control, as the alteration of the encryption and decryption schemes normally will occur far less frequently than the encryption and decryption process itself must be carried out. Accordingly, the same normally need not be accomplished with the same speed as encryption and decryption itself. Accordingly, the nonlinear dynamic substitution generator shown in FIG. 16 may operate under program control based on various inputs thereto. In particular, the equation for encryption may readily be generated under program control given certain basic information defining the same, such as by way of example the block substitution bit size (n), the base set of n linearly independent numbers, the generating function, the beginning equation of the linear set on which to begin non-linearizing, and the number of iterations of the non-linearizing function to perform.

Once the offset has been applied to the non-linearized equations, each number or block in column 3 is stored in the portion of the look-up table assigned to encryption at an address equal to the block in column 1 for the respective row. Thus, when a number or block in column 1 is applied as the address, the number read out of the memory is the number in column 3 for that row representing the respective encrypted block. For the decryption portion of the table, the process is reversed, in that the blocks in column 3 are used as memory addresses (more appropriately address portions, the full address including the address bit designating decryption) with the data stored at those addresses being the respective blocks in column 1. Thus, during decryption the memory is entered at the address defined by the encrypted block, with the data stored at the respective address being provided as the output corresponding to the associated clear text block. For convenience, detailed methods for encryption and decryption are set out in Appendix 3.

Obviously the encryption and decryption processes could be carried out entirely under program control, as both processes simply involve logical manipulations given certain (variable) starting information. However, the speed with which encryption and decryption could be carried out would be very grossly reduced, as the processor would wind up regenerating the same encryption and decryption equations over and over again. In comparison, the use of the look-up table allows a one time determination of the full set of encryption and decryption equations, which information for any data block to be encrypted or de-encrypted is continuously available in a single memory cycle until such time as the equations are to be changed.

III. MODIFICATIONS OF LINEAR ORTHOMORPHISMS

In this section, certain modifications to the linear orthomorphisms described above in sections I and II are provided.

Without loss of generality, and using $\theta$, the additive identity, as the fixed point, any maximal length orthomorphism can be written as a set of equations:

$$\begin{aligned} \theta \oplus \theta &= \theta \\ x_m \oplus x_1 &= z_1 \\ x_1 \oplus x_2 &= z_2 \end{aligned} \quad (11a)$$

-continued $$\vdots$$
$$x_{k-1} \oplus x_k = z_k$$
$$\vdots$$
$$x_{m-1} \oplus x_m = z_m$$

where $m=2^n-1$. $R(x_{k-1})=x_k$ and $S(x_{k-1})=z_k$ are two of three possible mappings. By convention, $S(x)$ has been used as our cryptographic mapping or block substitution.

In the case of a linear orthomorphism, $\theta$, must be the fixed point, and if maximal, the representing equations take a very simple form:

$$\begin{aligned}\theta \oplus \theta &= \theta \\ x_m \oplus x_1 &= x_{1-p} \\ x_1 \oplus x_2 &= x_{2-p} \\ &\vdots \\ x_{k-1} \oplus x_k &= x_{k-p} \\ &\vdots \\ x_{m-1} \oplus x_m &= x_{m-p}\end{aligned} \quad (11b)$$

One can construct nonlinear orthomorphisms by suitably modifying the linear versions. Choose any n-bit number $w \neq \theta$ and consider the equation $w \oplus w = \theta$ as a vector. Add $w \oplus w = \theta$ vectorially to each of the equations representing the linear orthomorphism in Equation (11) to obtain:

$$\begin{aligned} w \quad &\oplus \quad w \quad= \theta \\ (x_m \oplus w) \quad &\oplus \quad (x_1 \oplus w) \quad= x_{1-p} \\ (x_1 \oplus w) \quad &\oplus \quad (x_2 \oplus w) \quad= x_{2-p} \\ &\vdots \\ (x_{k-1} \oplus w) \quad &\oplus \quad (x_k \oplus w) \quad= x_{k-p} \\ &\vdots \\ (x_{m-1} \oplus w) \quad &\oplus \quad (x_m \oplus w) \quad= x_{m-p}\end{aligned} \quad (12)$$

Each column consists of all possible n-bit numbers and the mapping $S(x_{k-1} \oplus w) = x_{k-p}$ is affine. To be more generally nonlinear, the linear array of equations would have to be broken into subsets and modified in different ways. An individual equation from the ath row in the linear orthomorphism:

$$x_{a-1} \oplus x_a = x_{a-p} \quad (13)$$

must be modified to become:

$$x_{c-1} \oplus x_b = x_{a-p} \quad (14)$$

where $x_{c-1}$ occurs in the left column, row c, and $x_b$ occurs in the middle column, row b in the original linear orthomorphism. In this case:

$$w = (x_{a-1} \oplus x_{c-1}) = (x_a \oplus x_b) \quad (15)$$

which is applied to transform the equation in row a in the same way as those in Equation 12.

The entire set of $2^n$ equations in the linear orthomorphism is corruptible, and from Equation (10), the smallest candidate for a corruptible set consists of three rows or equations. However, a linear orthomorphism containing a corruptible set of three equations may not be useful for cryptography because it would not be maximal.

Proposition 1: It can be shown that a linear orthomorphism on $Z_2^n$ which has a corruptible set of three equations has a 3-cycle in the permutation which it represents.

The following analysis establishes the foregoing Proposition 1. A corruptible set of three equations in a linear orthomorphism:

$$x_{a-1} \oplus x_a = x_{a-p} \quad (16)$$
$$x_{b-1} \oplus x_b = x_{b-p}$$
$$x_{c-1} \oplus x_c = x_{c-p}$$

can be shown by a matrix of indices:

$$\begin{pmatrix} a & a & a \\ b & b & b \\ c & c & c \end{pmatrix} \quad (17)$$

After non-linearization (corruption), only two matrices of indices are possible since the order of the rows is immaterial:

$$\begin{pmatrix} c & b & a \\ a & c & b \\ b & a & c \end{pmatrix} \text{ or } \begin{pmatrix} b & c & a \\ c & a & b \\ a & b & c \end{pmatrix} \quad (18)$$

Taking the matrix on the left, the corresponding corrupted equations are:

$$x_{c-1} \oplus x_b = x_{a-p}$$
$$x_{a-1} \oplus x_c = x_{b-p}$$
$$x_{b-1} \oplus x_a = x_{c-p} \quad (19)$$

Any two equations with indices a and b can be selected but there are three conditions on equation c which may be conflicting. In what follows, it is assumed that such an equation exists in the linear array. Since the linear array of equations is a group, there exists a fourth equation in the group of index d which is the sum of the original three:

$$x_d = x_a \oplus x_b \oplus x_c \quad (20)$$

and $$x_{d-1} \oplus x_d = x_{d-p} \quad (21)$$

These four equations in the linear array form a coset derived from a subgroup of order 4 in the linear array. The sub-group can be found by adding one of the four equations in the coset to the other three, e.g., equation a to obtain:

$$\begin{array}{ccccc}
\theta & \oplus & \theta & = & \theta \\
(x_{a-1} \oplus x_{b-1}) & \oplus & (x_a \oplus x_b) & = & (x_{a-p} \oplus x_{b-p}) \\
(x_{a-1} \oplus x_{c-1}) & \oplus & (x_a \oplus x_c) & = & (x_{a-p} \oplus x_{c-p}) \\
(x_{b-1} \oplus x_{c-1}) & \oplus & (x_b \oplus x_c) & = & (x_{b-p} \oplus x_{c-p})
\end{array} \quad (22)$$

Using Equation 19, the subgroup becomes:

$$\begin{array}{ccccc}
\theta & \oplus & \theta & = & \theta \\
(x_{a-1} \oplus x_{b-1}) & \oplus & (x_a \oplus x_b) & = & (x_{a-p} \oplus x_{b-p}) \\
(x_a \oplus x_b) & \oplus & (x_{a-p} \oplus x_{b-p}) & = & (x_{a-1} \oplus x_{b-1}) \\
(x_{a-p} \oplus x_{b-p}) & \oplus & (x_{a-1} \oplus x_{b-1}) & = & (x_a \oplus x_b)
\end{array} \quad (23)$$

The last three equations appear consecutively in the normalized form of the linear array (Equation 19) and form a 3-cycle. If the other matrix of indices is used, the left and middle columns can be interchanged, still maintaining equality and the same result is obtained.

The foregoing proposition also follows recognition that in a maximal linear array of block size n, any n consecutive rows are linearly independent. Since a subgroup of order 4 cannot have three linearly independent rows, the array cannot be maximal.

Now, considering a coset of four rows a, b, c, and d and modifying the first three as above, the result is:

$$x_{c-1} \oplus x_b = x_{a-p}$$

$$x_{a-1} \oplus x_c = x_{b-p}$$

$$x_{b-1} \oplus x_a = x_{c-p}$$

$$x_{d-1} \oplus x_d = x_{d-p} \quad (24)$$

Comparing Equation 24 with the linear version (Equation 11), the following mixing transformations can be derived:

$$w_a = x_{a-1} \oplus x_{c-1} = x_a \oplus x_b$$

$$w_b = x_{a-1} \oplus x_{b-1} = x_b \oplus x_c$$

$$w_c = x_{b-1} \oplus x_{c-1} = x_a \oplus x_c$$

$$w_d = \theta \quad (25)$$

Since $w_c = w_a \oplus w_b$, the set of mixing transformations $\{\theta, w_a, w_b, w_c\}$ is a group.

Any three consecutive rows plus their sum constituted a corruptible set (see Appendix II, section 3.2). This is generalized to taking any two non-zero rows (see Appendix IV, section II):

$$x_{a-1} \oplus x_a = x_{a-p}$$

$$x_{b-1} \oplus x_b = x_{b-p} \quad (26)$$

Finding the third row c, specified by:

$$x_{c-1} \oplus x_{a-p} = x_b \quad (27)$$

and, the fourth row d, specified by:

$$x_d = x_a \oplus x_b \oplus x_c \quad (28)$$

Thus, any two arbitrarily selected non-zero rows in the linear orthomorphic array of equations specify two corruptible sets of four equations. The second of these sets is specified by selecting the third row c by:

$$x_{c-1} \oplus x_a = x_{b-p} \quad (29)$$

In either, as shown in Appendix IV, the mixing transformation $w \equiv x_a \oplus x_b$ transforms this set of four equations into a 4-equation segment of a nonlinear orthomorphism. The original four equations are clearly the relative complement of a subgroup of order 4, or equivalently, a coset derived from such a subgroup. As in Proposition 1 above, the subgroup can be derived by adding one of the four equations to each of them, e.g., row a:

$$\begin{array}{ccccc}
\theta & \oplus & \theta & = & \theta \\
(x_{a-1} \oplus x_{b-1}) & \oplus & (x_a \oplus x_b) & = & x_{a-p} \oplus x_{b-p} \\
(x_{a-1} \oplus x_{c-1}) & \oplus & (x_a \oplus x_c) & = & x_{a-p} \oplus x_{c-p} \\
(x_{a-1} \oplus x_{d-1}) & \oplus & (x_a \oplus x_d) & = & x_{a-p} \oplus x_{d-p}
\end{array} \quad (30)$$

In the first case, since $x_{a-1} \oplus x_{c-1} = x_a \oplus x_b$, the second and third equations are consecutive in the linear array. A similar result holds in the second case. Thus, the process of finding four corruptible equations reduces to finding any coset in the coset decomposition of $Z_2^n \times Z_2^n \times Z_2^n$ defined by a sub-group of order 4 with two consecutive rows. More generally, let $G^n = Z_2^n \times Z_2^n \times Z_2^n$ be a maximal linear orthomorphism and let $G_0^k = L_k \times M_k \times R_k$ be a subgroup of order $2^k$. The subgroup has the form:

$$\begin{array}{ccccc}
L_k & & M_k & & R_k \\
\theta & \oplus & \theta & = & \theta \\
x_{i1-1} & \oplus & x_{i1} & = & x_{i1-p} \\
\cdot & & & & \\
\cdot & & & & \\
\cdot & & & & \\
x_{is-1} & \oplus & x_{is} & = & x_{is-p}
\end{array} \quad (31)$$

where $S = 2^k - 1$. A coset can be formed by taking any row in $G^n \ G_0^k$, e.g., $x_{a-1} \oplus x_a = x_{a-p}$ and adding it to each row of $G_0^k$ to obtain:

$$G_a^k = (x_{a-1} L_k) \times (x_a M_k) \times (x_{a-p} R_k) \quad (32)$$

where $x_a M_k = \{x_a \oplus x_l | x_l \epsilon M_k\}$. If w is a mixing transformation and row i is in $G_a^k$, then:

$$(x_{i-1} \oplus w) \oplus (x_i \oplus w) = x_{i-p} \quad (33)$$

$x_{i-1} \epsilon x_{a-1} L_k$ and $x_i \epsilon x_a M_k$. (See Appendix IV, section II). It must also be true that $x_{i-1} \oplus w \epsilon x_{a-1} L_k$ and $x_i \oplus w \epsilon x_a M_k$ This occurs if and only if $w \epsilon L_k \cap M_k$. Similarly, if row i is in $G_0^k$, since in that case $x_{i-1} \epsilon L_k$ and $x_i \epsilon M_k$. The group of mixing transformations determined by $G_a^k$ is $W_k = L_k \cap M_k$. In some circumstances $W_k \beta \{\theta\}$ and no constructive corruption is possible. The foregoing will be described further in Section IV, below.

There are corruptible sets which are not cosets or relative complements of subgroups. For example, a corruptive set is generated by taking four consecutive equations plus the sum of the first three and last three:

$$x_m \oplus x_1 = x_{1-p}$$

$$x_1 \oplus x_2 = x_{2-p}$$

$$x_2 \oplus x_3 = x_{3-p}$$

$$x_3 \oplus x_4 = x_{4-p}$$

$$x_{q-1} \oplus x_q = x_{q-p}$$

$$x_q \oplus x_{q+1} = x_{q+1-p} \tag{34}$$

where $x_q = x_1 \oplus x_2 \oplus x_3$, and the mixers are $w_1 = x_1 \oplus x_2$, $w_2 = x_1 \oplus x_3$, and $w_3 = w_1 \oplus w_2$. (See Appendix II, section 3.3) Two more rows can be added using:

$$x_a = x_1 \oplus x_3 \oplus x_4$$

$$x_f = x_1 \oplus x_2 \oplus x_4 \tag{35}$$

The resulting eight equations constitute a coset which can easily be shown to be derived from a subgroup of order 8 with one set of three consecutive rows and one set of two consecutive rows.

While constructive corruption provides nonlinear segments which can be assembled to form a nonlinear orthomorphism, an issue arises as to whether or not there are some nonlinear which cannot be obtained this way.

Proposition 2: In general, any maximal length nonlinear orthomorphism can be derived from a linear (automorphic) orthomorphism by the process of constructive corruption.

The foregoing proposition is established by the following analysis. Without loss of generality, it can be assumed that $\theta$ is the fixed point. The normalized form for any maximal length nonlinear orthomorphism is shown in Equation 11a. The n-bit numbers in the right column can be permuted so that the new order of permutation is a linear orthomorphism:

$$(\theta)(Z_1, Z_2, \ldots, Z_m) \rightarrow (\theta)(U_1, U_2, \ldots, U_m) \tag{36}$$

This can be done many ways by applying a linear generating function, i.e., primitive polynomial, to a complete linearly independent set of the $Z_i$. Thus, $U_i = Z_j$ where $i = f(j)$ represents the permutation above. This same permutation can be applied to the array of equations in Equation 11a without changing the nonlinear orthomorphic mapping $S(x_{k-1}) = Z_k$. However, the $\{U_i\}$ permutation now defines a linear orthomorphism. The net result is a dual set of $m = 2^n - 1$ equations of the form:

$$x_{j-1} \oplus x_j = Z_j = U_i = U_{i+p-1} \oplus U_{i+p} \tag{37}$$

The corresponding mixing transformations are:

$$w_i = U_{i+p-1} \oplus x_{j-1} = \oplus x_j \tag{38}$$

The principal results of the foregoing analysis are that coset decomposition using special subgroups is an effective and methodical means of finding candidates for piece wise non-linearization and that no class of nonlinear orthomorphisms is overlooked using such a technique. The next section provides analysis for determining what size pieces to corrupt and how to assemble the pieces into a nonlinear orthomorphism with desirable properties for cryptography.

IV. CONSTRUCTION OF COMPLETE NONLINEAR ORTHOMORPHISMS

Section III described how to find pieces of a linear orthomorphism (corruptible sets of equations) which can be non-linearized among themselves. The present section describes how to assemble the pieces into a complete nonlinear orthomorphism of $2^n - 1$ equations. This section further describes what constitutes a good nonlinear orthomorphism and a good non-linear substitution. At one extreme, one could modify a coset of order 4, leaving the remaining $2^n - 4$ equations unmodified. At the other extreme, one could modify all $2^n$ equations with a single mixing transformation. Neither a piece wise linear nor an affine mapping would be satisfactory. For any mapping S an evaluation can be made of the following:

$$N(x,y) = S(x) \oplus S(y) \oplus S(x \oplus y) = ? \tag{39}$$

If S is an affine mapping, the sum of Equation 39 will be some fixed number c for all pairs x, y, and $c = \theta$ if S is linear. Thus, a natural measure of non-linearity would be the range and distribution of $N(x,y)$.

Proposition 3: It can be established that, for a subgroup of order $2^k$ in a maximal length linear orthomorphism, the order of the corresponding group of mixing transformations, $W_k$, will be: $2^{2k-n} \leq |W_k| \leq 2^{k-1}$ The foregoing proposition is established by the following analysis. The subgroup of the orthomorphism is $G_0^k = L_k \times M_k \times R_k$ where $L_k$, $M_k$ and $R_k$ are subgroups of $Z_2^n$, each of order $2^k$. $W_k = L_k \cap M_k$. If $|W_k| = 2^k$, then $L_k = M_k$ implying that $G_0^k$ is a cycle in the orthomorphism. Since it is maximal, $|W_k| \leq 2^{k-1}$. $L_k$ and $M_k$ each have a set of k linearly independent numbers, respectively denoted $\{x_1, x_2, \ldots, x_k\} \in L_k$ and $\{x_{k+1}, x_{k+2}, \ldots, x_{2k}\} \in M_k$. (These indices here do not refer to rows as in Equation 11.) There are at most n linearly independent numbers in any subset of $Z_2^n$. So, if $2k > n$, there is a subset of $2k - n$ numbers in $\{x_1, \ldots, x_k, x_{k+1}, \ldots, x_{2k}\}$ dependent on the others. Without loss of generality, one can assume that $\{x_{k+1}, x_{k+2}, \ldots, x_n\}$ are independent of $\{x_1, \ldots, x_k\}$. The remaining numbers $\{x_{n+1}, \ldots, x_{2k}\}$ must be dependent on $\{x_1, \ldots, x_k\} \in L_k$. There are $2k - n$ such numbers, independent of each other, and so, $\{x_{n+1}, \ldots, x_{2k}\} \in L_k \cap M_k$.

An immediate corollary of the foregoing is that if a subgroup $G_0^k$ of a maximal linear orthomorphism $G^n$ has order $$\left|G_0^k\right| > 2^{\frac{n}{2}},$$

then $G_0^k$ and its cosets are corruptible.

A coset of order $2^k$ is termed "completely corruptible" if the corresponding group of mixing transforms is of order $2^{k-1}$.

Let $G^n$ be a set of $2^n$ equations representing a linear orthomorphism on $Z_2^n$. Let $G_0^k$ be the subgroup of $G^n$ consisting of $2^k$ equations as in Equation 31. Assume that $|W_k| = 2^{k-1}$. With the foregoing assumptions and definitions, a coset decomposition takes the form:

$$G^n = G_0^k + G_1^k + \ldots + G_c^k \tag{40}$$

where $c = 2^{n-k} - 1$ and where $G_i^k$ is a coset derived by adding equations (vectors) $x_{i-1} \oplus x_i = x_{i-p}$ to each of the $2^k$ equations in $G_0^k$. Each successive equation must not have appeared in $G_0^k$ or any of the preceding cosets in the decomposition. For practical purposes, decomposition into corruptible sets is desired. Each of these cosets will have the same group of mixing transforms available.

A maximal subgroup of equations representing a linear orthomorphism can be broken into disjoint subsets which are transformable into a nonlinear orthomorphism by consecutive steps. (See Appendix IV). This can be generalized to any completely corruptible coset.

Practical problems in constructive corruption are the choice of the size of the set of equations in the linear orthomorphic array to be non-linearized and the method of assigning mixing transforms without conflict. If $G_0^k = L_k \times M_k \times R_k$ is a sub-group of the array of equations of order $2^k$, and if it is completely corruptible, the order of the set of mixing transforms is $|W_k| = 2^{k-1}$. Any coset $G_i^k$ is obtained by vectorially adding some equation $x_{i-1} \oplus x_i = x_{i-p}$, which is not in $G_0^k$, to all equations in $G_0^k$. This coset can be corrupted by applying some or all of the mixing transforms in $W_k$. If only one $w \in W_k$ is used, the result is an affine set. If one attempts to use all the w's, there is a problem of assigning the w's without conflict. One can always take a completely corruptible subgroup $G_0^{k-1}$ $G_0^k$, and divide $G_i^k$ into two cosets of $G_0^{k-1}$, $G_i^{k-1} \cup G_j^{k-1} = G_i^k$, and then corrupt these two smaller cosets separately. The problem is that the order of the set of mixing transforms $|W_{k-1}|$ is $2^{k-2}$, so that there are only half as many mixing transforms available as the number of equations to which they are applied. In the limit for $k=2$ and cosets of order 4, $W_2 = \{\theta, w\}$, and so, there is just one mixing transform that can be applied to all $2^{n-2} - 1$ cosets. In what follows, a method is provided for finding a subset of a coset $G_i^k = \overline{L}_k \times \overline{M}_k \times \overline{R}_k$ derived from the sub-group $G_0^k = L_k \times M_k \times R_k$, such that the numbers in the left and middle columns of the subset can be combined among themselves but with their sums ranging over all of $\overline{R}_k$, the right column.

The method simplifies the assignment of multiple mixing transformations to an orderly process rather than by "cut and try" methods (see Appendix II, section 5). Appendix IV, pages 17—17 outlines a method for maximal subgroups. The following generalizes this process to subgroups of all orders $|G_0^k| = 2^k$ for $k \leq n-1$. The method seeks to find subgroups that act like maximal subgroups.

Proposition 4: It can be established that a completely corruptible subgroup of order $2^k$ has k consecutive rows of equations from the complete array of equations representing the maximal linear orthomorphism.

The foregoing proposition is established by the following analysis. Let $G_0^k$ be a completely corruptible subgroup of order $2^k$. Then $|W_k| = 2^{k-1}$ by definition. $G_0^k$ has a maximal set of k linearly independent equations. $W_k$ has maximal linearly independent sets of $k-1$ numbers. It is desirable to find the set with the largest collection of consecutive numbers from columns L or M in the complete linear array. If there are $K-1$ such numbers $x_a, x_{a+1}, \ldots, x_{a+k-2}$, the numbers correspond to the following rows in $G_0^k$ which are k consecutive rows:

$$x_{a-1} \oplus x_a = x_{a-p} \quad (41)$$
$$x_a \oplus x_{a+1} = x_{a+1-p}$$
$$\vdots$$
$$x_{a+k-2} \oplus x_{a+k-1} = x_{a+k-1-p}$$

If there are less than $k-1$ consecutive numbers in the set of $k-1$ linearly independent numbers, the numbers can be collected into smaller sets of consecutive numbers. The largest such set is $x_a, x_{a+1}, \ldots, x_{a+ka-2}$; the second largest set is $x_b, x_{b+1}, \ldots x_{b+kb-2}$, etc., until a set of $k-1$ independent numbers in $W_k$ is assembled with $(k_a - 1) + (k_b - 1) + \ldots = k-1$. Each such set defines a set of equations in $G_0^k$, all consecutive, of the form:

$$x_{a-1} \oplus x_a = x_{a-p} \quad (42)$$
$$x_a \oplus x_{a+1} = x_{a+1-p} \quad k_a \text{ equations}$$
$$\vdots$$
$$x_{a+ka-2} \oplus x_{a+ks-1} = x_{a+ks-1-p}$$
$$x_{b-1} \oplus x_b = x_{b-p} \quad k_b \text{ equations}$$
$$\vdots$$
$$x_{b+kb-2} \oplus x_{b+kb-1} = x_{b+kb-1-p}$$
etc.

The $k_a + k_b + \ldots > k$ individual equations of Equation 42 are linearly independent since the x's are linearly independent. Thus, $|G_0^k| 2^k$, represents a contradiction.

Completely corruptible subgroups and cosets are not only useful for deriving nonlinear orthomorphisms but as will be shown below also affect the structure of smaller subgroups.

Proposition 5: It can be established that, for any completely corruptible subgroup of order $2^k$, where $k \geq 4$, each subgroup of order $2^{k-1}$ is corruptible.

The foregoing proposition is proved by the following: Let $G_0^k$ be such a completely corruptible subgroup. By Prop. 4, $G_0^k$ has k consecutive equations from the complete orthomorphic array. It also has another set of $k-1$ consecutive equations which are sums of adjacent pairs of the k consecutive equations, since the latter are a set of generators of $G_0^k$. There is a sequence of successively smaller k-tuples of consecutive rows. The indices of the sequence are provided in Table I:

TABLE I

| k | Consecutive Rows | |
|---|---|---|
|  | k − 1 | k − 2 |
| a | b | c |
| a + 1 | b + 1 | c + 1 |
| a + 2 | b + 2 | c + 2 | etc→ |
| . | . | . |
| . | . | . |
| . | . | . |
| a + k − 1 | b + k − 2 | c + k − 3 | where $x_a \oplus x_{a+1} = x_b$ and $x_b \oplus x_{b+1} = x_c$, etc.

Since $k \geq 4$, there are at least four consecutive a rows, three b's, and two c's. The three consecutive sets of $k-1$ rows:

$$(a, +a+1, \ldots, a+k-2),$$
$$(a+1, a+2, \ldots, a+k-1),$$
and
$$(b, b+1, \ldots, b+k-2) \quad (43)$$

are linearly independent sets and can be used to generate a $G_0^{k-1}$ with $k-1$ consecutive rows. In a like manner, $(b, a+2, a+3, \ldots a+k-1)$ would generate $G_0^{k-1}$ with $k-2$ consecutive rows, noting that $x_b$ is independent of $x_{a+2}, \ldots x_{a+k-1}$. To ensure that $G_0^{k-1}$ is not corruptible, it would be necessary to eliminate all pairs from the above indices. If one eliminates all but one of the a's, e.g., a thru $a+k-2$, then $x_a, \ldots x_{a+k-2}$ define rows which will be in the relative complement $\overline{G}_0^{k-1} = G_0^k \ G_0^{k-1}$, but $x_a \oplus x_{a+1} = x_b$, etc. At the least, $k/2$ or $k-1/2$ of the b's must also be eliminated. Thus, some additive triple would be in $\overline{G}_0^{k-1}$, a contradiction for a complement. Depending on whether k is even or odd, $k/2$ or $k-1/2$ alternate a rows could also be left to the subgroup complement, but $x_a \oplus x_{a+2} = x_c$, etc. Again, to eliminate the consecutive rows with c indices, some of such rows would be in the complement, thus resulting in triple sums.

For $n \geq 5$, this implies that any subgroup of order $2^{n-2}$ is corruptible, and, of course, by Prop. 4, any subgroup of order $2^{n-1}$ is completely corruptible.

Proposition 6: Any maximal orthomorphism on $Z_2^3$ is linear or affine.

the forgoing proposition is established by the following: A nonlinear orthomorphism can be derived by constructive corruption from a linear one. If one applies $w \oplus w = \theta$ vectorially to all eight rows, where $w \neq \theta$, the mapping becomes affine. Since the orthomorphism has no 3 cycle, the smallest corruptible coset has order 4.

Let $G^3 = Z_2^3 \times Z_2^3 \times Z_2^3$ be the orthomorphism and $G^2 \psi \overline{G}^2 = G^3$ be a corruptible subgroup with corresponding single coset (complement). Because $|G^2| = 2^2$, $W = \{\theta, w\}$ where w is the single nontrivial mixer. If $S(x) = z$ is the original linear mapping, then $S'(x \oplus w) \equiv S(x)$ on the coset, and $S'(y) \equiv S(y)$ on the subgroup. $w \in G^2$, so $S'(w) = S(w)$. If $x \in \overline{G}_2$, so does $x \oplus w \in \overline{G}^2$. $S'(x) = S'(x \oplus w \oplus w) = S(x \oplus w) = S(x) \oplus S(w)$. There are three cases:

a. $x, y \in G^2 \cdot x \oplus y \in G \cdot$ \quad (44)
   Also, $S'(x) \oplus S'(y) \oplus S'(x \oplus y) =$
   $S(x) \oplus S(y) \oplus S(x \oplus y) = \theta$.

b. $x, y \in \overline{G}^2 \cdot x \oplus y \in G^2 \cdot$ \quad (45)
   Also, $S'(x) \oplus S'(y) \oplus S'(x \oplus y) =$
   $S(x) \oplus S(w) \oplus S(y) \oplus S(w) \oplus S(x \oplus y) = \theta$ c. $x \in G^2$ and $y \in \overline{G}^2 \cdot$ \quad (46)
   Then $x \oplus y \in \overline{G}^2$
   $S'(x) \oplus S'(y) \oplus S'(x \oplus y) =$
   $S(x) \oplus S(y) \oplus S(w) \oplus S(x \oplus y) \oplus S(w) = \theta$ The same result holds for any block size if the complement of a maximal subgroup is corrupted with a single mixing transformation. The nest step is to further refine the process of constructive corruption by finding completely corruptible subgroups which have the additional property that pairs of cosets or subsets thereof can be modified with minimum interaction, even through using the full group of mixing transforms.

Proposition 7: It can be established that any completely corruptible coset $G_1^k$ of order $2^k, k > 2$, in the group of equations representing a maximal linear orthomorphism on $Z_2^n$, can be divided into two cosets of order $2^{k-1}$ such that the numbers in the left and middle columns of each such smaller coset can be rearranged among themselves but the resulting sums will be distributed over the entire column of the parent coset $G_1^k$.

The foregoing proposition is proven by the following: The completely corruptible subgroup $G_0^k$ and coset $G_1^k$ can be represented as follows:

$$\begin{array}{cccc}
L_k & M_k & R_k & \quad (47) \\
\theta & \oplus \ \theta = & \theta & \\
x_{i1-1} & \oplus \ x_{i1} = & x_{i1-p} & \\
\cdot & \cdot & & G_0^k \\
\cdot & \cdot & & \\
\cdot & \cdot & & \\
x_{is-1} & \oplus \ x_{is} = & x_{is-p} & \\
\overline{L}_k & \overline{M}_k & \overline{R}_k & \\
x_{j1-1} & \oplus \ x_{j1} = & x_{ji-p} & \\
\cdot & \cdot & & G_1^k \\
\cdot & \cdot & & \\
x_{jt-1} & \oplus \ x_{js} = & x_{js-p} & \\
\end{array}$$

where $s = 2^{k-1}$ and $t = 2^k$. If $G_0^k$ is not a maximal subgroup, then:

$$L_k \cup \overline{L}_k \neq M_k \cup \overline{M}_k \neq R_k \cup \overline{R}_k \neq Z_2^n. \quad (48)$$

By Prop. 4, since the subgroup $G_0^k$ of order $2^k$ is completely corruptible, it contains a set of k consecutive rows or equations from the full orthomorphic set of equations. These k rows are a linearly independent set. The subgroup generated by taking all even sums of these k rows is a subgroup $G_0^{k-1}$ of order $2^{k-1}$, $G_0^{k-1} \subset G_0^k$, with columns $L_{k-1} \subset L_k$, $M_{k-1} \subset M_k$ and $R_{k-1} \subset R_k$. $L_{k-1} \subset R_k$ and $M_{k-1} \subset R_k$ since the same sums of numbers will occur within $L_{k-1}$ and $M_{k-1}$ and between $L_{k-1}$ and $M_{k-1}$. Since the orthomorphism is maximal, there are no proper cycles and, thus, $L_{k-1} \neq R_{k-1}$ and $M_{k-1} \neq R_{k-1}$. So, $L_{k-1} \cap R_k \ R_{k-1}$ and $M_{k-1} \ \cap R_k \ R_{k-1}$ are not empty, where $R_k \ R_{k-1}$ is the set of numbers in $R_k$ but not in $R_{k-1}$. Since $L_{k-1}$ and $M_{k-1}$ are subgroups of $R_k$, for any $x \in L_{k-1}$ and $y \in M_{k-1}, x \oplus y \in R_k$. Some such sums must be in $R_k \ R_{k-1}$ because, e.g., if $x \in L_{k-1} \cap R_k \ R_{k-1}$, then $x \oplus \theta \in R_k$. Thus, any rearrangement of pairs of numbers in $L_{k-1}$ and $M_{k-1}$ will yield corrupted equations in $L_{k-1} \times M_{k-1} \times R_k$.

$G_1^k$ can be divided into two distinct cosets of $G_0^{k-1}$, $G_a^{k-1} \cup G_b^{k-1} = G_1^k$. Consider one of the cosets $G_a^{k-1}$. It is obtained by adding vectorially some equation $x_{a-1} \oplus x_a = x_{a-p}$ to all equations in $G_0^{k-1} = L_{k-1} \times M_{k-1} \times R_{k-1}$. The coset $G_a^{k-1}$ can be expressed as a direct product of three cosets in $Z_2^n$, i.e.:

$$G_a^{k-1} = (x_{a-1}L_{k-1}) \times (x_a M_{k-1}) \times (x_{a-p}R_{k-1}) \quad (49)$$

Thus, if $u \in x_{a-1}L_{k-1}$ and $v \in x_a M_{k-1}$, where $u = x_{a-1} \oplus x$ and $v = x_a \oplus y$ for some $x \in L_{k-1}$ and $y \in M_{k-1}$, then by the first part of the proof, $x \oplus y = z \epsilon R_{k-1}$. Correspondingly:

$$u \oplus v = (x_{a-1} \oplus x) \oplus (x_a \oplus y) \quad (50)$$
$$= (x_{a-p} \oplus z) \epsilon x_{a-p} R_{k-1}$$

So, for any pair of numbers, $u,v$ where $u \epsilon x_{a-1} L_{k-1}$ and $v \epsilon x_a M_{k-1}$ there exists $w \epsilon x_{a-p} R_{k-1}$ such that $u \oplus v = w$. The same holds for the other coset $G_b{}^{k-1}$.

As an example of the foregoing, non-linearization method consider a block size 8 maximal length linear orthomorphism defined by the generating function $x_k = x_{k-8} \oplus x_{k-6} \oplus x_{k-3} \oplus x_{k-2}$. Let $\{A,B,C,D,E,F,G,H\}$ be a complete, linearly independent set of 8-bit binary numbers where each letter represents an 8-bit binary number, and in particular, $A = x$, $B = x_2, \ldots, H = x_8$. For convenience and compactness, notation ABC stands for $A \oplus B \oplus C$. Applying the generating function to the above complete linearly independent set in that order will define the $2^8 = 256$ equations or rows representing the orthomorphism. For example, $x_9 = x_1 \oplus x_3 \oplus x_6 \oplus x_7 = A \oplus C \oplus F \oplus G = ACFG$. These, in part, are:

|   |       |   |      |   |        | |
|---|-------|---|------|---|--------|---|
| 0 | $\theta$ | $\oplus$ | $\theta$ | = | $\theta$ | (51) |
| 1 | BEFH  | $\oplus$ | A    | = | ABEFH  | |
| 2 | A     | $\oplus$ | B    | = | AB     | |
| 3 | B     | $\oplus$ | C    | = | BC     | |
| 4 | C     | $\oplus$ | D    | = | CD     | |
| 5 | D     | $\oplus$ | E    | = | DE     | |
| 6 | E     | $\oplus$ | F    | = | EF     | |
| 7 | F     | $\oplus$ | G    | = | FG     | |
| 8 | G     | $\oplus$ | H    | = | GH     | |
| 9 | H     | $\oplus$ | ACFG | = | ACFGH  | |
| . | .     |   | .    |   | .      | |
| 254 | BCDEH | $\oplus$ | ADEG | = | ABCGH | |
| 255 | ADEG | $\oplus$ | BEFH | = | ABDEGH | |

The orthomorphic mapping used for encryption is for example, $S(D) = DE$, from row 5. For simplicity, choose a subgroup $G_0{}^3$ of order 8 defined by eight equations:

|     | $L_3$ |   | $M_3$ |   | $R_3$ |   | (52) |
|-----|-------|---|-------|---|-------|---|------|
| 0   | $\theta$ | $\oplus$ | $\theta$ | = | $\theta$ | | |
| 2   | A     | $\oplus$ | B    | = | AB    | | |
| 3   | B     | $\oplus$ | C    | = | BC    | | |
| 4   | C     | $\oplus$ | D    | = | CD    | $G_0{}^3$ | |
| 176 | ABC   | $\oplus$ | BCD  | = | AD    | | |
| 213 | AC    | $\oplus$ | BD   | = | ABCD  | | |
| 235 | AB    | $\oplus$ | BC   | = | AC    | | |
| 236 | BC    | $\oplus$ | CD   | = | BD    | | |

One can read off the mixing transforms $W_3 = \{\Theta,B,C,BC\}$ from $W_3 = L_3 \cap M_3$. $|W_3| = 2^2 = 4$, so $G_0{}^3$ is completely corruptible. Now, one can construct a coset, e.g., using row 6.

|     | $\bar{L}_3$ |   | $\bar{M}_3$ |   | $\bar{R}_3$ |   | (53) |
|-----|-------|---|-------|---|---------|---|------|
| 6   | E     | $\oplus$ | F    | = | EF      | | |
| 169 | AE    | $\oplus$ | BF   | = | ABEF    | | |
| 155 | BE    | $\oplus$ | CF   | = | BCEF    | | |
| 215 | CE    | $\oplus$ | DF   | = | CDEF    | $G_6{}^3$ | |
| 91  | ABCE  | $\oplus$ | BCDF | = | ADEF    | | |
| 95  | ACE   | $\oplus$ | BDF  | = | ABCDEF  | | |
| 121 | ABE   | $\oplus$ | BCF  | = | ACEF    | | |
| 209 | BCE   | $\oplus$ | CDF  | = | BDEF    | | |

One example of a corruptible subgroup of order 4, $G_0{}^2$ is:

|     | $L_2$ |   | $M_2$ |   | $R_2$ |   | (54) |
|-----|-------|---|-------|---|-------|---|------|
| 0   | $\theta$ | $\oplus$ | $\theta$ | = | $\theta$ | | |
| 2   | A     | $\oplus$ | B    | = | AB    | | |
| 3   | B     | $\oplus$ | C    | = | BC    | | |
| 235 | AB    | $\oplus$ | BC   | = | AC    | | |

$W_2 = \{\Theta,B\}$. From this, $G_6{}^3$ can be decomposed into two cosets:

|     | $L_3$ |   | $M_3$ |   | $R_3$ |   | (55) |
|-----|-------|---|-------|---|-------|---|------|
| 6   | E     | $\oplus$ | F    | = | EF    | | |
| 169 | AE    | $\oplus$ | BF   | = | ABEF  | | |
| 155 | BE    | $\oplus$ | CF   | = | BCEF  | | |
| 121 | ABE   | $\oplus$ | BCF  | = | ACEF  | | | and

|     |       |   |      |   |         |
|-----|-------|---|------|---|---------|
| 215 | CE    | $\oplus$ | DF   | = | CDEF   |
| 91  | ABCE  | $\oplus$ | BCDF | = | ADEF   |
| 95  | ACE   | $\oplus$ | BDF  | = | ABCDEF |
| 209 | BCE   | $\oplus$ | CDF  | = | BDEF   |

Using this coset decomposition, the only nontrivial mixing transform that can be used on the separate cosets is B.

Now, applying Prop. 7 to the k=3 consecutive rows in $G_0{}^3$, one obtains a different subgroup which is also completely corruptible:

|     | $L_2$ |   | $M_2$ |   | $R_2$ |   | (56) |
|-----|-------|---|-------|---|-------|---|------|
| 0   | $\theta$ | $\oplus$ | $\theta$ | = | $\theta$ | | |
| 213 | AC    | $\oplus$ | BD   | = | ABCD  | | |
| 235 | AB    | $\oplus$ | BC   | = | AC    | | |
| 236 | BC    | $\oplus$ | CD   | = | BD    | | |

Unlike the sub-group in Equation 53, here $L_2 \subset R_2$ and $M_2 \subset R_3$ gives a different coset decomposition of $G_6{}^3$:

|     | $\bar{L}_3$ |   | $\bar{M}_3$ |   | $\bar{R}_3$ |   | (57) |
|-----|-------|---|-------|---|---------|---|------|
| 6   | E     | $\oplus$ | F    | = | EF      | | |
| 95  | ACE   | $\oplus$ | BDF  | = | ABCDEF  | | |
| 121 | ABE   | $\oplus$ | BCF  | = | ACEF    | $G_6{}^2$ | |
| 209 | BCE   | $\oplus$ | CDF  | = | BDEF    | | | and

|     |       |   |      |   |       |   | (58) |
|-----|-------|---|------|---|-------|---|------|
| 169 | AE    | $\oplus$ | BF   | = | ABEF | | |
| 155 | BE    | $\oplus$ | CF   | = | BCEF | | |
| 215 | CE    | $\oplus$ | DF   | = | CDEF | $G_{91}^2$ | |
| 91  | ABCE  | $\oplus$ | BDCF | = | ADEF | | |

From Prop. 7, when constructive corruption is applied, $G_6{}^2$ and $G_{91}{}^2$ will be closed in $\bar{L}_3$ and $\bar{M}_3$ but not in $\bar{R}_3$, that is, for example, no number in $\bar{L}_3$ of $G_6{}^2$ will be combined with a number from $\bar{M}_3$ in $G_{91}{}^2$. This information can be used to employ varied mixing transforms without conflict. See Table II.

TABLE II

| Row #'s | | $G_6^2$ Row 6 | Row 95 | Row 121 | $\overline{M}_3$ Row 209 | Row 91 | $G_{91}^2$ Row 155 | Row 169 | Row 215 |
|---|---|---|---|---|---|---|---|---|---|
| $\overline{L}_3$ | 6 | 6/θ | 209/BC | 155/b | 215/C | | | | |
|  | 95 | 121/BC | 95/θ | 169/C | 91/B | | | | |
| $G_6^2$ | 121 | 169/B | 91/C | 121/θ | 95/BC | | | | |
|  | 209 | 155/C | 215/B | 6/BC | 209/θ | | | | |
|  | 91 | | | | | 91/θ | 169/BC | 121/C | 95/B |
|  | 155 | | | | | 215/BC | 155/θ | 6/B | 209/C |
| $G_{91}^2$ | 169 | | | | | 95/C | 121/B | 169/θ | 91/BC |
|  | 215 | | | | | 209/B | 6/C | 155/BC | 215/θ |

The ordinate lists row numbers of binary blocks in the left column of Equation 53 and the abscissa lists row numbers of binary blocks in the middle column of Equation 53. The table entries are the row numbers of equations in the linear array Equation 53, along with the mixing transformation which would convert that equation to another in a nonlinear array with the corresponding $\overline{L}_3$ block added to the corresponding $\overline{M}_3$ block. For example, the entry corresponding to $\overline{L}_3$ 95, $\overline{M}_3$ 121 means that row 169: AE⊕BF=ABEF by application of mixing transformation C⊕C=θ is converted to ACE⊕BCF=ABEF where $\overline{L}_3$ row 95 block is ACE, and the $\overline{M}_3$ row 121 block is BCF. Where there is no entry, the combination is impossible. Note that each of the eight rectangles contains rows from one of two cosets $G_6^2$ and $G_{91}^2$. Each column and each row can be visited only once and no table entry (row number) can be repeated. If this were a 3-dimensional table, it would mean that each row, column, and axis could be visited once, at most.

Table II can be used to select a pattern of constructive corruption. For example, choose $\overline{L}_3$ 6, $\overline{M}_3$ 121 transformed from row 155 with mixer B. Next, choose $\overline{L}_3$ 95, $\overline{M}_3$ 6 from 121/BC. Two choices remain for $\overline{L}_3$ 121. Choose $\overline{M}_3$ 209 from 95/BC. There is now only one possibility for $\overline{L}_3$ 209, i.e., pairing with $\overline{M}_3$ 95 from 215/B. Next, going to the $G_{91}^2$ block, unless we accept the identity transform, there is one choice: $\overline{L}_3$ 91, $\overline{M}_3$ 155 from 169/BC. For the remainder now, there is no choice: $\overline{L}_3$ 155, $\overline{M}_3$ 169 from 6/B, $\overline{L}_3$ 169, $\overline{M}_3$ 215 from 91/BC and $\overline{L}_3$ 215, $\overline{M}_3$ 91 from 209/B. We have used two missing transforms.

Another approach is to include the identity transform, i.e., leave some rows unmodified. For example, $\overline{L}_3$ 6, $\overline{M}_3$ 6 from 6/θ; $\overline{L}_3$ 95, $\overline{M}_3$ 121 from 169/C; $\overline{L}_3$ 121, $\overline{M}_3$ 209 from 95/BC; and $\overline{L}_3$209, $\overline{M}_3$95 from 215/B; $\overline{L}_3$ 91, $\overline{M}_3$ 169 from 121/C; $\overline{L}_3$ 155, $\overline{M}_3$ 155 from 155/θ; $\overline{L}_3$ 169, $\overline{M}_3$ 215 from 91/BC; and, $\overline{L}_3$ 215, $\overline{M}_3$ 91 from 209/B. In this case, all mixing transforms have been used, but two, rows 6 and 155, are left unmodified. The two rows may be transformed later as parts of some other cosets or their sum, row 3, may be modified.

The foregoing method can be applied to subgroups and cosets of any size, and then to successively smaller subgroups for an orderly process of non-linearization. It is not necessary to modify all rows in the linear array to ensure that:

$$N(x,y) = S(x) \oplus S(y) \oplus S(x \oplus y) \neq \theta \tag{59}$$

most of the time, and to have an even distribution of values.

The foregoing provides generalized techniques and methods for constructing complete non-linear orthomorphisms. The foregoing $n=8$ example is provided to illustrate the general techniques with concrete equations. In the following sections, specific techniques for non-linearization which are well suited for performing block substitutions in cryptography are described.

V. NESTED SEQUENCES OF SUBGROUPS

Figure 18:
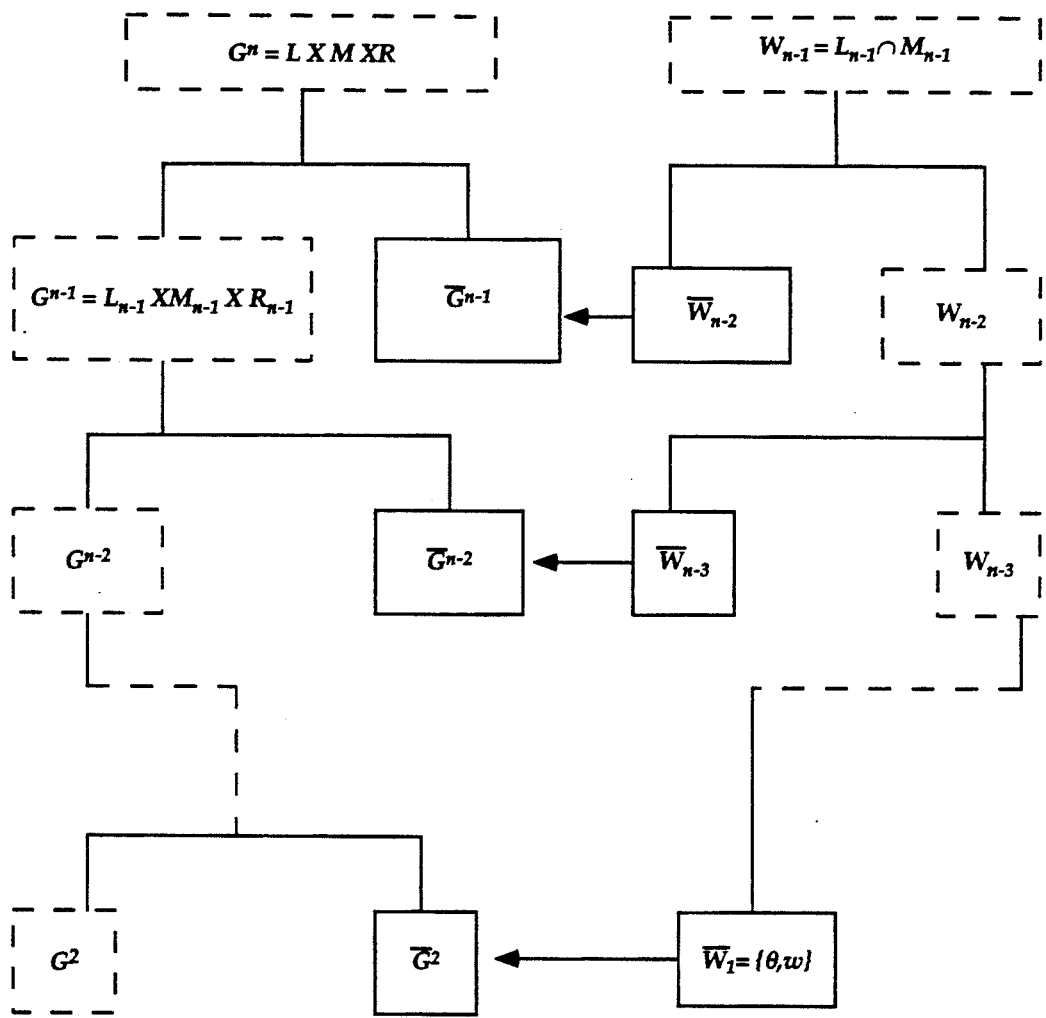
FIG. 18 graphically illustrates a method for non-linearization of a group of equations using nested sequences of sub-groups.

Referring to FIGS. 18 and 19, a first preferred method for non-linearization is provided. The method employs nested sequences of subgroups. Prior to describing the specific steps of the method, a description of nested sequences of subgroups is provided, with particular reference to background material provided in Appendix IV.

Section 3 of Appendix IV, outlines a non-linearization by starting with a maximal subgroup of equations in the linear array of $2^n$ equations. $G^{n-1}$ is one of $2^n-1$ such subgroups and $|G^{n-1}| = 2^{n-1}$. All such maximal subgroups can be specified by selecting n-bit numbers in any one of the three columns which are a maximal subgroup of $Z_2^n$. The maximal subgroups can all be determined from the n maximal subgroups of $Z_2^n$ which are specified by numbers which all have zero in a given bit position. All of these maximal subgroups of the orthomorphic array $G^n$ are essentially images of each other in that they have the same row spacing and can be obtained from each other by changing the indices of the member rows, all by the same increment. (See Appendix IV, Proposition 1). Thus, maximal subgroups, both of the n-bit numbers and of the linear orthomorphic arrays of equations are easy to find and easy to work with.

$G^{n-1} = L_{n-1} \times M_{n-1} \times R_{n-1}$ is a set of $2^{n-1}$ equations where $L_{n-1}$, $M_{n-1}$, and $R_{n-1}$ are the left, middle and right columns, respectively. $\overline{G}^{n-1} = \overline{L}_{n-1} \times \overline{M}_{n-1} \times \overline{R}_{n-1}$ is the complement. The set of mixing transforms $W_{n-1} = L_{n-1} \cap M_{n-1}$ is a group, and $|W_{n-1}| = 2^{n-2}$. From $G^{n-1}$ one can construct a nested sequence of completely corruptible subgroups $$G^2 \subset G^3 \subset ... \subset G^{n-2} \subset G^{n-1} \tag{60}$$

and a similar sequence of relative complements $$G^2 \subset G^3 \subset ... \subset G^{n-2} \subset G^{n-1} \tag{61}$$

where $\overline{G}^k = G^{k+1}$ $G^k$, each with an associated group of mixing transforms $$|W_{n-k}| = 2^{n-k-1} \tag{62}$$

These subgroups also form a nested sequence $$W_2 \subset W_3 \subset ... \subset W_{n-2} \subset W_{n-1} \tag{63}$$

In the limit, $G^2$ has middle column $M_2 = \{\theta, x_i, x_{i+1}, x_i \oplus x_i\}$ for some index i and the corresponding $W_2 = \{\theta, x_i\}$. Also, for each $1 \leq k \leq n-2$ $$W_{n-k} = W_{n-k-1} \cup \overline{W}_{n-k-1}$$

where $\overline{W}_{n-k-1} = W_{n-k} \setminus W_{n-k-1}$ (64)

i.e., $\overline{W}_{n-k-1}$ is the relative complement of $W_{n-k-1}$ in $W_{n-k}$. A simple and orderly procedure of non-linearization is as follows (and is graphically illustrated in FIG. 18):

a. Apply the $2^{n-3}$ mixing transforms in $\overline{W}_{n-2}$ to $\overline{G}^{n-1}$. None of these mixing transforms are in $W_{n-k}$ for $k > 1$, so they will not be used on subsequent cosets $\overline{G}^{n-k}$.

b. Apply the $2^{n-4}$ mixing transforms in $\overline{W}_{n-3}$ to $\overline{G}^{n-2}$.

c. Continue this process sequentially until reaching $\overline{G}^3$ where two mixing transforms are applied to eight equations.

d. For the last subgroup $G^2$ of order 4, the sole $w = x_i$ could be applied to $\overline{G}^2$ or it simply could be left alone, i.e., apply $w = \theta$.

Besides simplicity, the foregoing method has the merit of using up to $2^{n-2} - 1$ nontrivial mixing transforms. Also, at least $2^n - 4$ equations are transformed; however, the resulting structure remains some order, $G^{n-1}$ has a single set of $n-1$ consecutive rows, and because of the group structure, another set of $n-2$ consecutive rows. Thus, there are three ways that one can construct $G^{n-2}$ as a completely corruptible subgroup, from Prop. 4, i.e., using the set of $n-2$ rows as generators, or omitting the first or last of the set of $n-1$ consecutive rows in $G^{n-1}$. There is a choice of $2^n - 1$ maximal subgroups to begin with and a choice of three subgroups at each subsequent level. So the total possible number of such nested sequences is $(2^n - 1)(3^{n-2})$.

Now, consider two numbers x, y in the left column of $\overline{G}^{n-1}$, i.e., $x, y \in \overline{L}_{n-1}$. $x \oplus y \in \overline{L}_{n-1}$ since it is a group complement. So $x \oplus y \in \overline{L}_{n-k}$ for some $k > 1$. Let $w_a$ and $w_b$ be mixing transforms applied to x and y, respectively. $w_a, w_b \in \overline{W}_{n-2}$. The set of mixers on $\overline{L}_{n-k}$ is $\overline{W}_{n-k-1} \subset \overline{W}_{n-1}$. Thus, in some instances $w_a \oplus w_b \in \overline{W}_{n-k-1}$. In that case:

$$S(x \oplus w_a) \oplus S(y \oplus w_b) = S(x \oplus y \oplus w_a \oplus w_b), \tag{65}$$

and despite the constructive corruption, there are some linear subgroups remaining.

With the foregoing considerations in mind, and with specific reference now to FIG. 19, a preferred method for encryption using nested sequences of subgroups will now be described. The method operates to encrypt data blocks by substituting for any one of $2^n$ n-bit clear text blocks of an n-bit binary number, an associated unique encrypted block of n-bit binary numbers. The method may be implemented using a non-linear dynamic substitution generator, as generally illustrated in FIG. 16.

With reference to FIG. 19, a first method, is employed to find a first matrix $G^n$ of $2^n$ equations as in (11a), which is a linear orthomorphism, with each equation representing the modulo 2 additions of one of the $2^n$ blocks on the left column with a unique one of the $2^n$-bit numbers in the middle to provide an associated, unique, n-bit block in the right column. All of the equations in the first matrix of $2^n$ equations are characterized by the vector sum modulo 2 of any number of the equations also being one of the equations in the first matrix. The equations include the identity equation $\theta \oplus \theta = \theta$. In step 102, a subset $G^{n-1}$ of $2^{n-1}$ equations from the FIRST matrix is selected by choosing $n-1$ consecutive equations in the FIRST matrix and taking all sums of these and the identity equation to obtain:

| Equation # | $L_{n-1}$ | $\times$ | $M_{n-1}$ | $\times$ | $R_{n-1}$ |
|---|---|---|---|---|---|
| $i_0$ | $\theta$ | | $\theta$ | $=$ | $\theta$ |
| $i_1$ | $i_{1-1}$ | $\oplus$ | $i_1$ | $=$ | $1-p$ |
| $i_2$ | $i_{2-1}$ | $\oplus$ | $i_2$ | $=$ | $i_{2-p}$ |
| . | . | | . | | . |
| . | . | | . | | . |
| $i_j$ | $i_{j-1}$ | $\oplus$ | $i_j$ | $=$ | $i_{j-p}$ |
| . | . | | . | | . |
| . | . | | . | | . |
| $i_s$ | $i_{s-1}$ | $\oplus$ | $i_s$ | $=$ | $i_{s-p}$ | where $s = 2^{n-1} - 1$, $L_{n-1}$, $M_{n-1}$ and $R_{n-1}$ are the left, middle and right columns respectively, $G^{n-1} = L_{n-1} \times M_{n-1} \times R_{n-1}$ represents the set of equations, $\overline{G}^{n-1} = \overline{L}_{n-1} \times \overline{M}_{n-1} \overline{R}_{n-1}$, is the complement of $G^{n-1}$, $W_{n-1} = L_{n-1} \cap M_{n-1}$ and $|W_{n-1}| = 2^{n-2}$.

The principle of determining the first matrix of equations is provided in Appendix III, section 2. At step 102-110, the plurality of non-zero $2^n$ equations in the first matrix of $2^n$ equations are modified to provide a second matrix of $2^n$ equations. The equations are modified so that the modified equations collectively map the same clear text blocks as in the left column of the first matrix, but in a different order to the same unique n-bit blocks as in the right column of the first matrix, in the original order of the unmodified equations. The plurality of equations are modified in such a manner that the modified equations are not generally the sums modulo two of any number of other equations in the second matrix. The modification of the $2^n - 1$ non-zero equations is achieved by steps 104-106.

Specifically at step 104, the $2^{n-3}$ mixing transforms in $\overline{W}_{n-2}$ are applied to $\overline{G}^{n-1}$. Next at step 106 the $2^{n-4}$ mixing transforms in $\overline{W}_{n-3}$ are applied are applied to $\overline{G}^{n-2}$. Next, step 108, at the application of the mixing transforms are repeatedly applied to cosets in $G^n$ until reaching $\overline{G}^2$. The number of iterations of step 108 depends upon the value for n. With $n = 8$, a total of five iterations of the mixing transforms are needed within steps 104-108 to reach $\overline{G}^2$. At step 110 $\overline{W}_1$ consists of $\theta$ and a single mixing transform, either of which is applied to $\overline{G}^2$. Finally, at step 112, each clear text block to be encrypted, which is uniquely located as one of the $2^n$ n-bit numbers in the left column of the second matrix of 2n equations, is added modulo 2 to the block in the middle column of the associated equation to obtain the encrypted block in the right column of the associated equation.

Step 112 operates to obtain the final encrypted block.

As with previous encryption methods described above in sections I and II, the steps of the method illustrated in FIG. 19 are preferably implemented using hardwire circuitry for maximum conversion speed. Alternatively, however, a programmed microprocessor can be employed to perform the various method steps illustrated in FIG. 19.

VI. FITTED COSETS FROM DIFFERENT SUBGROUPS

Figure 20:
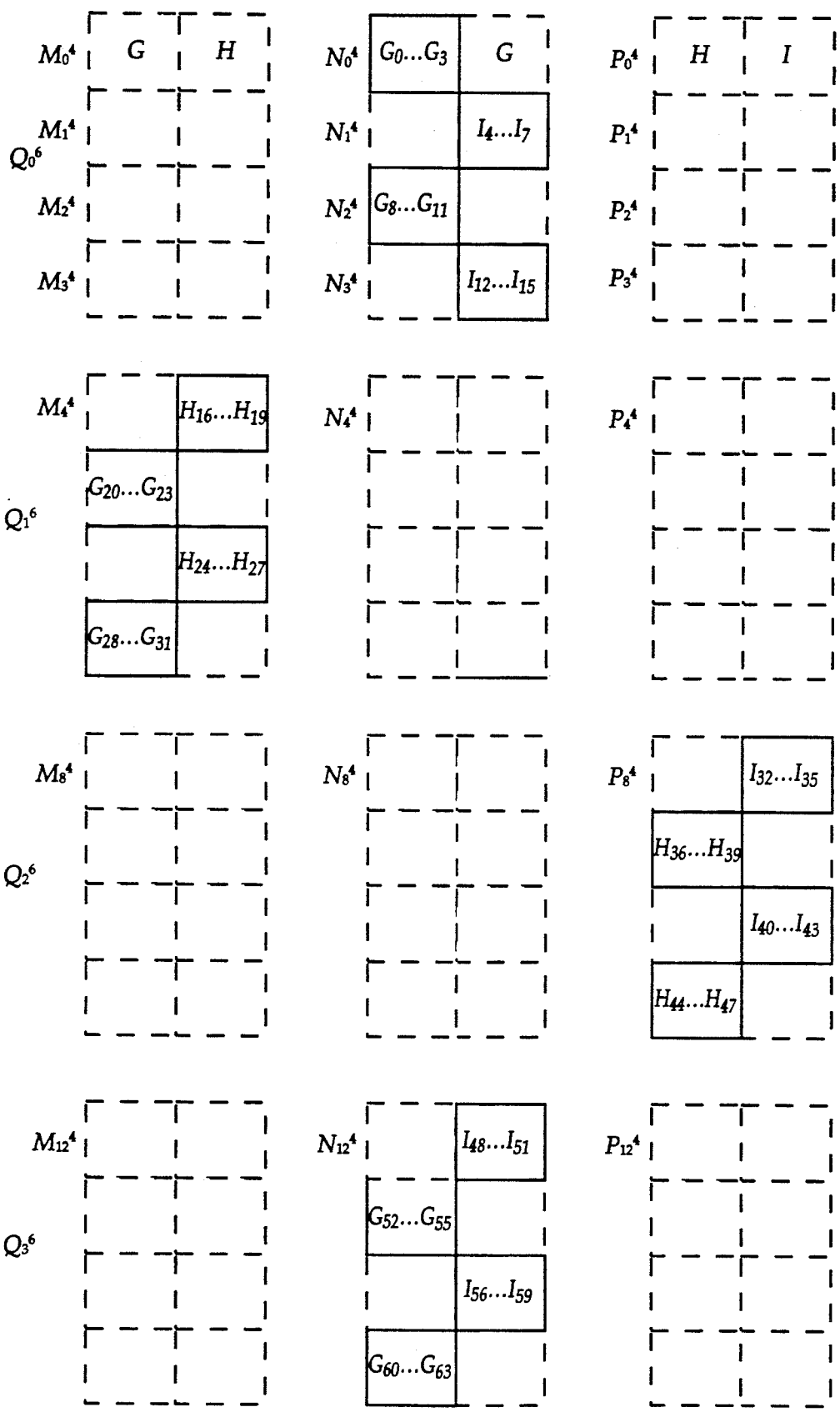
FIG. 20 illustrates multiple-coset decomposition for a maximal length linear orthomorphism on binary numbers of block size $n=8$.

Referring to FIGS. 20 and 21, a second preferred encryption method of the invention will now be described.

The method of FIG. 20 seeks cosets from different subgroups and, hence, with different groups of mixing transforms, but which still can be fitted together somewhat like a jigsaw puzzle.

The method of FIGS. 20 and 21 use fitted cosets from different subgroups to perform encryption. Initially a general description of the method is provided, then, a detailed description of the method with reference to FIG. 21 is provided.

If $G_0^k$ and $H_0^k$ are two disjoint corruptible subgroups of order $2^k$ where $k<n/2$, of a maximal linear orthomorphism on the n-bit numbers, $G_0^k$ and $H_0^k$ can be combined into one subgroup of $2^{2k}$ with two different coset decompositions and two different groups of mixing transformations. Let $M_0^{2k}$ be the subgroup generated by the combined generators of $G_0^k$ and $H_0^k$. $M_0^{2k}/G_0^k$ and $M_0^{2k}/H_0^k$ are two coset decompositions, each isomorphic to a subgroup of $Z_{2^n}$ of order $2^k$, and, hence, to each other. Pairs of cosets consisting of one each from $M_0^{2k}/G_0^k$ and $M_0^{2k}/H_0^k$ will share exactly one row. If they had more than one in common, then it would not be possible for $G_0^k \cap H_0^k = \{\theta\}$ as the sum of a shared pair would be in $G_0^k \cap H_0^k$. If one pair of cosets shared no row, another pair would have to share more than one row. Since $G_0^k$ and $H_0^k$, are disjoint, so are the corresponding groups of mixers although the group of mixing transformations corresponding to $M_0^{2k}$ would have additional members if some rows in $G_0^k$ are adjacent to some in $H_0^k$. Next, the complete orthomorphism $Z_{2^n} \times Z_{2^n} \times Z_{2^n}$ can be decomposed into cosets of $M_0^{2k}$ which, in turn, can be decomposed into alternate collections of cosets from $G_0^k$ and $H_0^k$. Depending on the block size n, this can be extended to more than two coset decompositions. If instead of 2, some number c disjoint corruptible subgroups of order $2^k$ are chosen, then $K \leq n/c$.

The following is an example for $n=8$, where the maximal length linear orthomorphism contains 255 equations or rows besides the identity.

The example is graphically illustrated in FIG. 20 and in Table III below. FIG. 20 graphically illustrates multiple coset decomposition for a maximal length linear orthomorphism of binary numbers of block numbers of block size $n=8$. Table III illustrates the decomposition of 16-row into 4-row cosets for a maximal length linear orthomorphism for block size 8.

TABLE III

| | | |
|---|---|---|
| $M_4^4$ | $G_{16}^2$ | $H_{16}^2$ |
| | $G_{17}^2$ | $H_{17}^2$ |
| | $G_{18}^2$ | $H_{18}^2$ |
| | $G_{19}^2$ | $H_{19}^2$ |

Select three disjoint corruptible sub-groups of order 4: $G_0^2$, $H_0^2$, and $I_0^2$. Each has two consecutive rows, their sum and the identity row. Each subgroup establishes a unique coset decomposition of the complete linear array consisting of the subgroup and 63 cosets, each consisting of four equations. The subgroups of order 4 can be combined to define three subgroups of order 16, $M_0^4$ from $G_0^2 \cup H_0^2 \cup N_0^4$ from $G_0^2 \cup H_0^2$, and $P_0^4$ from $H_0^2 \cup I_0^2$. The subgroups of order 16 will not be disjoint. Finally, the subgroups can be combined into a subgroup $Q_0^6$ of order 64 from $G_0^2 \cup H_0^2 \cup I_0^2$. This subgroup and its three cosets $Q_1^6, Q_2^6$, and $Q_3^6$ form a decomposition of the complete linear orthomorphism. As shown in FIG. 20 each of the 64-row Q cosets can be decomposed three ways into four cosets each of 16 rows. For example, the 64 rows of $Q_1^6$ can be decomposed into $\{M_4^4, M_5^4, M_6^4, M_7^4\}$, or $\{N_4^4 \ldots N_7^4\}$, or $\{P_4^4 \ldots P_7^4\}$. If the M decomposition is chosen, then, for example, $M_4^4$ can be decomposed into four cosets of four rows each, either $\{G_{16}^2, G_{17}^2, G_{18}^2, G_{19}^2\}$ or $\{H_{16}^2, H_{17}^2, H_{18}^2, H_{19}^2\}$ (See Table III). Finally, mixing transformations can be applied to complete the process of constructive corruption.

If desired, all equations in the linear array can be modified this way. While somewhat more complicated than the sequential approach in Section V, the present method has produced better results in terms of nonlinearity as measured by Equation 9.

Specifically referring to FIG. 21, steps of a preferred method for encrypting data employing fitted cosets from different subgroups will now be described. As with the method described in section V above, the present method achieves encryption by substituting for any one of $2^n$ unique clear text blocks of n-bit binary numbers, an associated unique encrypted block of n-bit binary numbers. Initially, at step 202, a first matrix $G^n$ of $2^n$ equations is found. This method step is identical to step 102 of FIG. 19 and will not be described in further detail herein.

At step 204, two or more mutually disjoint corruptible subgroups, $G_0^k, H_0^k, I_0^k \ldots$ of order $2^k$ are selected from $G^n$, where $k<n/2$. Next at step 206 subgroups, not necessarily disjoint, $M_0^{2k}, N_0^{2k}, \ldots$ of order $2_0^{2k}$ are formed from pairs of $G_0^k, H_0^k, I_0^k \ldots$ This process is continued until a subgroup $Q_0^{n-1}$ or $Q_0^{n-2}$ is selected at step 208, accordingly as n is even or odd, $G^n$ is decomposed, at step 210, into an alternating collection of cosets from $Q_0^{n-1}$ or $Q_0^{n-2}, \ldots M_0^{2k}, N_0^{2k}, \ldots, G_0^k, H_0^k, I_0^k \ldots$ where each subgroup and coset is decomposed into successively smaller cosets. At step 212, the selected cosets are modified by their respective mixing transforms. The resulting second matrix of $2^n$ equations is the nonlinear orthomorphism.

Finally, at step 214, each clear text block to be encrypted, which is uniquely located as one of the $2^n$ n-bit numbers in the left column of the second matrix of $2^n$ equations is added modulo 2 to the block in the middle column of the associated equation to obtain the encrypted block in the right column of the associated equation. Final step 214 is in accordance with the encryption steps of methods described above and will not be set forth further herein.

FIG. 22 illustrates the method of FIG. 21 for an encryption wherein $n=8$. Initially, at step 302, a first matrix $G^8$ of 256 equations is determined. All of the equations in the first matrix of the 256 equations are characterized by the sum modulo 2 of any number of the equations also being one of the equations in the first matrix. One of the set of 256 is the identity equation $\Theta \oplus \Theta = \Theta$. The remaining 255 equations are orderable as illustrated in Equation 11b. However, whereas these equations represent a general n-bit system, the equations generated by step 302 of the method of FIG. 22 correspond to an 8-bit system. Hence, $L_8$, $M_8$ and $R_8$ are the left, middle and right columns respectively. $G^8 = L_8 \times M_8, \times R_8$.

Steps 304-314 act to modify a plurality of the nonzero equations in the first matrix of 256 equations to provide a second matrix of 256 equations. The equations are modified so that the modified equations collectively map the clear text blocks in a nonlinear manner to the encrypted blocks in contrast to the linear manner by which this is done by the corresponding unmodified equations. The plurality of equations are modified in such a manner that the modified equations are not generally the sums modulo 2 of any number of the other equations in the second matrix of equations.

At step 304, three disjoint corruptible subgroups of order 4 are selected from $G^8$. The three disjoint corruptible subgroups are identified by $G_0^2$, $H_0^2$, and $I_0^2$. At step 306, three subgroups of order 16 are generated from the pairs of disjoint corruptible subgroups of order 4. The three subgroups of order 16 are identified as $M_0^4$, $N_0^4$, and $P_0^4$. $M_0^4$ is derived from $G_0^2 \cup H_0^2$. $N_0^4$ is derived from $G_0^2 \cup I_0^2$. $P_0^4$ is derived from $H_0^2 \cup I_0^2$.

At step 308, a subgroup $Q_0^6$ of order 64 is derived from the union of the three disjoint corruptible subgroups $G_0^2 \cup H_0^2 \cup I_0^2$. At 310, cosets $Q_1^6, Q_2^6$, and $Q_3^6$ are generated. The cosets 16 rows are decomposed into 4 cosets of each at step 312. Next, at step 314, each of the four cosets 16 rows are decomposed into four cosets of four rows each. At step 316 the cosets are transformed by their respective mixing transforms as shown in Section III above.

Finally, at step 318, each clear text block in the left column to be encrypted, is added modulo 2 to the corresponding block in the middle column of the associated equation of the second matrix of 256 equations to obtain the encrypted block in the right column.

As with preceding embodiments, the methods illustrated in FIGS. 21 and 22 are implemented using the block substitution devices described above, but modified to perform a particular manipulations of the blocks set forth herein. Preferably, hardwired circuitry is provided to perform the manipulations. However, a programmed computer or microprocessor can alternatively be employed.

VII. COSETS OF DISJOINT, CORRUPTIBLE SUBGROUPS

With reference to FIG. 23, a third preferred method for encrypting data will now be described. The method employs cosets of disjoint corruptible subgroups. The method will be initially described in general, mathematical terms, then specific steps of the method will be described with reference to the figures.

If two subgroups are disjoint, except for the identity row, then they will also have disjoint subgroups of mixing transformations. Considering a pair of subgroups of order 4, then a corresponding pair of cosets can have, at most, one row in common. If a collection of such disjoint cosets is assembled, each will be corrupted with a different mixing transformation. This raises two fundamental issues:

a. How many such disjoint corruptible cosets can be found in a given linear orthomorphism?
b. What group structure is there in the corresponding set of mixing transformations?

To make a good nonlinear orthomorphism, that is, to ensure that in Equation 39, N(x, y) has a uniform distribution over $Z_2^n$, it is necessary to corrupt enough equations and to have a set of mixing transformations that do not frequently cancel each other out.

In a maximal length linear orthomorphic array of equations, two subsets of k equations, each having the same relative spacing, are defined as being "similar". The middle columns of two such subsets have the form:

$$\left.\begin{array}{cc} x_a & x_{a+1} \\ x_b & x_{b+1} \\ x_c & x_{c+1} \\ \cdot & \cdot \\ \cdot & \cdot \\ \cdot & \cdot \end{array}\right\} k \text{ rows} \quad (67)$$

for some integer 1. Maximal subgroups are examples of similar subsets.

Proposition 8: If $G_i^2$ is a coset of order $2^2 = 4$ in the coset decomposition defined by a corruptible subgroup $G_0^2$ of order 4 and $G_{i+d}^2$ is a set of four equations similar to, but disjoint from, $G_i^2$, then, $H_{i+d}^2$ is a coset in the decomposition defined by another corruptible subgroup $H_0^2$ where $G_0^2 \cap H_0^2 = \{\theta\}$.

The foregoing proposition is established by the following: A corruptible subgroup of order 4 has the form:

$$\theta \oplus \theta = \theta$$

$$x_{j-1} \oplus x_j = x_{j-p}$$

$$x_j \oplus x_{j+1} = x_{j+1-p}$$

$$x_{q-1} \oplus x_q = x_{q-p} \quad (68)$$

where $x_q = x_j \oplus Z_{j+1}$. The corresponding mixing transform is $x_j \oplus x_j = \theta$. A coset is generated by adding a row, not in the subgroup, to each row in the subgroup, to obtain:

$$x_{a-1} \oplus x_a = x_{a-p}$$

$$(x_{j-1} \oplus x_{a-1}) \oplus (x_j \oplus x_a) = (x_{j-p} \oplus x_{a-p})$$

$$(x_j \oplus x_{a-1}) \oplus (x_{j+1} \oplus x_a) = (x_{j+1-p} \oplus x_{a-p})$$

$$(x_{q-1} \oplus x_{a-1}) \oplus (x_q \oplus x_a) = (x_{q-p} \oplus x_{a-p}) \quad (69)$$

The sum of the first two numbers in the middle column of the coset, $x_a \oplus (x_j \oplus x_a) = x_j$, regains the mixing transform. $x_j \oplus x_a = x_b$ for some row of index b. Similarly, $x_{j+1} \oplus x_a = x_c$ $x_q + x_a = x_d$ for some indices c and d. If all the indices are shifted by some integer 1, a similar set of equations is formed:

$$x_{a+1-1} \oplus x_{a+1} = x_{a+1-p}$$

$$x_{b+1-1} \oplus x_{b+1} = x_{b+1-p}$$

$$x_{c+1-1} \oplus x_{c+1} = x_{c+1-p}$$

$$x_{d+1-1} \oplus x_{d+1} = x_{d+1-p} \quad (70)$$

Before shifting the indices, $x_a \oplus x_b = x_j$, the original mixer. However, because of the structure of the linear orthomorphic array which is generated by a linear recursive function, $x_{a+1} \oplus x_{b+1} = x_k \neq x_j$, for some index k. Adding row a+1 to each of the other three produces a new corruptible subgroup:

$$\theta \oplus \eta = \theta$$

$$x_{k-1} \oplus x_k = x_{k-p}$$

$$x_k \oplus x_{k+1} = x_{k+1-p}$$

$$x_{r-1} \oplus x_r = x_{r-p} \quad (71)$$

where $x_r = x_k \oplus x_{k+1}$. The three non-zero rows will be displaced from their counterparts in $G_0^2$ by a difference in index of $k-j$.

With the foregoing general description of the method in mind, the method will now be described with reference to FIG. 23. As with the previously described methods of sections V and VI, the method of FIG. 23 operates to encrypt a set of $2^n$ unique clear text blocks of n-bit binary numbers by substituting therefore associated unique encrypted blocks of n-bit binary numbers. Also as with the prior methods, encryption begins, step 402 by finding a first matrix $G^n$ of $2^n$ equations representing a linear orthomorphism with each equation representing the modulo 2 additions of one the $2^n$ clear text blocks in the left column with a unique one of the $2^n$ n-bit numbers in the middle column to provide an associated unique n-bit block in the right column with all of the equations in the first matrix of $2^n$ equations characterized by the vector sum modulo two of any number of the equations also being one of the equations of the first matrix. Equations include the null equation with the remaining $2^n-1$ being orderable as illustrated in Equation 11b above. At step 404-414, a plurality of non-zero $2^n-1$ equations in the first matrix are modified to provide a second matrix of $2^n-1$ equations.

At step 304, a corruptible subgroup of order four is selected from $G^n$. Such a subgroup of order four is generally represented as:

$$\theta \oplus \theta = \theta$$

$$x_m \oplus x_1 = x_{1-p}$$

$$x_1 \oplus x_2 = x_{2-p}$$

$$x_{q-1} \oplus x_q = x_{q-p}$$

where $x_q = x_1 \oplus x_2$.

At step 306, a coset is generated by choosing an equation, represented by index a, which is not in the corruptible subgroup of order four. The equation is added vectorially to the corruptible subgroup to yield a coset represented by:

$$x_{a-1} \oplus x_a = x_{a-p}$$

$$x_{b-1} \oplus x_b = x_{b-p}$$

$$x_{c-1} \oplus x_c = x_{c-p}$$

$$x_{d-1} \oplus x_d = x_{d-p}$$

where $x_b = x_a \oplus x_1$, $x_c = x_a \oplus x_2$, $x_d = x_a \oplus x_q$. In the case where m is not a prime number, choose an integer l which divides m.

Thereafter, at step 308, values are determined for values a mod 1, b mod 1, c mod 1 and d mod 1. At 310, if any of the values determined at step 308 are duplicated, then steps 306, and 308 are repeated with an equation of different index. Once a set of values are achieved wherein there are no duplications, step 312 is performed wherein m/l additional cosets are generated. The additional cosets have the form $$x_{a+kl-1} \oplus x_{a+kl} = x_{a+kl-p}$$

$$x_{b+kl-1} \oplus x_{b+kl} = x_{b+kl-p}$$

$$x_{c+kl-1} \oplus x_{c+kl} = x_{c+kl-p}$$

$$x_{d+kl-1} \oplus x_{d+kl} = x_{d+kl-p}.$$

where $0 \leq k \leq m/l - 1$.

At step 314, the mixing transforms are applied to the corresponding cosets. The mixing transform is represented by $w_{kl} \oplus w_{kl} = \ominus$ wherein $w_{kl} = W_{a+kl} \oplus X_{b+kl}$. Each mixing transform is applied to constructively corrupt the corresponding coset, thereby yielding the second matrix of $2^n$ equations.

Finally, at step 316, each clear text block in the left column to be encrypted, is added modulo two to the corresponding block in the middle column of the associated equation of the second matrix of $2^n$ equations to obtain the encrypted block in the right column. Final step 316 is similar to previous final steps described above with reference to the other preferred embodiments of the invention.

Preferably, hardwire circuitry is provided for performing the various steps set forth in FIG. 23. However, programmed computers or microprocessors may alternatively be employed.

As a specific example of the method of FIG. 23, consider the orthomorphism in Equation 51. Let $G_0^2$ be:

| | | | | | | (72) |
|---|---|---|---|---|---|---|
| 0 | $\theta$ | $\oplus$ | $\theta$ | = | $\theta$ | |
| 1 | BEFH | $\oplus$ | A | = | ABEFH | |
| 2 | A | $\oplus$ | B | = | AB | |
| 234 | ABEFH | $\oplus$ | AB | = | EFH | |

The mixing transform is A. Use row 7 to generate a coset:

| | | | | | | (73) |
|---|---|---|---|---|---|---|
| 7 | F | $\oplus$ | G | = | FG | |
| 50 | BEH | $\oplus$ | AG | = | ABEGH | |
| 226 | AF | $\oplus$ | BG | = | ABFG | |
| 139 | ABEH | $\oplus$ | ABG | = | EGH | |

From the middle column the mixer is $x_7 \oplus x_{50} = G \oplus AG = A$. Displace by indices by $1 = 5$ to obtain:

| | | | | | |
|---|---|---|---|---|---|
| 12 | AEFGH | ⊕ | ABCH | = | BCEFG |
| 55 | AFGH | ⊕ | ABCFH | = | BCG |
| 231 | AEGH | ⊕ | ABCGH | = | BCE |
| 144 | AGH | ⊕ | ABCFGH | = | BCF |

(74)

The corresponding subgroup can be found by adding row 12 to the other 3:

| | | |
|---|---|---|
| 0 | $\theta \oplus \theta = \theta$ | |
| 6 | $E \oplus F = EF$ | |
| 7 | $F \oplus G = FG$ | |
| 239 | $EF \oplus FG = EG$ | |

(75)

From either the new coset or the corresponding subgroup, the new mixing transform is $F \oplus F = \theta$.

This process can be applied to subgroups of larger order but is particularly easy to use for constructive corruption with cosets of order 4. A procedure is as follows, choose an arbitrary corruptible subgroup of order 4. Without loss of generality the subgroup is:

$\theta \oplus \theta = \theta$ $x_m \oplus x_1 = x_{1-p}$ $x_1 \oplus x_2 = x_{2-p}$ $x_{q-1} \oplus x_q = x_{q-p}$ (76)

Assume initially that $m = 2^n - 1$ is not a prime (that is not a Mersenne prime). Choose some integer l which divides m and use this as the shift of indices as in the proof of Prop. 8 above. As in that same proof, choose an equation with some index a, which is not in the subgroup. Adding it vectorially to each equation in Equation 76, one obtains a coset:

$x_{a-1} \oplus x_a = x_{a-p}$ $x_{b-1} \oplus x_b = x_{b-p}$ $x_{c-1} \oplus x_c = x_{c-p}$ $x_{d-1} \oplus x_d = x_{d-p}$ (77)

Next, determine the four values a mod l, b mod l, c mod l, and d mod l. If there is any duplication, reject this coset and try another, since finding successive similar cosets by using multiples of l as an increment to the indices would lead to a conflict. For example, assume that $a \equiv b$ mod l. Then, for some integer g, $a = b + gl$ so that some subsequent coset would have the same row as a previous coset. Assume now that a, b, c, and d are distinct mod l. Generate m/l similar cosets of the form:

$x_{a+kl-1} \oplus x_{a+kl} = x_{a+kl-p}$ $x_{b+kl-1} \oplus x_{b+kl} = x_{b+kl-p}$ $x_{c+kl-1} \oplus x_{c+kl} = x_{c+kl-p}$ $x_{d+kl-1} \oplus x_{d+kl} = x_{d+kl-p}$ (78)

where $0 \leq k \leq m/l - 1$. This will give a total of $4m/l$ equations in the linear orthomorphism as candidates for constructive corruption. In each coset, the mixing transform is $w_{kl} \oplus w_{kl} = \theta$ where $w_{kl} = x_{a+kl} \oplus x_{b+kl}$. From equations 76 and 77 $w_0 = x_a \oplus x_b = x_1$ and thus $w_{kl} = x_{1+kl}$. Thus, the set of mixers is $W = \{x_i | i \equiv 1 \mod l\}$ and $|W| = m/l$.

Proposition 9: It can be established that for a set of m/l similar corruptible cosets of order 4, if $3 | m$, then for any pair $x_i, x_j \in W$ $x_i \oplus x_j \in W$. Also, it can be established that if $3 | m$ and $x_i \oplus x_j = x_k$, where all are in W, then $j - 1 \equiv k - j \equiv m/3 \mod m$.

The forgoing proposition is established by the following: $W \cup \theta$ is not a group. If it were, being a subgroup of $Z_n^2$, $|W \cup \theta| = m/l + 1 = 1^k$ for some positive integer k. In that case, $2^n - 1/l + 1 = 2^k$ and $2^k = 1 - 1/l - 2^{n-k}$. Even if $1 - 2 n^{-k} | 1 - 1$ the ratio must be odd while $2^k$ is even for $k > 0$. Without loss of generality, assume $x_1 \oplus x_{1+gl} = x_{1+hl}$ for some integers g and h, that is, $x_1$, $x_{1+gl}$ and $x_{1+hl} \in W$. If $hl > m$, then $hl \equiv cl \mod m$, and $cl < m$ since $l | m$. Keeping in mind that the subscripts are indices of rows in the linear orthomorphic array, it is also true that $x_{1+gl} \oplus x_{1+2gl} = x_{1+gl+hl}$. Assuming that $3 | m$, combine $x_{1+gl} \oplus x_{1+2gl} = x_{1+gl+hl}$ with $x_1 \oplus x_{1+gl} = x_{1+hl}$ to obtain:

$x_1 \oplus x_{1+2gl} = x_{1+hl} \oplus x_{1+gl+hl} = x_{1+2hl}$ (79)

More generally, for all integers j:

$x_1 \oplus x_{1+jgl} = x_{1+jhl}$ (80)

Thus, $x_1 \oplus x_k \in W$ for all $x_k \in W$. The same reasoning can be applied to any other $x_i \in W$ in place of $x_1$. This would imply that $W \cup \theta$ is a group, which is a contradiction, Now, suppose $3 | m$. Consider a possible sum:

$x_1 \oplus x_{1+m/3} = x_{1+2m/3}$ (81)

If we use the same procedure which led to Equation 80

$x_{1+m/3} \oplus x_{1+2m/3} = x_{1+3m/3} x_1$ (82)

Thus, we obtain the same equation. So this cannot be used to generate a group.

The practical consequences of this are that if two equations are in the same coset, their sum will be elsewhere. The equations will have a common mixer, say $W_i$, for constructive corruption. That sum will be one of the three nontrivial equations in the subgroup of Equation 76. Noting that $S(x) = S'(x) \oplus w_i$ where $S'(x)$ is the original mapping from the linear orthomorphism, and $S(x)$ is the resultant mapping after constructive corruption, if that sum equation is not in one of the other corruptible cosets, then from Equation 4:

$N(x,y) = w_i \oplus w_i \oplus \theta = \theta$ (83)

and the triple will be linear. If the sum equation is in another of the corruptible cosets, it will have as mixer some $w_j \neq w_i$ so that:

$N(x,y) = w_i \oplus w_i \oplus w_j = w_j$ (84)

If two equations from different cosets are added, with respective mixers $w_i$ and $w_j$, then there are three possibilities, accordingly as the sum equation is not in a coset, is in one of the original cosets, or is in a third coset:

$N(x,y) = w_i \oplus w_j \oplus \theta = w_i \oplus w_j \neq \theta$ $N(x,y) = w_i \oplus w_j \oplus w_i = w_j \neq \theta$ $$N(x,y) = w_i \oplus w_j \oplus w_k \neq \theta \text{ if } 3 \text{ or } 1|m \tag{85}$$

If two equations, one from a coset and one not in any of the cosets, are added, there are three possibilities as in the previous case:

$$N(x,y) = w_i \oplus \theta \oplus \theta = w_i \neq \theta$$

$$N(x,y) = w_i \oplus \theta \oplus w_l = \theta$$

$$N(x,y) = w_i \oplus \theta \oplus w_j = w_i \oplus w_j \neq \theta \tag{86}$$

Lastly, if two equations are added, neither of which is in one of the corruptible cosets, then there are two possibilities, accordingly as their sum is not/or is in a coset:

$$N(x,y) = \theta \oplus \theta \oplus \theta = \theta$$

$$N(x,y) = \theta \oplus \theta \oplus w_i = w_i \neq \theta \tag{87}$$

To minimize residual linearity, it is clear from the above that two conditions are required, namely, that the residual set of equations not included in the cosets be small and contain no subgroups. As an example, consider the same linear orthomorphism in Equation 51 on 8-bit binary numbers, and the subgroup and coset in Equations 72 and 73:

| Row Index | | (88) |
|---|---|---|
| 7 | $F \oplus G = FG$ | |
| 50 | $BEH \oplus AG = ABEGH$ | |
| 226 | $AF \oplus BG = ABFG$ | |
| 139 | $ABEH \oplus ABG = EGH$ | |

Again we will apply $l=5$ as the increment to the row indices to generate a sequence of cosets. Note that:

$7 \equiv 2 \mod 5$ $50 \equiv 0 \mod 5$ $226 \equiv 1 \mod 5$ $139 \equiv 4 \mod 5 \tag{89}$ Since $m = 2^n - 1 = 255 = 5.51$, $1|m$ and the set of row indices above, when incremented by $l=5$, will never overlap, i.e., $7+5i \neq 50+5j$ for all integers $i, j$ and the same for the other pairs. Thus, this process will yield 51 cosets of four equations each, a total of 204 equations for modification by constructive corruption. As shown in the proof of Prop. 8, the mixer for the above coset is $G \oplus AG = A$, that is, the sum of the middle terms of the first two equations in the coset. That is the middle term of the first non-zero row in the linear orthomorphism:

$$x_m \oplus x_1 = x_{1-p} \tag{90}$$

or $$BEFH \oplus A = ABEFH$$

Thus, designating coset 5k as the coset whose first equation is:

$$x_{6+5k} \oplus x_{7+5k} = x_{7+5k-p} \tag{91}$$

The corresponding mixing transform is:

$$w_{5k} = x_{7+5k} \oplus x_{50+5k} = x_{1+5k}. \tag{92}$$

So, including the additive identity, $W = \{\theta, x_1, x_6, \ldots, x_{251}\}$ and $|W| = 52$. Since $m = 255 = 3.85$, $3|m$, and $x_1 \oplus x_{86} = x_{171}$. As in the proof of Prop. 9, this is the only such triple of numbers all in W. In this example:

$$x_1 A, \ x_{86} = ADH, \text{ and } x_{171} = DH. \tag{93}$$

There are, of course, many ways to select cosets from different sub-groups. For example, choose $l=17$ in the same linear orthomorphism since $m = 255 = 15.17$. Consider three cosets (shown below) from three distinct subgroups:

| Row Index | Coset | Row Index | Subgroup | (94) |
|---|---|---|---|---|
| 4 | $C \oplus D = CD$ | 0 | $\theta \oplus \theta = \theta$ | |
| 75 | $CDEFGH \oplus ACDEH = AFG$ | 251 | $DEFGH \oplus ACEH = ACDFG$ | |
| 37 | $AEH \oplus ABCG = BCEGH$ | 252 | $ACEH \oplus ABCDG = BDEGH$ | |
| 142 | $ADFG \oplus BEGH = ABDEFH$ | 229 | $ACDFG \oplus BDEGH = ABCEFH$ | |
| | | | | |
| 9 | $H \oplus ACFG = ACFGH$ | 0 | $\theta \oplus \theta = \theta$ | |
| 80 | $BEF \oplus CFG = BCEG$ | 1 | $BEFH \oplus A = ABEFH$ | |
| 42 | $AH \oplus ABCFG = BCFGH$ | 2 | $A \oplus B = AB$ | |
| 147 | $ABEF \oplus BCFG = ACEG$ | 234 | $ABEFH \oplus AB = EFH$ | |
| | | | | |
| 14 | $ABDFG \oplus BCEGH = ACDEFH$ | 0 | $\theta \oplus \theta = \theta$ | |
| 85 | $ABDEFG \oplus BCEFGH = ACDH$ | 6 | $E \oplus F = EF$ | |
| 47 | $ABDG \oplus BCEH = ACDEGH$ | 7 | $F \oplus G = FG$ | |
| 152 | $ABDEG \oplus BCEFH = ACDFGH$ | 239 | $EF \oplus FG = EG$ | |

| | | Mixers | (95) |
|---|---|---|---|
| 4 | $\equiv 4 \mod 17$ | $x_{251} = ACEH$ | |
| 75 | $\equiv 7 \mod 17$ | | |
| 37 | $\equiv 3 \mod 17$ | | |
| 142 | $\equiv 6 \mod 17$ | | |
| | | | |
| 9 | $\equiv 9 \mod 17$ | $x_1 = A$ | |
| 80 | $\equiv 12 \mod 17$ | | |
| 42 | $\equiv 8 \mod 17$ | | |
| 147 | $\equiv 11 \mod 17$ | | |

14 ≡ 14 mod 17      $x_6 = F$
85 ≡ 0 mod 17
47 ≡ 13 mod 17
152 ≡ 16 mod 17

Since all row indices are different mod 17, there will be no overlap using increment 1—17. This process will generate 3×15=45 cosets or 180 equations as candidates for constructive corruption. The set of mixers $$W=\{\theta, x_1, x_{18}, \ldots, x_{239}, x_6, x_{23}, \ldots, x_{244}, x_{13}, x_{30}, \ldots, x_{251}\} \quad (96)$$

and $$|W| = 46. \quad (97)$$

There are many other possibilities. For example, one could use the subgroup of order 8 in Equation 52. Its cosets are completely corruptible, i.e., they have a group a four mixing transformations. Applying Prop. 7, one can select a coset of eight equations, Equation 53 of which six are to be non-linearized, as follows:

| Row Index | | Mixer | (98) |
|---|---|---|---|
| 6 | $E \oplus F = EF$ | $x_0 = \theta$ | |
| 169 | $AE \oplus BF = ABEF$ | $x_3 = C$ | |
| 95 | $ACE \oplus BDF = ABCDEF$ | $x_{235} = BC$ | |
| 215 | $CE \oplus DF = CDEF$ | $x_2 = B$ | |
| 121 | $ABE \oplus BCF = ACEF$ | $x_3 = C$ | |
| 155 | $BE \oplus CF = BCEF$ | $x_0 = \theta$ | |
| 91 | $ABCE \oplus BCDF = ADEF$ | $x_{234} = BC$ | |
| 209 | $BCE \oplus CDF = BDEF$ | $x_2 = B$ | |

Using an increment 1=17, one can obtain 15 disjoint sets of six rows each from:

| Row Index | | Mixer | (99) |
|---|---|---|---|
| 169 | ≡ 16 mod 17 | $x_3$ | |
| 95 | ≡ 10 mod 17 | $x_{235}$ | |
| 215 | ≡ 11 mod 17 | $x_2$ | |
| 121 | ≡ 2 mod 17 | $x_3$ | |
| 91 | ≡ 13 mod 17 | $x_{235}$ | |
| 209 | ≡ 5 mod 17 | $x_2$ | |

Shifting row indices by 7, one can obtain 15 more disjoint sets of six rows each from:

| Row Index | | Mixer | (100) |
|---|---|---|---|
| 176 | ≡ 6 mod 17 | $x_{10}$ | |
| 102 | ≡ 0 mod 17 | $x_{242}$ | |
| 222 | ≡ 1 mod 17 | $x_9$ | |
| 128 | ≡ 9 mod 17 | $x_{242}$ | |
| 98 | ≡ 3 mod 17 | $x_{10}$ | |
| 216 | ≡ 12 mod 17 | $x_9$ | |

The combination provides 180 rows or equations for non-linearization, but the set of mixing transformations W is no longer free of additive triples, so that there is some group structure among the mixers.

The process of obtaining corruptible cosets from disjoint subgroups is slightly more complicated when $2^n - 1 = m$ is a prime since there is a discontinuity when shifting the row indices across m. As an example, consider the block size 7 maximal length linear orthomorphism defined by the generating function:

$$x_k = x_{k-7} \oplus x_{k-5} \oplus x_{k-4} \oplus x_{k-3} \oplus x_{k-2} \oplus x_{k-1}. \quad (101)$$

As in equation 52 one can let {A,B,C,D,E,F,G} be an arbitrary, complete, linearly independent set of 7-bit binary numbers. As before, the notation ABC is shorthand for $A \oplus B \oplus C$. A partial listing of the resulting equations is as follows:

| Row Index | | | | | (102) |
|---|---|---|---|---|---|
| 0 | $\theta$ | $\oplus$ | $\theta$ | $\theta$ | |
| 1 | BCDEFG | $\oplus$ | A | ABCDEFG | |
| 2 | A | $\oplus$ | B | AB | |
| 3 | B | $\oplus$ | C | BC | |
| 4 | C | $\oplus$ | D | CD | |
| 5 | D | $\oplus$ | E | DE | |
| 6 | E | $\oplus$ | F | EF | |
| 7 | F | $\oplus$ | G | FG | |
| 8 | G | $\oplus$ | ACDEFG | ACDEF | |
| . | | | | | |
| . | | | | | |
| . | | | | | |
| 126 | AFG | $\oplus$ | ABCDEF | BCDEG | |
| 127 | ABCDEF | $\oplus$ | BCDEFG | AG | |

A typical corruptible subgroup of order 4 is:

| Row Index | | | | | (103) |
|---|---|---|---|---|---|
| 0 | $\theta$ | $\oplus$ | $\theta$ | = $\theta$ | |
| 1 | BCDEFG | $\oplus$ | A | = ABCDEFG | |
| 2 | A | $\oplus$ | B | = AB | |
| 110 | ABCDEFG | $\oplus$ | AB | = CDEFG | |

From this one can construct the following coset:

| Row Index | | | | | (104) |
|---|---|---|---|---|---|
| 8 | G | $\oplus$ | ACDEFG | = ACDEF | |
| 91 | BCDEF | $\oplus$ | CDEFG | = BG | |
| 109 | AG | $\oplus$ | ABCDEFG | = BCDEF | |
| 127 | ABCDEF | $\oplus$ | BCDEFG | = AG | |

Although 5|127 one finds it is a possibility for incremental spacing if we find a coset with different row indices mod 5. In this case:

8 ≡ 3 mod 5

91 ≡ 1 mod 5

109 ≡ 4 mod 5

127 ≡ 2 mod 5 $\quad (105)$

Displacing these indices by 5, one obtains:

$13 \equiv 3 \mod 5$ $96 \equiv 1 \mod 5$ $114 \equiv 4 \mod 5$ $5 \equiv 0 \mod 5$ \hfill (106)

Displacing these indices by another 15, one obtains:

$28 \equiv 3 \mod 5$ $111 \equiv 1 \mod 5$ $2 \equiv 2 \mod 5$ $20 \equiv 0 \mod 5$ \hfill (107)

Displacing these indices by another 20, one obtains:

$48 \equiv 3 \mod 5$ $4 \equiv 4 \mod 5$ $22 \equiv 2 \mod 5$ $40 \equiv 0 \mod 5$ \hfill (108)

Displacing these indices by another 80, one obtains:

$1 \equiv 1 \mod 5$ $84 \equiv 4 \mod 5$ $102 \equiv 2 \mod 5$ $120 \equiv 0 \mod 5$ \hfill (109)

One can go one step further with a final increment of 10:

$11 \equiv 1 \mod 5$ $94 \equiv 4 \mod 5$ $112 \equiv 2 \mod 5$ $3 \equiv 3 \mod 5$ \hfill (110)

This process has produced 27 disjoint cosets or 104 out of 127 rows for the constructive corruption process. The above procedure has used up all rows of indices 0 or 3 mod 5. So no further corruptible cosets exist with all different row indices. However, 15 rows of index 1 mod 5, 2 of index 2 mod 5, and 2 of index 4 mod 5 remain. The mixing transforms are the sums of the numbers in the middle columns of the first two rows in each coset, that is:

$x_8 \oplus x_{91} = x_1, x_{13} \oplus x_{96} = x_6, \ldots, x_6 \oplus x_{89} = x_{126}$ and $x_{11} \oplus x_{94} = x_4.$ \hfill (111)

Thus the set of mixing transforms is $W = \{\theta, x_{1+5k}, x_4\}$ for $0 \leq k \leq 25$ and $|W| = 28$. Note that in this case, the conditions of Prop. 9 do not hold, that is, $1 \mid m$ and there are some pairs in W whose sums are also in W.

There are many other ways of selecting corruptible cosets for the non-linearization process. Mixing cosets of different orders can provide a mechanism for including almost all of the equations in the linear array but this must be balanced against the structure of the set of mixing transforms. The total number of orthomorphisms on n-bit numbers is not known.

While a preferred embodiment for the encryption and decryption of the present invention has been disclosed and described herein, it will be obvious to one skilled in the art that various changes in form and detail may be made therein without departing from the spirit and scope of the invention.

VIII. DEFINITIONS OF TERMS AND SYMBOLS

All the following definitions are specialized to n-bit binary numbers, under the operation of bit wise addition modulo 2 (XORing) and to bijective mappings on these numbers.

Affine Mapping: A bijective mapping, T on $Z_2^n$ such that $T(x) \oplus T(y) = T(x \oplus y) \oplus c$ for some constant c and all x, y, $\in Z_2^n$. In engineering, this is frequently referred to as linear. Here, the term linear is reserved for the case where $c = \theta$, the additive identity.

Balanced Mapping: Let $H_i$ be a maximal subgroup of $Z_2^n$, i.e., $H_i$ is a subgroup of order $|H_i| = 2^{n-1}$. $Z_2^n = H_i \cup \overline{H}_i$. If a bijective mapping T has the property $|TH_i| = |T\overline{H}_i| = 2^{n-1}$ for all maximal subgroups, T is said to be a balanced mapping.

Completely Corruptible: A corruptible coset with a maximal number of mixing transformations. If the order of the completely corruptible coset is $2^k$, then the order of the corresponding set of mixing transforms is $2^{k-1}$.

Constructive Corruption: The process of converting a linear orthomorphism to a nonlinear orthomorphism by rearranging the order of the blocks in two columns of the linear array of equations (FIG. 2), holding the third column fixed, while preserving equality in each row.

Corruptible Set: A set of equations, usually a coset or a subgroup, which can be non-linearized as a self-contained set, by the process of constructive corruption.

Dynamic Substitution Device: A block substitution device or S-box, which uses an orthomorphism on $Z_2^n$, the n-bit binary numbers, for encryption or decryption.

Generating Function: A recursive function of the form:

$x_k = x_{k-n} \oplus x_{k-1} \oplus \ldots$ which, when applied to a complete linearly independent set of n-bit numbers, defines a linear orthomorphism in equation 11. These are the same as generating functions of linear feedback shift registers but with domain $Z_2^n$ rather then individual binary bits. The generating functions are primitive polynomials in the Galois field $GF(2^n)$.

Linear Array: An array of $2^n$ equations which represents a linear (auto-morphic) orthomorphism on $Z_2^n$. (See Equation 11)

Linear Orthomorphism: An orthomorphism where the mapping $Z_2^n \to Z_2^n$ is linear.

Maximal Orthomorphism: An orthomorphism on $Z_2^n$ which can be represented as a permutation of $Z_2^n$ with no cycles except for a single fixed point.

Mixer or Mixing Transformation/Transform: An equation of the form $w \oplus w = \theta$ used in the process of constructive corruption. The mixer or mixing transform is added vectorially modulo 2 to a corruptible set of equations in a linear orthomorphism to obtain a nonlinear orthomorphism.

Orthomorphism: A one-to-one mapping on $Z_2^n$ such that each number added modulo 2 to its image, generates all of $Z_2^n$, that is, $R:Z_2^n \rightarrow Z_2^n$ such that:

$$\{x \oplus R(x) | x \epsilon Z_2^n\} = Z_2^n.$$

Orthomorphic Permutation: The permutation on $Z_2^n$ defined by an orthomorphism.

Row: A single equation in the array of equations representing an orthomorphism on $Z_2^n$. (See Equation 10)

Shift: The displacement between columns of n-bit numbers in the array of equations representing a linear orthomorphism.

Each column has the same order but a different starting point. (See Equation 11)

Similar Sets: Subsets of equations in a linear array that have the same relative spacing.

Vector: A row or equation in a linear array which can be thought of as a vector in three dimensions with coefficients in $Z_2^n$.

$\oplus$: Addition modulo 2 (XORing)

$\theta = 00 \ldots 0$: Additive identity $Z_2^n$: Group of all n-bit binary numbers $GF(2^n)$: Galois field of polynomials of degree n with binary coefficients $G^n$: A set of $2^n$ equations representing a linear orthomorphism on $Z_2^n$. $G^n$ is a group.

$G_0^k$: A subgroup of $G^n$ of order $2^k$.

$G_i^k$: A coset of $G_0^k$.

$R_k$ $R_{k-1}: R_k \cap \overline{R}_{k-1}$ $a|b$: a does not divide b.

$W_k$: The group of mixing transforms associated with $G_0^k$.

$\overline{G}^k$: A particular coset of $G_0^k$, defined as the relative complement $G_0^{k+1}$ $G_0^k$.

What is claimed is:

1. A method of encryption by substituting for any one of the $2^n$ unique clear text blocks of n bit binary numbers an associated unique encrypted block of n bit binary numbers comprising the steps of:

(a) finding a first matrix $G^n$ of $2^n$ equations, representing a linear orthomorphism, each equation representing the modulo 2 additions of one of the $2^n$ clear text blocks in the left column, with a unique one of $2^n$ n-bit blocks in the middle column to provide an associated unique n-bit block in the right column, all of the equations in the first matrix of $2^n$ equations being characterized by the vector sum modulo 2 of any number of the equations also being one of the equations in the first matrix, the equations including the identity equation $\theta \oplus \theta = \theta$ and the remaining $2^n - 1$ equations being orderable as follows:

| Equation # | | |
   |---|---|---|
   | 1 | $x_m \oplus x_1 = x_{1-p}$ | |
   | 2 | $x_1 \oplus x_2 = x_{2-p}$ | |
   | . | | |
   | . | | |
   | j | $x_j \oplus x_j = x_{j-p}$ | |
   | . | | |
   | . | | |
   | m | $x_{m-1} \oplus x_m = x_{m-p}$ | | where $m = 2^n$, L, M and R are the left, middle and right columns respectively, $G^n = L_n \times M_n \times R_n$, represents the set of equations, $G^{n-1}$ is a subgroup of $G^n$ generated by $n-1$ consecutive equations in $G^n$, being a submatrix of $2^{n-1}$ equations, $\overline{G}^{n-1}$ is the complement of $G^{n-1}$ in $G^n$, $G^{n-1} = L_{n-1} \times M_{n-1} \times R_{n-1}$, $\overline{G}^{n-1} = \overline{L}_{n-1} \times \overline{M}_{n-1} \times \overline{R}_{n-1}$, $W_{n-1} = L_{n-1} \cap M_{n-1}$, $G^{n-2}$ is a subgroup of $G^{n-1}$ generated by $n-2$ equations in $G^{n-1}$, being a submatrix of $2^{n-2}$ equations, $\overline{G}^{n-2}$ is the complement of $G^{n-2}$ in $G^{n-1}$, $G^{n-2} = L_{n-2} \times M_{n-2} \times R_{n-2}, \overline{G}^{n-2} = \overline{L}_{n-2} \times \overline{M}_{n-2} \times \overline{R}_{n-2}$, $W_{n-2} = L_{n-2} \cap M_{n-2}$, $\overline{W}_{n-2}$ is the complement of $W_{n-2}$ in $W_{n-1}$, with like subgroups being defined with indices n-2 to 2 wherein $W_2 = \{x, \theta\} = W_1 \cup \overline{W}$, where $x \neq \theta$ and $W_1 = \{\theta\}$ and $\overline{W}_1 = \{x\}$;

$G^{n-1}$ being a submatrix of $G^n$, including the identity equation, and the remaining $2^{n-1}$ equations being orderable as follows:

| Equation No. | $L_{n-1} \times M_{n-1} \times R_{n-1}$ | |
   |---|---|---|
   | $i_1$ | $x_{i1} \oplus x_{i1} = x_{i1-p}$ | |
   | $i_2$ | $x_{21} \oplus x_{21} = x_{21-p}$ | |
   | . | | |
   | . | | |
   | $i_j$ | $x_{ij} \oplus x_{ij} = x_{ij-p}$ | |
   | . | | |
   | . | | |
   | $i_s$ | $x_{is} \oplus x_{is} = x_{is-p}$ | | where $s - 2^{n-1} - 1$ and $\overline{G}^{n-1}$ is all of the remaining $2^{n-1}$ equations from $G^n$ which are not included in $G^{n-1}$, and corresponding for $G^{n-2}$ being a subset of $2^{n-2}$ equations from $G^{n-1}$ selected by choosing n-2 consecutive equations from $G^{n-1}$ and taking all sums of these and identity equations, and wherein $\overline{G}^{n-1}$ is all of the remaining $2^{n-2}$ equations from $G^{n-1}$ which are not included in $G^{n-2}$ and so on, for successively smaller subgroups until $G^2$ is selected with $2^2 = 4$ equations, including the identity equation, two consecutive equations and their sum from $G^3$ with $\overline{G}^2$ being four equations of $G^3$ not including $G^2$, (b) modifying a plurality of the non-zero $2^n - 1$ equations in the first matrix of $2^n$ equations to provide a second matrix of $2^n$ equations, representing a nonlinear orthomorphisms, the plurality of equations being modified so that the modified plurality of equations collectively map the clear text blocks in the left column to unique encrypted n-bit blocks in the right column, but in a nonlinear manner so that each of the modified equations is not generally the sum modulo 2 of any number of the equations in the unmodified first step wherein said modification of said plurality of the non-zero $2^{n-1}$ equations is achieved by applying the $2^{n-3}$ mixing transforms in $\overline{W}_{n-2}$ to $\overline{G}^{n-1}$;

applying the $2^{n-4}$ mixing transforms in $\overline{W}_{n-3}$ to $\overline{G}^{n-2}$;

continuing applying mixing transforms until reaching $\overline{G}^2$; and (c) for each clear text block in the left column to be encrypted, adding modulo 2 to that block, the unique one of the $2^n$ n-bit blocks associated therewith in the middle column in accordance with the associated equation of the second matrix of $2^n$ equations to obtain the encrypted block in the right column.

2. The method of claim 1, wherein step (b) further comprises the step of:

apply $\overline{W}_1$ to $\overline{G}^2$.

3. The method of claim 1, wherein step (b) further comprises the step of:

apply $\Theta$ to $\overline{G}^2$.

4. A method of encryption by substituting for any one of the $2^n$ unique clear text blocks of n bit binary numbers an associated unique encrypted block of n bit binary numbers comprising the steps of:
   (a) finding a first matrix $G^n$ of $2^n$ equations, representing a linear orthomorphism, each equation representing the modulo 2 additions of one of the $2^n$ clear text blocks in the left column with a unique one of $2^n$ n-bit blocks in the middle column to provide an associated unique n-bit block in the right column, all of the equations in the first matrix of $2^n$ equations being characterized by the vector sum modulo 2 of any number of the equations also being one of the equations in the first matrix, the equations including the identity equations $\Theta \oplus \Theta = \Theta$ and the remaining $2^n - 1$ equations being orderable as follows:

Equation #

| 1 | $x_m$ | $\oplus$ | $x_1$ | = | $x_{1-p}$ |
| 2 | $x_1$ | $\oplus$ | $x_2$ | = | $x_{2-p}$ |
| . | . | | . | | . |
| . | . | | . | | . |
| j | $x_j$ | $\oplus$ | $x_j$ | = | $x_{j-p}$ |
| . | . | | . | | . |
| . | . | | . | | . |
| m | $x_{m-1}$ | $\oplus$ | $x_m$ | = | $x_{m-p}$ | where $m=2^n$, $L_n$, $M_n$ and $R_n$ are the left, middle and right columns respectively, $G^n = L_n \times M_n \times R_n$ represents the set of equations,:
   (b) modifying a plurality of the non-zero $2^n - 1$ equations in the first matrix of $2^n$ equations to provide a second matrix of $2^n$ equations, representing a nonlinear orthomorphisms the plurality of equations being modified so that the modified plurality of equations collectively map the same text blocks in the left column to unique n-bit blocks in the right column, but in a nonlinear manner so that each of the modified equations is not generally the sum modulo 2 of any number of the equations in the unmodified first step wherein said modification of said plurality of the non-zero $2^n - 1$, equations is achieved by
   selecting from $G^n$ two or more disjoint corruptible subgroups of order $2^k$ where $2^k \leq n/2$, said subgroup being represented by, at least, $G_0^k$, $H_0^k$, $I_0^k$, with each such subgroup being generated from k consecutive equations in $G^n$ by taking modulo 2 sums of all combinations of such k equations, each set of such k equations being distinct, and the totality of such equations being less than or equal to n, forming subgroups, not necessarily disjoint, $M_0^{2k}, N_0^{2k}, \ldots$ or order $2^{2k}$ from pairs of $G_0^k, H_0^k, I_0^k, \ldots$, continuing forming subgroups until a subgroup $Q_0^{n-1}$ or $Q_0^{n-2}$ is selected, accordingly as n is odd or even, of order $2^{n-1}$ or $2^{n-2}$, with $G^n$ being decomposed into cosets of $Q_0$, which are in turn decomposed into cosets of next smaller subgroups until each of $M_0^{2k}, N_0^{2k} \ldots$ and their cosets are further decomposed into cosets of $G_0^k, H_0^k, I_0^k \ldots$, with each decomposition being into successively smaller cosets, (c) selecting an alternate sequence of such cosets to represent the entire first matrix of equations $G^n$,
   (d) modify each coset of alternate sequence with corresponding mixing transforms to yield the second matrix of equations, and
   (e) for each clear text block in the left column to be encrypted, adding modulo 2 to that block, the unique one of the $2^n$ n bit blocks associated therewith in the middle column in accordance with the associated equation of the second matrix of $2^n$ equations to obtain the encrypted block in the right column.

5. A method of encryption by substituting for any one of the $2^8$ unique clear text blocks of n bit binary numbers an associated unique encrypted block of n bit binary numbers comprising the steps of:
   (a) finding a first matrix $G^8$ of $2^8$ equations, representing a linear orthomorphism each equation representing the modulo 2 additions of one of the $2^8$ clear text blocks in the left column with a unique one of $2^8$ 8-bit blocks in the middle column to provide an associated unique 8-bit block in the right column, all of the equations in the first matrix of $2^8$ equations being characterized by the vector sum modulo 2 of any number of the equations also being one of the equations in the first matrix, the equations including the identity equation $\Theta \oplus \Theta = \Theta$ and the remaining $2^8 - 1 = 255$ equations being orderable as follows:

Equation #

| 1 | $x_m$ | $\oplus$ | $x_1$ | = | $x_{1-p}$ |
| 2 | $x_1$ | $\oplus$ | $x_2$ | = | $x_{2-p}$ |
| . | . | | . | | . |
| . | . | | . | | . |
| j | $x_j$ | $\oplus$ | $x_j$ | = | $x_{j-p}$ |
| . | . | | . | | . |
| . | . | | . | | . |
| m | $x_{m-1}$ | $\oplus$ | $x_m$ | = | $x_{m-p}$ | where $m = 2^8 - 1 = 255$, $L_8$, $M_8$ and $R_8$ are the left, middle and right columns respectively, $G^8 = L_8 \times M_8 \times R_8$ represents the set of equations;
   (b) modifying a plurality of the non-zero $2^8 - 1 = 255$ equations in the first matrix of $2^8 = 256$ equations to provide a second matrix of 256 equations, representing nonlinear orthomorphisms, the plurality of equations being modified so that the modified plurality of equations collectively map the clear text blocks in the left column to unique encrypted 8-bit blocks in the right column, but in a nonlinear manner so that each of the modified equations is not generally the sum modulo 2 of any number of the equations in the unmodified first set, wherein said modification of said plurality of non-zero 255 equations is achieved by selecting from $G^8$ three disjoint corruptible subgroups of order 4, $G_0^2$, $H_0^2$, and $I_0^2$;

generating, from $G_0^2$, $H_0^2$ and $I_0^2$, three subgroups of order 16, $M_0^4$ from $G_0^2 \cup H_0^2$, $N_0^4$ from $G_0^2 \cup I_0^2$, and $P_0^4$ from $H_0^2 \cup I_0^2$;

generating a subgroup $Q_1^6$ or order 64 from $G_0^2 \ H_0^2 \cup I_0^2$;

generating cosets $Q_1^6, Q_2^6$, and $Q_3^6$;

decomposing said cosets into four cosets of 16 rows each; and decomposing each of said four cosets into four cosets of four rows each;

(c) select an alternating sequence of such cosets to represent the entire first matrix of equations $G^n$, (d) modify each coset of said alternate sequences with its mixing transforms to determine the nonlinearized second matrix of equations, and (e) for each clear text block in the left column to be encrypted, adding modulo 2 to that block, the unique one of the $2^8$ 8-bit numbers associated therewith in the middle column of the associated equation of the second of $2^8$ equations to obtain the encrypted block in the right column.

6. A method of encryption by substituting for any one of the $2^n$ unique clear text blocks of n bit binary numbers an associated unique encrypted block of n bit binary numbers comprising the steps of:

(a) finding a first matrix $G^n$ of $2^n$ equations, representing a linear orthomorphism, each equation representing the modulo 2 addition of one of the $2^n$ clear text blocks in the left column, with a unique one of $2^n$ n-bit blocks in the middle column to provide an associated unique n-bit block in the right column, all of the equations in the first matrix of $2^n$ equations being characterized by the vector sum modulo 2 of any number of the equations also being one of the equations in the first matrix, the equations including the identity equation $\Theta \oplus \Theta = \Theta$ and the remaining $2^n - 1$ equations being orderable as follows:

Equation #

| 1 | $x_m$ | $\oplus$ | $x_1$ | = | $x_{1-p}$ |
|---|---|---|---|---|---|
| 2 | $x_1$ | $\oplus$ | $x_2$ | = | $x_{2-p}$ |
| . | . | . | . | . | . |
| . | . | . | . | . | . |
| . | . | . | . | . | . |
| j | $x_j$ | $\oplus$ | $x_j$ | = | $x_{j-p}$ |
| . | . | . | . | . | . |
| . | . | . | . | . | . |
| . | . | . | . | . | . |
| m | $x_{m-1}$ | $\oplus$ | $x_m$ | = | $x_{m-p}$ | where $m = 2^n - 1$, where m is not a prime number, $L_n$, $M_n$ and $R_n$ are the left, middle and right columns respectively, $G^n = L_n \times M_n \times R_n$ represents the set of equations;

(b) modifying a plurality of the non-zero $2^n - 1$ equations in the first matrix of $2^n$ equations to provide a second matrix of $2^n$ equations, representing a nonlinear orthomorphism, the plurality of equations being modified so that the modified plurality of equations collectively map the clear text blocks in the left column to unique encrypted n-bit blocks in the right column, but in a nonlinear manner so that each of the modified equations is not generally the sum modulo 2 of any number of the equations in the unmodified first step wherein said modification of said plurality of the non-zero $2^n - 1$ equations is achieved by (1) selecting a corruptible subgroup of order 4 from $G^n$ with two consecutive rows from the first, linear orthomorphic matrix of equations, said subgroup of order 4 being generally represented as $$\Theta \ \oplus \ \Theta \ = \ \Theta$$
$$x_m \ \oplus \ x_1 \ = \ x_{1-p}$$
$$x_1 \ \oplus \ x_2 \ = \ x_{2-p}$$
$$x_{q-1} \ \oplus \ x_q \ = \ x_{q-p}$$

where $x_p = x_1 \oplus x_2$;

(2) generating a coset by choosing an equation, represented by index a, $x_{a-1} \oplus x_a = x_{a-p}$, which is not in said corruptible subgroup of order 4 and adding said equation vectorially to each equation in said corruptible by $$x_{a-1} \oplus x_a = x_{a-p}$$

$$x_{b-1} \oplus x_b = x_{b-p}$$

$$x_{c-1} \oplus x_c = x_{c-p}$$

$$x_{d-1} \oplus x_d = x_{d-p};$$

where $x_b = x_a \oplus x_1$, $x_c = x_a \oplus x_2$, $x_d = x_a \oplus x_a$ and similarly for the left and right columns;

(3) choosing an integer number 1 which divides m and determines values for a mod 1, b mod 1, c mod 1 and d mod 1;

(4) if any of said values are duplicated, repeat steps (2) and (3) until four different values result;

(5) generate m/1 additional cosets of the form $$x_{a+kl-1} \oplus x_{a+kl} = x_{a+kl-p}$$

$$x_{b+kl-1} \oplus x_{b+kl} = x_{b+kl-p}$$

$$x_{c+kl-1} \oplus x_{c+kl} = x_{c+kl-p}$$

$$x_{d+kl-1} \oplus x_{d+kl} = x_{d+kl-p}$$

where $0 \leq k \leq m/1 - 1$;

(6) apply a mixing transform $w_{kl} \oplus w_{kl} = \Theta$ to said additional cosets, wherein $w_{kl} = X_{a+kl} \oplus X_{b+kl}$ to constructively corrupt said additional cosets, yielding the second matrix of $2^n$ equations; and (c) for each clear text block in the left column to be encrypted, adding modulo 2 to that block, the unique one of the $2^n$ n-bit blocks associated therewith in the middle column in accordance with the associated equation of the second matrix of $2^n$ equations to obtain the encrypted block in the right column.

7. A method of encryption by substituting for any one of the $2^n$ unique clear test blocks of n bit binary numbers an associated unique encrypted block of n bit binary numbers comprising the steps of:

(a) finding a first matrix $G^n$ of $2^n$ equations, representing a linear orthomorphism, each equation representing the modulo 2 addition of one of the $2^n$ clear blocks in the left column, with a unique one of $2^n$ n-bit block in the middle column to provide an associated unique n-bit blocking the right column, all of the equations in the first matrix of $2^n$ equations being characterized by the vector sum modulo 2 of any number of the equations also being one of the equations in the first matrix, the equations including the identity equation $\Theta \oplus \eta = \Theta$ and the remaining $2^n - 1$ equations being orderable as follows:

Equation #

| 1 | $x_m$ | $\oplus$ | $x_1$ | $=$ | $x_{1-p}$ |
|---|---|---|---|---|---|
| 2 | $x_1$ | $\oplus$ | $x_2$ | $=$ | $x_{2-p}$ |
| . | . | | . | . | . |
| . | . | | . | . | . |
| j | $x_j$ | $\oplus$ | $x_j$ | $=$ | $x_{j-p}$ |
| . | . | | . | . | . |
| . | . | | . | . | . |
| m | $x_{m-1}$ | $\oplus$ | $x_m$ | $=$ | $x_{m-p}$ | where $m = 2^n - 1$, where m is a prime number, $L_n$, $M_n$ and $R_n$ are the left, middle and right columns respectively, $G^n = L_n \times M_n \times R_n$ represents the set of equations;

(b) modifying a plurality of the non-zero $2^n - 1$ equations in the first matrix of $2^n$ equations to provide a second matrix of $2^n$ equations, representing nonlinear orthomorphisms, the plurality of equations being modified so that the modified plurality of equations collectively map the clear text blocks in the left column to unique encrypted n-bit blocks in the right column, but in a nonlinear manner so that each of the modified equations is not generally the sum modulo 2 of any number of the equations in the unmodified first set, wherein said modification of said plurality of non-zero $2^n - 1$ equations is achieved by (1) selecting a corruptible subgroup of order 4 from $G^n$ with two consecutive rows from the first, linear orthomorphic matrix of equations, said subgroup of order 4 being generally represented as $$\Theta \oplus \Theta = \Theta$$

$$x_m \oplus x_1 = x_{1-p}$$

$$x_1 \oplus x_2 = x_{2-p}$$

$$x_{q-1} \oplus x_q = x_{q-p}$$

where $x_q x_1 \oplus x_2$;

(2) generating a coset by choosing an equation, represented by index a, $x_{a-1} \oplus x_a = z_{a-p}$, which is not in said corruptible subgroup of order 4 and adding said equation vectorially to each equation in said corruptible subgroup, to generate a coset thereof represented by $$x_{a-1} \oplus x_a = x_{a-p}$$

$$x_{b-1} \oplus x_b = x_{b-p}$$

$$x_{c-1} \oplus x_c = x_{c-p}$$

$$x_{d-1} \oplus x_d = x_{d-p}$$

where $x_b = x_a \oplus x_1$, $x_c = x_a \oplus x_2$, $x_d = x_a \oplus x_q$ and similarly for the left and right columns;

(3) choosing an integer number $1=5$ and determine values for a mod 5, b mod 5, c mod 5 and d mod 5;

(4) if any of said values are duplicated, repeat steps (2) and (3) until four different values result;

(5) taking successive values of $k = 1, 2, 3, \ldots$, generate additional cosets of the form $$x_{a+kl-1} \oplus x_{a+kl} = x_{a+kl-p}$$

$$x_{b+kl-1} \oplus x_{b+kl} = x_{b+kl-p}$$

$$x_{c+kl-1} \oplus x_{c+kl} = x_{c+kl-p}$$

$$x_{d+kl-1} \oplus x_{d+kl} = x_{d+kl-p}$$

continuing until a coset occurs containing an equations which has previously occurred;

(6) delete a last duplicative coset and choose successively larger values of the k until a new closet is generated;

(7) repeat steps 9b) (5) and (b) (6) until no more non-overlapping cosets are generated;

(8) repeat steps (b) (2) to find a new coset containing no previously used equations;

(9) repeat steps (b) (3) using an integer $1-6$, determine values for mod 6, and then repeat steps (b) (4), (b) (5), (b) (6) and (b) (7);

(10) repeat steps 9b) (9) as desired, using numbers which have no common divisors or until no more new distinct cosets were found;

(11) apply a mixing transform $w_{kl} \oplus w_{kl} = \Theta$ to said additional cosets, wherein $w_{kl} = X_{a+kl} \oplus X_{b+kl}$ to constructively corrupt said additional cosets, yielding the second matrix of $2^n$ equations; and (c) for each clear text block in the left column to be encrypted, adding modulo 2 to that block, the unique one of the $2^n$ n-bit blocks associated therewith in the middle column in accordance with the associated equation of the second matrix of $2^n$ equations to obtain the encrypted block in the right column.

8. A block substitution method, comprising the steps of:

generating a set of linear orthomorphic block substitution equations having rows of equations with each row defining a block substitution operation wherein a first binary value is added modulo 2 to a second binary value to yield a third binary value, wherein said rows of equations having a certain order and wherein each binary value is represented only once within each column; and constructively corrupting the linear orthomorphic block substitution equations to yield a set of nonlinear orthomorphic block substitution equations by independently rearranging the row order of the first and second binary values while holding the row order of the third binary values fixed and while preserving equality in each row.

9. The method of claim 8, wherein said step of constructively corrupting the linear orthomorphic block substitution equations comprises the steps of:

generating nested sequences of subgroups of block substitution equations;

generating nested sequences of mixing transforms corresponding to said nested sequences of subgroups;

successively applying said nested sequences of mixing transforms to said nested sequences of subgroups until all subgroups have been modified.

10. The method of claim 8, wherein said step of constructively corrupting the linear orthomorphic block substitution equations comprises the steps of:

selecting two or more disjoint corruptible subgroups from the set of linear orthomorphic block substitution equations;

decomposing said subgroups into cosets;

selecting a sequence of said cosets to represent said set of linear orthomorphic block substitution equations;

generating a set of mixing transforms corresponding to said selected sequence of cosets; and modifying each coset of said selected set of cosets by a corresponding mixing transform, to yield said set of non-linear orthomorphic block substitution equations.

11. The method of claim 8, wherein said set of linear orthomorphic block substitution equations includes $2^n$ rows of equations including the identity equation having subsequent blocks identified by sequential indices $1, \ldots, 2^n - 1$, wherein $m = 2^n - 1$ and wherein m is not a prime number, and wherein said step of constructively corrupting the linear orthomorphic block substitution equations comprises the steps of:

a) selecting a corruptible subgroup of four rows from said set of linear orthomorphic block substitution equations;

b) generating a coset by selecting an equation which is not in said subgroup and adding said equation vectorially to each row of said subgroup to yield a coset having rows identified by indices a, b, c and d;

c) selecting a number 1 which divides m;

d) determining whether a mod 1, b mod 1, c mod 1, and d mod 1 contain duplicates;

e) if duplicates occur in a mod 1, b mod 1, c mod 1, and d mod 1, rejecting said coset and repeat steps a)-d);

f) generating m/1 additional cosets from said coset by shifting indices by an amount kl, wherein $0 < k < m/1 - 1$; and g) applying a mixing transform to said additional cosets to yield said set of non-linear orthomorphic block substitution equations.

12. The method of claim 8, wherein said set of linear orthomorphic block substitution equations includes $2^n$ rows of equations including the identity equation having subsequent blocks identified by sequential indices $1, \ldots, 2^n - 1$, wherein $m = 2^n - 1$ and wherein m is a Mersenne prime, and wherein said step of constructively corrupting the linear orthomorphic block substitution equations comprises the steps of:

a) selecting a corruptible subgroup of four rows from said set of linear orthomorphic block substitution equations;

b) generating a coset by selecting an equation which is not in said subgroup and adding said equation vectorially to each row of said subgroup to yield a coset having rows identified by indices a, b, c, and d;

c) selecting a number $1 = 5$;

d) determining whether a mod 1, b mod 1, c mod 1, and d mod 1 contain duplicates;

e) if duplicates occur in a mod 1, b mod 1, c mod 1, and d mod 1, rejecting said coset and repeat steps a)-d);

f) generating additional cosets from said coset by shifting indices by an amount kl, for successive values of an integer k, continuing until an overlapping coset is generated, wherein an overlapping coset is a coset containing an equation found in a previously generated coset;

g) discard said coset having an equation found in a previously generated coset;

h) generate an additional coset using successively larger values of k;

i) repeat steps g) and h) until no more overlapping cosets are generated;

j) repeat step b) to find a new non-overlapping coset;

k) repeat step d) for $1 = 6$, determining values for mod 6 and repeating steps e) - h);

l) repeat step k) using values for 1 that have no common dividers until no more non-overlapping cosets are generated; and m) applying a mixing transform to said additional cosets to yield said set of non-linear orthomorphic block substitution equations.

* * * * *